US010354009B2

(12) United States Patent
Liang et al.

(10) Patent No.: US 10,354,009 B2
(45) Date of Patent: Jul. 16, 2019

(54) CHARACTERISTIC-PATTERN ANALYSIS OF TEXT

(71) Applicant: Microsoft Technology Licensing, LLC, Redmond, WA (US)

(72) Inventors: Mei Liang, Sammamish, WA (US); Wei Luo, Sammamish, WA (US); Lingzhi Sun, Shanghai (CN); Navendu Jain, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 98 days.

(21) Appl. No.: 15/245,675

(22) Filed: Aug. 24, 2016

(65) Prior Publication Data

US 2018/0060302 A1     Mar. 1, 2018

(51) Int. Cl.
  *G06F 16/35*     (2019.01)
  *G06F 17/27*     (2006.01)
(52) U.S. Cl.
  CPC .......... *G06F 17/2775* (2013.01); *G06F 16/35* (2019.01); *G06F 17/277* (2013.01); *G06F 17/2785* (2013.01)
(58) Field of Classification Search
  CPC .. G06F 17/2775; G06F 17/241; G06F 17/274; G06F 17/2735
  See application file for complete search history.

(56) References Cited

U.S. PATENT DOCUMENTS

| 7,970,781 | B1 | 6/2011 | King et al. |
| 8,103,614 | B2 | 1/2012 | Tseng et al. |
| 8,170,867 | B2 | 5/2012 | Germain |
| 8,229,883 | B2 | 7/2012 | Brauer et al. |
| 8,893,024 | B2 | 11/2014 | Wanas et al. |

(Continued)

FOREIGN PATENT DOCUMENTS

| CN | 103778555 A | 5/2014 |
| JP | 2012185672 A | 9/2012 |

OTHER PUBLICATIONS

Chai et al., "Social Media Analytics: The Kosmix Story", in the Journal of the IEEE Data Engineering Bulletin, vol. 36, Iss. 3, Sep. 2013, pp. 4-12.

(Continued)

*Primary Examiner* — Bharatkumar S Shah
(74) *Attorney, Agent, or Firm* — Schwegman Lundberg & Woessner, P.A.

(57) ABSTRACT

A computing device can receive at least one document including text segments. The computing device can determine a characteristic pattern associated with a first text segment of the text segments and determine an association between the first text segment and a first individual class of a model based at least in part on the characteristic pattern. The computing device can determine a collection of classes of the model associated with the at least one document based at least in part on the association, and determine an actionable item associated with the at least one document based at least in part on the collection and at least one grammar pattern. The computing device can present or transmit an indication of the actionable item. In some examples, the computing device can arrange actionable items in an order based at least in part on occurrences of the actionable items from multiple documents.

17 Claims, 15 Drawing Sheets

(56) References Cited

U.S. PATENT DOCUMENTS

| | | |
|---|---|---|
| 2003/0004915 A1 | 1/2003 | Lin et al. |
| 2007/0294127 A1 | 12/2007 | Zivov |
| 2010/0017378 A1 | 1/2010 | Gopalakrishnan |
| 2010/0235164 A1 | 9/2010 | Todhunter et al. |
| 2010/0250598 A1* | 9/2010 | Brauer .................. G06F 16/319 707/780 |
| 2012/0008838 A1* | 1/2012 | Guyon .................. G06T 7/0012 382/128 |
| 2012/0272160 A1 | 10/2012 | Spivack et al. |
| 2013/0238313 A1 | 9/2013 | Alshinnawi et al. |
| 2013/0246225 A1 | 9/2013 | Biltz |
| 2014/0006861 A1 | 1/2014 | Jain et al. |
| 2015/0135058 A1 | 5/2015 | Metcalf et al. |
| 2015/0356142 A1* | 12/2015 | Proux .................. G06F 16/3334 706/11 |

OTHER PUBLICATIONS

Gattani, et al., "Entity Extraction, Linking, Classification, and Tagging for Social Media: A Wikipedia-Based Approach", in the Proceedings of the VLDB Endowment, vol. 6, Iss. 11, Aug. 26, 2013, 12 pages.

Saracco, et al., "Analyze text from social media sites with InfoSphere BigInsights", Published on: May 14, 2013, available at: <<http://www.ibm.com/developerworks/library/bd-socialmediabiginsights/>>.

* cited by examiner

CHARACTERISTIC-PATTERN ANALYSIS OF TEXT

BACKGROUND

Users often provide feedback regarding services, software elements, or hardware elements through various means. In some instances, the feedback relates to bugs, problems, or other issues with the software or hardware, while in other instances the feedback relates to asking questions, reporting experiences (e.g., positive/negative feedback) or providing suggestions for improving the software or hardware. In further instances, the feedback includes text or other information, such as a general description about how the software or hardware works, a feature that a user likes or dislikes, information that is not related to the software or hardware, and so on. For example, a user might use a support interface provided by an operating system to let an administrator know about features that the user likes and problems that the user is having with a particular feature of the operating system. Users also often provide responses to their feedback items, and engage in dialog with technical-support personnel, e.g., via online services. Such dialog can be conducted, e.g., to resolve problems.

In many instances, the feedback is manually viewed and evaluated by administrators (or other people associated with the service, software, or hardware) to identify bugs or other issues with the service, software, or hardware that need fixing. Since the feedback is manually evaluated, and often encompasses multiple different types of information (which may or may not be applicable to the administrators or others reviewing the feedback), the administrators spend considerable time analyzing the feedback. Moreover, some systems designed to assist administrators in reviewing suggestions are unable to correctly process unknown terms, such as the names of recently-released products. Since user feedback often accompanies product releases, this greatly limits the usefulness of such systems to administrators.

SUMMARY

This disclosure describes systems, methods, and computer-readable media for analyzing free-form text, e.g., to determine user suggestions. In some instances, a computing device can receive at least one document including text segment(s). The computing device can determine a characteristic pattern associated with a first text segment of the text segment(s) and determine an association between the first text segment and a first individual class of a model based at least in part on the characteristic pattern. The computing device can determine a collection of class(es) of the model associated with the at least one document based at least in part on the association, and determine an actionable item associated with the at least one document based at least in part on the collection and at least one grammar pattern. The computing device can present or transmit an indication of the actionable item. According to example techniques described herein, the computing device can determine, for a first document and a second document of a plurality of documents, a respective actionable item based at least in part on a tag sentence associated with the respective document. The computing device can arrange the respective actionable items for the first document and the second document of the plurality of documents in an order based at least in part on occurrences of the actionable items from the plurality of documents.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, can refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
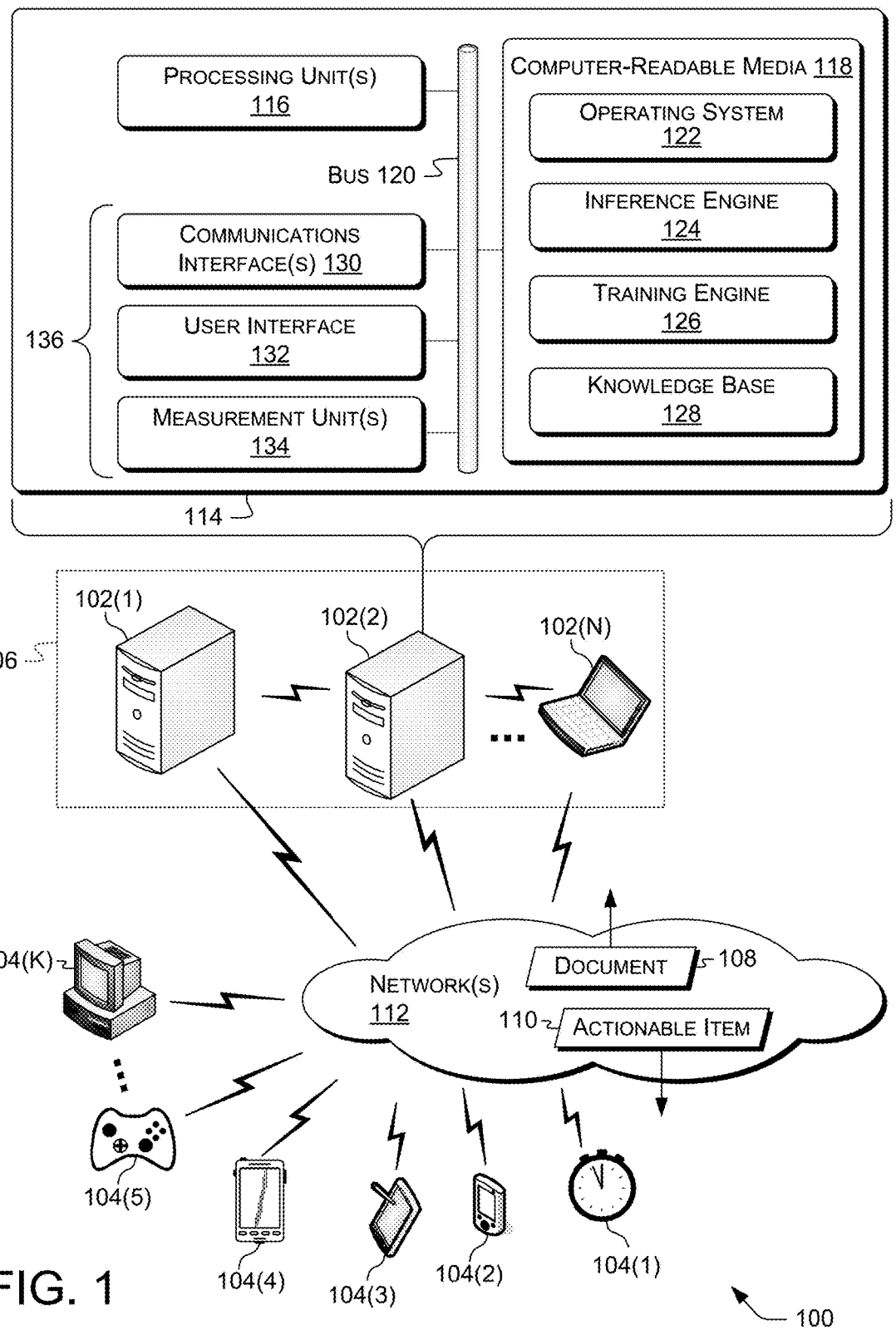
FIG. 1 is a block diagram depicting an example environment for implementing automated text analysis as described herein.

This document relates to analysis of data, and more particularly to performing automated inference of motifs expressed in documents. As used herein, a "motif" is a high-level category of an "actionable item." Example motifs can include, e.g., a user statement, suggestion, question, resolution report, blocking issue or problem, or action statement. Actionable items can include, e.g., prompts, indications, flagged statements, or other data, e.g., text. Various examples are directed to techniques and architectures for automatically processing user feedback, e.g., to determine user suggestions or other actionable items. Various examples are directed to expanding the vocabulary of the system to encompass terms being used in documents but not previously known to the system. In many instances, the techniques and architectures can analyze one or more pieces of user feedback to identify such terms and to identify actionable items related to such terms. Various examples can provide information about the suggestions to individuals for evaluation. Suggestions can relate to software, hardware, and/or another item or entity. In some examples, an administrator that manages a particular software and/or hardware element can be informed of a suggestion for an enhancement to the particular software and/or hardware element. Based on the information, the administrator may fix a problem with the software, implement a new feature, and/or perform a variety of other acts.

In some implementations of the techniques described herein, a service provider can collect one or more documents, e.g., documents that include user feedback. The one or more documents can be collected from a variety of sources, such as an online source, a customer support portal, an electronic message, a conversation with a customer or intelligent personal assistant, and so on. The one or more documents can generally include at least some free-form text provided by a user (e.g., text in a natural language). Further, the one or more documents can include a variety of information which may or may not be relevant to a suggestion. For example, a document can include a sentence regarding a problem that a user is having with a software element, a sentence regarding a feature of the software element for which the user has indicated an interest (e.g., a feature the user likes), a sentence that is unrelated to the software element, and so on. Examples herein are given in the English language, but this is not limiting. Example techniques herein can be adapted to other natural or constructed languages.

The service provider can analyze a document based on a knowledge base. Individual text segments (e.g., sentences, phrases, words, etc.) of the document can be tagged with classes of a model such as an ontology. Phrases matching criteria such as described herein, but not included in the knowledge base, can be associated with classes of the ontology. Examples of such phrases can include technical phrases, e.g., domain-specific phrases, product names, or component names. Patterns of the classes can then be located in the tagged text segments to determine motifs such as "problem," "suggestion," "question", "delighter", or "resolution." For example, a tagged text segment that matches a grammar pattern that is associated with a particular motif, e.g., a suggestion, can be identified as including the particular motif, e.g., the suggestion. In other words, the service provider can determine that the tagged text segment describes a problem, a suggestion, or other item that can be addressed by performing a task. In some examples, machine learning models can be built based on the tagged text segment to classify the input document into one or more of the motifs.

The service provider can make information available regarding suggestions or other actionable items found in the one or more documents. The information can be made available in a variety of manners to a variety of individuals. In some examples, a suggestion regarding a software entity can be provided to an individual that manages the software entity (e.g., sent in an email, provided via an interface, etc.). In another example, an individual can request suggestions for a particular entity, e.g., via a graphical interface. In yet another example, information regarding actionable items can include a ranking of the suggestions. The ranking can be performed, e.g., based on frequency or domain-specific criteria such as relevance to a particular topic or category or importance for accomplishing a particular goal. For instance, if an individual makes a request to view top actionable items for an instant messaging application, the service provider can provide a ranking of actionable items that are identified for the instant messaging application across user feedback from multiple users.

In some instances, the techniques and architectures described herein can normalize user feedback. For example, by mapping user feedback to ontologies, the user feedback can be grouped according to various classes of words or phrases. This can increase consistency of words across various contexts. For example, a customer term for a problem with a software element can be mapped to a class that represents a technical term used by an administrator of the software element. Further, the techniques and architectures can analyze text in the form in which the text is presented (e.g., analyze a text segment, such as a text segment, based on surrounding text segments, such as surrounding words or phrases). This mapping can be performed in a hierarchical manner, e.g., by mapping portions of a parse tree to respective classes of a model.

In many instances, the techniques and architectures are described herein in the context of actionable items related to software or hardware. However, the techniques and architectures can be applicable to a wide variety of contexts, such as in a consumer context where feedback of consumer products is analyzed, a vehicle context where feedback of vehicles is analyzed, a consumable item context where feedback of consumable items is analyzed (e.g., food), a service context where feedback of a service is analyzed (e.g., restaurant service or another business service), and so on.

As used, the term "document" refers to a collection of one or more words, and includes both electronic and physical documents. In the context of an electronic document, the term can encompass the combination of human-language words along with metadata, e.g., as in the case of a word processing document or spreadsheet document. The term "feedback record" refers to a particular type of document that includes user feedback, e.g., solicited or unsolicited feedback. In some examples, contents of a document can be processed upon receipt or retrieval of the complete data for that document. For example, an e-mail message can be processed once the message has been completely received. In some examples, contents of a document can be processed as they become available. For example, a microblog feed such as the TWITTER "firehose" stream, considered as a single document, can be processed as new microblog entries become available. Techniques described herein can be applied to whatever data is available, unless expressly indicated otherwise.

Some documents can include certain automated fields that are auto-filled by software that generates the documents. For example, auto-filled fields can be populated by the document-generating software with particular data values that relate to software being used or software generating the document. Documents can also include unstructured data, such as free-form text produced by humans communicating about the problem, or semi-structured data, such as logging messages generated by one or more devices. As discussed in more detail below, some example implementations can process this unstructured or semi-structured data to automatically infer various motifs, e.g., individual problems, actions, or suggestions inferred from an individual document and trends associated with the network failures inferred using multiple documents.

Some examples, scenarios, and examples of techniques for analysis of free-form user text in accordance with various examples are presented in greater detail in the description of the following figures.

Illustrative Environment

FIG. 1 shows an example environment 100 in which examples of full-text analysis systems can operate or in which inference analysis methods such as described below can be performed. In the illustrated example, various devices and/or components of environment 100 include computing devices 102(1)-102(N) (individually or collectively referred to herein with reference 102), where N is any integer greater than or equal to 1, and computing devices 104(1)-104(K) (individually or collectively referred to herein with reference 104), where K is any integer greater than or equal to 1. In some examples, N=K; in other examples, N>K or N<K. Although illustrated as, e.g., desktop computers, laptop computers, tablet computers, IoT sensors, or cellular phones, computing devices 102 or 104 can include a diverse variety of device categories, classes, or types and are not limited to a particular type of device.

In the illustrated example, computing devices 102(1)-102(N) can be computing nodes in a cluster 106, e.g., a cloud service such as MICROSOFT AZURE, IBM BLUEMIX, etc. Cloud computing permits computing resources to be provided as services rather than a deliverable product. For example, in a cloud-computing environment, computing power, software, storage, information, and/or network connectivity are provided (for example, through a rental agreement) over a network, such as the Internet. In the illustrated example, computing devices 104 can be clients of cluster 106 and can submit jobs to cluster 106 and/or receive job results from cluster 106. Computing devices 102(1)-102(N) in cluster 106 can, e.g., share resources, balance load, increase performance, or provide fail-over support or redundancy. In some examples, some of the computing devices 102 can be hosted by a cloud service and others hosted at a customer's site. In the illustrated example, computing devices 104 communicate with computing devices 102. Additionally or alternatively, computing devices 104 can communicate with cluster 106, e.g., with a load-balancing or job-coordination device of cluster 106, and cluster 106 or components thereof can route transmissions to individual computing devices 102. Computing devices 104 can additionally or alternatively operate in a cluster or grouped configuration.

By way of example and not limitation, computing devices 102 or 104 can include, but are not limited to, server computers or blade servers such as Web servers, map/reduce servers or other computation engines, or network-attached-storage units (e.g., 102(1)), laptop computers, thin clients, terminals, or other mobile computers (e.g., 102(N)), wearable computers such as smart watches or biometric or medical sensors, implanted computing devices such as biometric or medical sensors, or fixed sensors, such as IoT sensors, configured to monitor time, environmental conditions, vibration, motion, or other attributes of the world or structures or devices therein, e.g., bridges or dams (e.g., 104(1), represented graphically as a clock), computer navigation client computing devices, satellite-based navigation system devices including global positioning system (GPS) devices and other satellite-based navigation system devices (e.g., 104(2), represented graphically as a PDA), tablet computers or tablet hybrid computers (e.g., 104(3)), smartphones, mobile phones, mobile phone-tablet hybrid devices, or other telecommunication devices (e.g., 104(4)), portable or console-based gaming devices or other entertainment devices such as network-enabled televisions, set-top boxes, media players, cameras, or personal video recorders (PVRs) (e.g., 104(5), represented graphically as a gamepad), automotive computers such as vehicle control systems, vehicle security systems, or electronic keys for vehicles, personal data assistants (PDAs), desktop computers (e.g., 104(K)), or integrated components for inclusion in computing devices, appliances, or other computing devices configured to participate in or carry out root-cause determination as described herein, e.g., for software debugging or monitoring purposes. In some examples, as indicated, computing devices, e.g., computing devices 102(1) and 102(2), can intercommunicate to participate in or carry out text analysis or inference as described herein.

Different devices or types of devices can have different uses for text analysis results. For example, devices generally used by individual users such as computing devices 104(2)-104(4) can present confirmation to the users that their suggestions or other feedback documents have been received. Devices generally used by system administrators, such as computing device 104(K), can display detected actionable items, e.g., suggestions, or trends in actionable items, e.g., to persons responsible for entities relevant to the suggestions or other actionable items. Users, administrators, or other entities receiving reports of actionable items, may choose to base future decisions on those reports, though this is not required.

In some examples, users of computing devices 104 communicate with providers of, e.g., hardware of computing devices 102 or 104 or software running thereon, to provided user feedback or comments regarding the hardware or software. Such communications are referred to herein as documents 108 and can be transmitted, e.g., electronically from a computing device 104 to a computing device 102. Such transmissions can be directly from a user. Additionally or alternatively, a user can communicate feedback to, e.g., a customer-service agent using a computing device 104(K), and the agent can provide a corresponding document 108 to computing devices 102.

In some examples, documents 108 can include structured data populated by computing devices 102 or 104, unstructured data such as free-form user text written by individual users, e.g., feedback from a user in a natural or constructed language, automated messages logged by one or more computing devices 102 or 104, or combinations thereof. As used herein, the term "free-form user text," when used in the context of a group of documents 108, refers to free-form user text in at least one of the documents 108. Examples of types of data in a document are discussed below with reference to FIG. 3. Users can provide documents 108, e.g., during the course of use of a hardware or software product or service, when such a product or service crashes or otherwise malfunctions, or upon request, e.g., from computing device 102 or 104 or a software program running thereon. Various examples of documents 108 are discussed herein, e.g., with reference to the MICROSOFT CORTANA speech-recognition and personal-assistant software. However, these examples are not limiting. For example, the APPLE SIRI personal-assistant software or other types of personal-assistant software can also be used to provide documents 108.

In some examples, computing device(s) 102 analyze the received documents 108 to infer user meaning. For example, computing device(s) 102 can determine actionable items 110, e.g., user suggestions or recommendations regarding software or hardware, based at least in part on the contents of one or more document(s) 108. An individual document 108 can correspond to one actionable item 110, e.g., "SIRI should do logging," or to multiple actionable items 110, e.g., "CORTANA should read my mind and should control the weather." Another example of an actionable item 110 is a resolution, e.g., "I'm glad my teleporter works now!" Computing device(s) 102 can transmit information of the actionable items 110 to computing device(s) 104, e.g., to a computing device 104(K) such as a workstation, or other computing device 104 of a user that is associated with management of the software or hardware that is the subject of the actionable item 110, e.g., CORTANA or SIRI.

In some examples, computing devices 102 or 104 can communicate with each other or with other computing devices via one or more networks 112. For example, as indicated, computing devices 104 can transmit documents 108 to computing devices 102 and receive actionable items 110 from computing devices 102, via network(s) 112. In some examples, computing devices 102 or 104 can communicate with external devices via networks 112. For example, networks 112 can include public networks such as the Internet, private networks such as an institutional or personal intranet, cellular networks, or combinations of private and public networks. Networks 112 can also include any type of wired or wireless network, including but not limited to local area networks (LANs), wide area networks (WANs), satellite networks, cable networks, Wi-Fi networks, WiMAX networks, mobile communications networks (e.g., 3G, 4G, and so forth) or any combination thereof.

Networks 112 can utilize communications protocols, such as, for example, packet-based or datagram-based protocols such as Internet Protocol (IP), Transmission Control Protocol (TCP), User Datagram Protocol (UDP), other types of protocols, or combinations thereof. Moreover, networks 112 can also include a number of devices that facilitate network communications or form a hardware infrastructure for the networks, such as switches, routers, gateways, access points, firewalls, base stations, repeaters, backbone devices, and the like. Networks 112 can also include devices that facilitate communications between computing devices 102 or 104 using bus protocols of various topologies, e.g., crossbar switches, INFINIBAND switches, or FIBRE CHANNEL switches or hubs.

Different networks have different characteristics, e.g., bandwidth, latency, accessibility (open, announced but secured, or not announced), or coverage area. Computing devices 104 can use networks 112 having appropriate characteristics in communicating documents 108, e.g., synchronously or asynchronously, to computing device(s) 102. The type of network 112 used for any given connection between, e.g., a computing device 104 and cluster 106 can be selected based on these characteristics and on the type of interaction. For example, a low-power, low-bandwidth network can be selected for IoT sensors, and a low-latency network can be selected for smartphones such as computing device 104(4).

In some examples, networks 112 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), other standards, e.g., BLUETOOTH, cellular-telephony standards such as GSM, LTE, or WiMAX, or multiples or combinations thereof.

Still referring to the example of FIG. 1, details of an example computing device 102(2) are illustrated at inset 114. The details of example computing device 102(2) can be representative of others of computing devices 102 or 104. However, individual ones of the computing devices 102 or 104 can include additional or alternative hardware and/or software components. Computing device 102(2) can include one or more processing units 116 operably connected to one or more computer-readable media 118 such as via a bus 120, which in some instances can include one or more of a system bus, a data bus, an address bus, a Peripheral Component Interconnect (PCI) Express (PCIe) bus, a PCI bus, a Mini-PCI bus, and any variety of local, peripheral, or independent buses, or any combination thereof. In some examples, plural processing units 116 can exchange data through an internal interface bus (e.g., PCIe), rather than or in addition to network 112. While in this example the processing units 116 are described as residing on the computing device 102(2), the processing units 116 can also reside on different computing devices 102 or 104 in some examples. In some examples, at least two of the processing units 116 can reside on different computing devices 102 or 104. In such examples, multiple processing units 116 on the same computing device 102 or 104 can use an interface bus 120 of the computing device 102 or 104 to exchange data, while processing units 116 on different computing devices 102 or 104 can exchange data via networks 112.

Processing units 116 can be or include one or more single-core processors, multi-core processors, CPUs, GPUs, general-purpose graphics processing units (GPGPUs), or hardware logic components configured, e.g., via specialized programming from modules or APIs, to perform functions described herein. For example, and without limitation, illustrative types of hardware logic components that can be used in or as processing units 116 include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and other types of customizable processors. For example, a processing unit 116 can represent a hybrid device, such as a device from ALTERA or XILINX that includes a CPU core embedded in an FPGA fabric. These or other hardware logic components can operate independently or, in some instances, can be driven by a CPU. In some examples, at least some of computing devices 102 or 104 can include a plurality of processing units 116 of multiple types. For example, the processing units 116 in computing device 102(2) can be a combination of one or more GPGPUs and one or more FPGAs. Different processing units 116 can have different execution models, e.g., as is the case for graphics processing units (GPUs) and central processing unit (CPUs). In some examples, processing units 116, computer-readable media 118, and modules or engines stored on computer-readable media 118 can together represent an ASIC, FPGA, or other logic device configured to carry out the functions of such modules or engines.

Computer-readable media described herein, e.g., computer-readable media 118, include computer storage media and/or communication media. Computer storage media includes tangible storage units such as volatile memory, nonvolatile memory, and/or other persistent and/or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, and/or storage media that can be used to store and maintain information for access by a computing device 102 or 104.

In contrast to computer storage media, communication media can embody computer-readable instructions, data structures, program modules, or other data in a modulated data signal, such as a carrier wave, or other transmission mechanism. As defined herein, computer storage media does not include communication media.

In some examples, computer-readable media 118 can store instructions executable by the processing units 116 that, as discussed above, can represent a processing unit incorporated in computing device 102. Computer-readable media 118 can additionally or alternatively store instructions executable by external processing units such as by an external CPU or external processor of any type discussed above. In some examples at least one processing unit 116, e.g., a CPU, GPU, or hardware logic device, is incorporated in computing device 102, while in some examples at least one processing unit 116, e.g., one or more of a CPU, GPU, or hardware logic device, is external to computing device 102.

Computer-readable media 118 can store, for example, executable instructions of an operating system 122, an inference engine 124, a training engine 126, and other modules, programs, or applications that are loadable and executable by processing units 116. Computer-readable media can also store, for example, a knowledge base 128. In some examples not shown, one or more of the processing units 116 in one of the computing devices 102 or 104 can be operably connected to computer-readable media 118 in a different one of the computing devices 102 or 104, e.g., via communications interface 130 and network 112. For example, program code to perform steps of flow diagrams herein can be downloaded from a server, e.g., computing device 102(1), to a client, e.g., computing device 104(K), e.g., via the network 112, and executed by one or more processing units 116 in computing device 104(K). For example, the computer-executable instructions stored on the computer-readable media 118 can upon execution configure a computer such as a computing device 102 or 104 to perform operations described herein with reference to the operating system 122, the inference engine 124, the training engine 126, or the knowledge base 128.

In some examples, the inference engine 124 can be configured to process document(s) 108 to infer various motifs (e.g., user text corresponding to those motifs, and likewise throughout) from the documents 108. For example, the inference engine 124 can identify motifs such as problems, actions, questions, suggestions or other actionable items 110 expressed in the documents 108. For example, documents 108 expressing or containing suggestion motifs can include words or phrases that describe request(s) for new behavior(s) of an entity or changes to existing behavior(s) of an entity (e.g., add keyboard shortcuts, remove animations). The inference engine 124 can also identify trends over multiple documents 108 such as suggestions associated with a particular model of device or a particular device configuration. The inference engine 124 can process the documents 108 using information stored in the knowledge base 128, as discussed in more detail below.

In some examples, one or more computing device(s) 104 can include inference engine interface(s) (not shown) configured to communicate with, or receive results determined by, inference engine 124. For example, the inference engine interface can include a browser that receives and displays visualizations reflecting the inferences made by the inference engine 124, and a computing device 104 can display the visualizations to a user of computing device 104. Thus, computing device 104 can be used by a design engineer or manager to help analyze actionable items 110 (e.g., user suggestions) and, e.g., set development priorities accordingly. The inference engine interface can also be configured to operate on other, e.g., non-visual, forms of output by querying the inference engine 124 using one or more application programming interfaces to obtain output from the inference engine 124.

Computer-readable media 118 of the computing device 102 can store an operating system 122. In some examples, operating system 122 is not used (commonly referred to as a "bare metal" configuration). In some examples, operating system 122 can include components that enable or direct the computing device 102 to receive data via various inputs (e.g., user controls, network or communications interfaces, memory devices, or sensors), and process the data using the processing units 116 to generate output. The operating system 122 can further include one or more components that present the output (e.g., display an image on an electronic display, store data in memory, transmit data to another computing device, etc.). The operating system 122 can enable a user to interact with apps or with modules of the training engine 126 using a user interface 132. Additionally, the operating system 122 can include components that perform various functions generally associated with an operating system, e.g., storage management and internal-device management.

Computing device 102 can also include one or more communications interfaces 130 to enable wired or wireless communications between computing devices 102 or 104 and other networked computing devices 102 or 104 involved in root-cause determination or running apps, or other computing devices, over networks 112. Such communications interfaces 130 can include one or more transceiver devices, e.g., network interface controllers (NICs) such as Ethernet NICs or other types of transceiver devices, to send and receive communications over a network. The processing units 116 can exchange data through respective communications interfaces 130. In some examples, the communications interface 130 can be a PCIe transceiver, and the network 112 can be a PCIe bus. In some examples, the communications interface 130 can include, but is not limited to, a transceiver for cellular (3G, 4G, or other), WI-FI, Ultra-wideband (UWB), BLUETOOTH, or satellite transmissions. The communications interface 130 can include a wired I/O interface, such as an Ethernet interface, a serial interface, a Universal Serial Bus (USB) interface, an INFINIBAND interface, or other wired interfaces. The communications interface 130 can additionally and/or alternatively include at least one user-interface device or user interface, at least one bus such as a memory bus and/or local bus, at least one memory interface, and/or at least one hardwired interface such as a 0-20 mA control line. For simplicity, these and other components are omitted from the illustrated computing device 102.

In some examples, computing device 102 or 104 can include user interface 132. User interface 132 can include one or more output devices configured for communication to a user or to another computing device 102 or 104. Output devices can be integral or peripheral to computing device 102 or 104. Examples of output devices can include a display, a printer, audio speakers, beepers, or other audio output devices, a vibration motor, linear vibrator, or other haptic output device, and the like.

User interface 132 can include one or more input devices, integral or peripheral to computing device 102 or 104. The input devices can be user-operable, or can be configured for input from other computing device 102 or 104. Examples of input devices can include, e.g., a keyboard, keypad, a mouse, a trackball, a pen sensor or smart pen, a light pen or light gun, a game controller such as a joystick or game pad, a voice input device such as a microphone, voice-recognition device, or speech-recognition device, a touch input device, a gestural input device such as a touchscreen, a grip sensor, an accelerometer, another haptic input, a visual input device such as one or more cameras or image sensors, and the like.

In some examples, computing device 102 or 104 can include one or more measurement units 134. Measurement units 134 can detect physical properties or status of computing device 102 or its environment. Examples of measurement units 134 can include units to detect motion, temperature, pressure, light, sound, electromagnetic radiation (e.g., for wireless networking), or any other detectable form of energy or matter in or within sensing range of computing device 102 or 104. Information from measurement units 134 on computing devices 104 can be incorporated, automatically or at user direction, into document(s) 108.

In some examples, e.g., of a smartphone computing device 104(4), measurement units 134 can include an accelerometer, a microphone, or front- and rear-facing cameras. Examples of measurement units 134 can include devices for measuring physical properties, devices for communicating, or devices for receiving information. In some examples, measurement units 134 can include a network transceiver (e.g., communications interface 130), a motion sensor, a proximity detector (e.g., for nearby life forms, people, or devices), a light sensor (e.g., a CdS photoresistor or a phototransistor), a still imager (e.g., a charge-coupled device, CCD, or complementary metal-oxide-semiconductor, CMOS, sensor), a video imager (e.g., CCD or CMOS), a microphone, a fingerprint reader, a retinal scanner, an iris scanner, or a touchscreen (e.g., in or associated with a display in user interface 132 such as display 210, FIG. 2).

In some examples, computing device 102 or 104 can include one or more sensors 136. Components of communications interface 130, e.g., transceivers for BLUETOOTH, WI-FI, or LTE, can be examples of sensors 136. Such components can be used to, e.g., detect signals corresponding to characteristics of accessible networks. Such signals can also be detected by automatically locating information in a table of network information (e.g., cell-phone tower locations), or by a combination of detection by component of communications interface 130 and table lookup. Components of user interface 132, e.g., touchscreens or phone mouthpieces, can also be examples of sensors 136. Measurement units 134 can also be examples of sensors 136. In some examples, a particular device can simultaneously or selectively operate as part of two or more of communications interface 130, user interface 132, and one or more measurement units 134. For example, a touchscreen can be an element of user interface 132 and used to present information and receive user commands. Signals from the same touchscreen can also be used in determining a user's grip on computing device 102 or 104. Accordingly, that touchscreen in this example is also a sensor 136. Information from measurement units 134 on computing devices 104 can be incorporated, automatically or at user direction, into document(s) 108.

Illustrative Components

Figure 2:
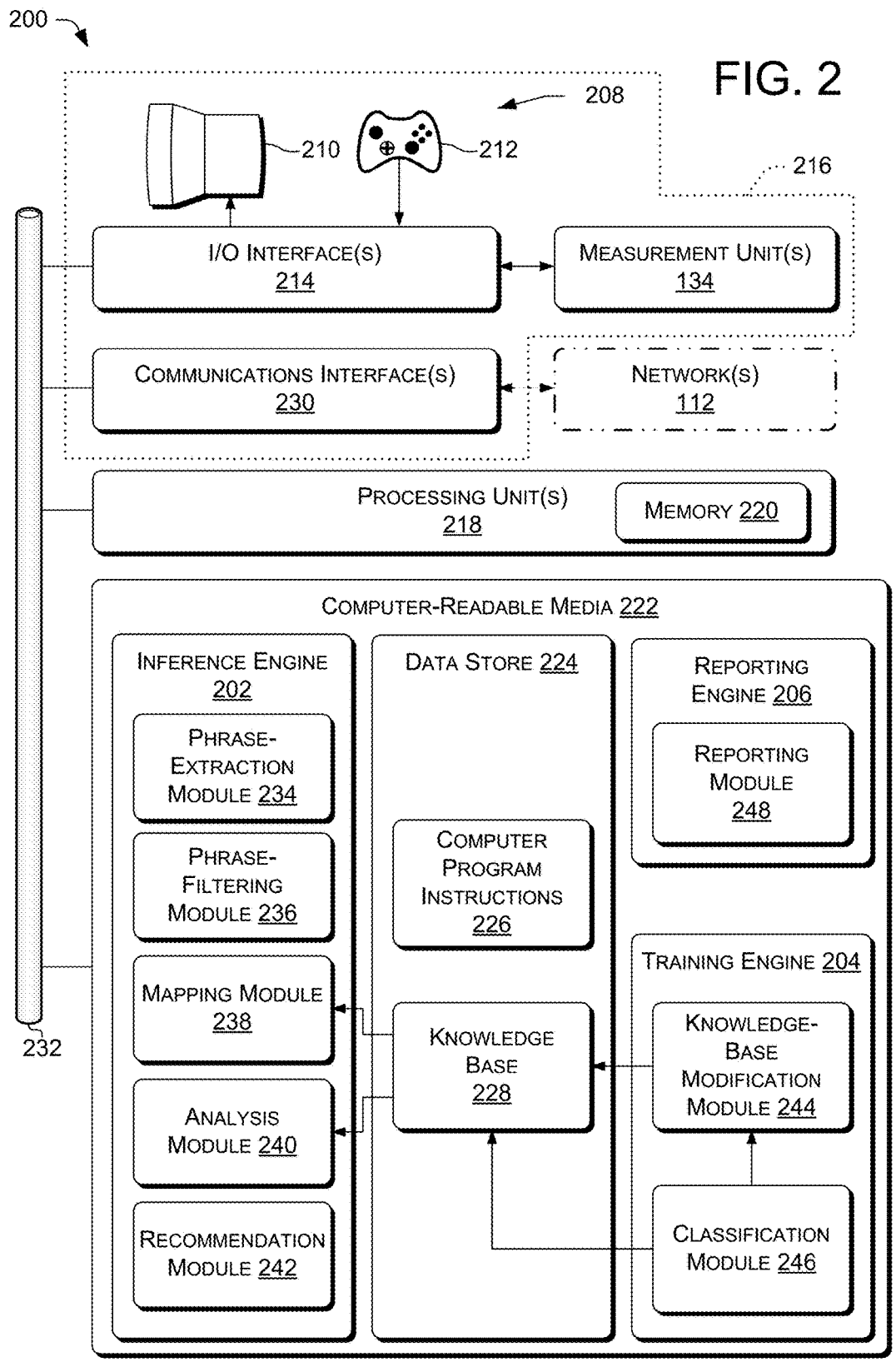
FIG. 2 is a block diagram depicting an example computing device configured to participate in automated text analysis according to various examples described herein.

FIG. 2 is an illustrative diagram that shows example components of a computing device 200, which can represent computing devices 102 or 104, and which can be configured to participate in knowledge-base expansion or inference analysis, according to various examples described herein. Computing device 200 can implement an inference engine 202, which can represent inference engine 124, FIG. 1. Computing device 200 can implement a training engine 204, which can represent training engine 126, FIG. 1. Computing device 200 can implement a reporting engine 206.

In some examples, e.g., of a computing device 102 providing an inference-analysis or suggestion-analysis service, the computing device 200 can implement inference engine 202 and training engine 204 but not reporting engine 206. In some examples, e.g., of a computing device 104 making use of an inference service, the computing device 200 can implement reporting engine 206 but not training engine 204. In some examples, e.g., of a computing device 102 or 104 implementing both an inference service and the use thereof, the computing device 200 can implement inference engine 202, training engine 204, and reporting engine 206.

Computing device 200 can include or be connected to a user interface 208, which can represent user interface 132. User interface 208 can include a display 210. Display 210 can include an organic light-emitting-diode (OLED) display, a liquid-crystal display (LCD), a cathode-ray tube (CRT), or another type of visual display. Display 210 can be a component of a touchscreen, or can include a touchscreen. User interface 208 can include various types of output devices described above with reference to user interface 132. In some examples, the reporting engine 206 is operatively coupled to the display 210 or another output device.

User interface 208 can include a user-operable input device 212 (graphically represented as a gamepad). User-operable input device 212 can include various types of input devices described above with reference to user interface 132.

Computing device 200 can further include one or more input/output (I/O) interfaces 214 by which computing device 200 can communicate with input, output, or I/O devices (for clarity, some not depicted). Examples of such devices can include components of user interface 208 such as user-operable input devices and output devices described above with reference to user interface 132. Other examples of such devices can include power meters, temperature sensors, and other devices for measuring properties of computing device 200 or its environment or of another computing device 102 or 104 or an environment thereof. Computing device 200 can communicate via I/O interface 214 with suitable devices or using suitable electronic/software interaction methods. Input data, e.g., of user inputs on user-operable input device 212, can be received via I/O interfaces 214, and output data, e.g., of user interface screens, can be provided via I/O interfaces 214 to display 210, e.g., for viewing by a user.

The computing device 200 can include one or more sensors 216, which can represent measurement units 134 or other sensors 136, as described above with reference to FIG. 1. Sensors 216 can also include components of user interface 208. In some examples, the user interface 208 can include at least one of the sensors 216. For example, the user interface 208 can include a touchscreen that includes a sensor 216. Individual ones of the sensors 216 can be configured to output sensor data corresponding to at least one physical property, e.g., a physical property of the device, such as acceleration, or of an environment of the device, such as temperature or humidity.

The computing device 200 can include one or more processing units 218, which can represent processing units 116. Processing units 218 can be operably coupled, e.g., via the I/O interface 214, to the user interface 208 and/or the sensors 216. Processing units 218 can include, e.g., processing unit types described above such as CPU- or GPGPU-type processing units. In some examples, processing units 218 can include or be connected to a memory 220, e.g., a random-access memory (RAM) or cache.

Processing units 218 can be operably coupled to at least one computer-readable media (CRM) 222, discussed below. The processing units 218 can be configured to execute modules of the plurality of modules, e.g., stored on the computer-readable media 222. For example, the computer-executable instructions stored on the computer-readable media 222 can upon execution configure a computer such as a computing device 200 to perform acts or operations described herein with reference to the modules of the plurality of modules, e.g., modules of the inference engine 202, training engine 204, and/or reporting engine 206. The modules stored in the computer-readable media 222 can include instructions that, when executed by the one or more processing units 218, cause the one or more processing units 218 to perform acts or operations described herein with reference to the modules of the plurality of modules, e.g., modules of the inference engine 202, training engine 204, and/or reporting engine 206. Examples of modules in computer-readable media 222 are discussed below. Computer-readable media 222 can also include an operating system, e.g., operating system 122.

In the illustrated example, computer-readable media 222 includes a data store 224. In some examples, data store 224 can include data storage, structured or unstructured, such as a database (e.g., a Structured Query Language, SQL, or NoSQL database) or data warehouse. In some examples, data store 224 can include a corpus or a relational database with one or more tables, arrays, indices, stored procedures, and so forth to enable data access. Data store 224 can store data for the operations of processes, applications, components, or modules stored in computer-readable media 222 or computer instructions in those modules executed by processing units 218. In some examples, the data store can store computer program instructions 226 (e.g., instructions corresponding to apps, to processes described herein, or to other software executable by processing units 218). In some examples, the data store 224 can store a knowledge base 228 which can represent knowledge base 128, FIG. 1.

The computing device 200 can also include a communications interface 230, which can represent communications interface 130. For example, communications interface 230 can include a transceiver device such as a network interface controller (NIC) to send and receive communications over a network 112 (shown in phantom), e.g., as discussed above. As such, the computing device 200 can have network capabilities. For example, the computing device 200 can exchange data with computing devices 102 or 104 (e.g., laptops, computers, and/or servers) via one or more networks 112, such as the Internet. As discussed above, sensors 216 can include components of communications interface 230.

In some examples, the processing units 218 can access the modules on the computer-readable media 222 via a bus 232, which can represent bus 120, FIG. 1. I/O interface 214 and communications interface 230 can also communicate with processing units 218 via bus 232.

The modules of the inference engine 202 stored on computer-readable media 222 can include one or more modules, e.g., shell modules, or application programming interface (API) modules, which are illustrated as a phrase-extraction module 234, a phrase-filtering module 236, a mapping module 238, an analysis module 240, and a recommendation module 242. The word "phrase" is used in the names of modules herein for brevity and for clarity of explanation. However, this term is not limiting. The phrase-extraction module 234, the phrase-filtering module 236, and other "phrase"-processing modules herein can operate on phrases or on text segments other than phrases.

The modules of the training engine 204 stored on computer-readable media 222 can include one or more modules, e.g., shell modules, or application programming interface (API) modules, which are illustrated as a knowledge-base modification module 244 and a classification module 246.

The modules of the reporting engine 206 stored on computer-readable media 222 can include one or more modules, e.g., shell modules, or application programming interface (API) modules, which are illustrated as a reporting module 248.

In the inference engine 202, training engine 204, or reporting engine 206, the number of modules can vary higher or lower, and modules of various types can be used in various combinations. For example, functionality described associated with the illustrated modules can be combined to be performed by a fewer number of modules or APIs or can be split and performed by a larger number of modules or APIs. In some examples, the phrase-extraction module 234 and the phrase-filtering module 236; the phrase-extraction module 234, the phrase-filtering module 236, and the mapping module 238; the phrase-extraction module 234, the phrase-filtering module 236, the mapping module 238, and the analysis module 240; the recommendation module 242 and the reporting module 248; the phrase-extraction module 234, the phrase-filtering module 236, the mapping module 238, the analysis module 240, the recommendation module 242, and the reporting module 248; or the knowledge-base modification module 244 and the classification module 246 can be combined in a single module that performs at least some of the example functions described below of those modules. Such a combined module can be shared by or accessible to one or more of the inference engine 202, the training engine 204, and the reporting engine 206. In some examples, computer-readable media 222 can include a subset of modules 234, 236, 238, 240, 242, 244, 246, or 248.

Figure 3:
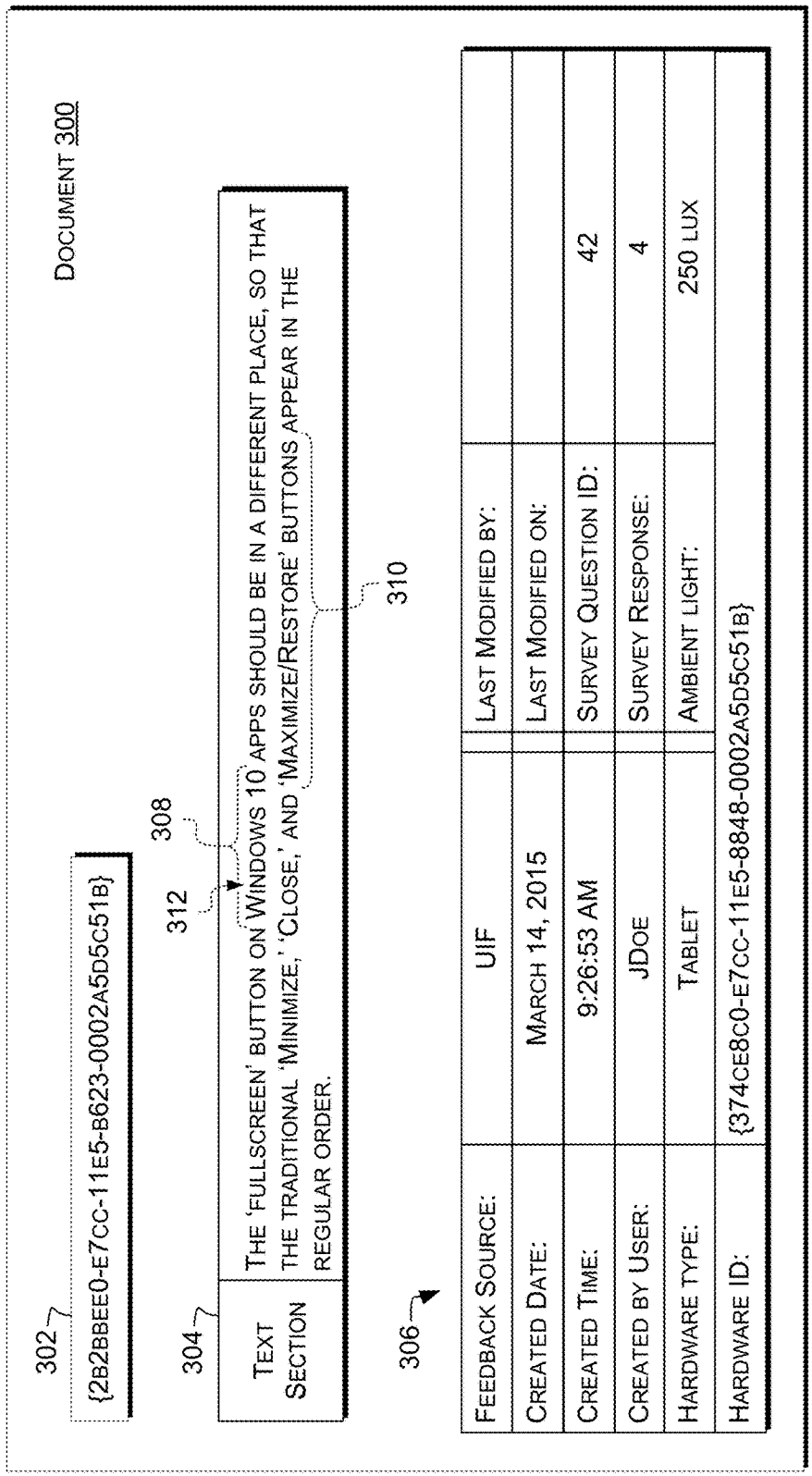
FIG. 3 shows an example document in accordance with some examples.

FIG. 3 shows an example document 300 that can represent document 108, FIG. 1, and that can be obtained by inference engine 202, e.g., from a user's computing device 104. A document 300 can be a physical or electronic document having any type of content including text (e.g., structured or unstructured (free-form)), images, audio, and so on. In some examples, document 300 can include one or more of the following: text from electronic messages such as emails; text from posts on blog or microblogging sites such as WORDPRESS or TWITTER; user feedback collected by an operating system (OS) or OS component, e.g., through feedback dialogs in MICROSOFT WINDOWS or OS X; text from blog articles, social networking sites, websites, online product reviews, or other online communications or magazine articles; blog comments; survey questions or form fields; responses to questionnaires, surveys, or review forms; whole or partial transcripts, or agent notes, of conversations between users and customer-service agents or between users and intelligent software personal assistants; text from instant messages such as via the Short Message Service (SMS) or AOL INSTANT MESSENGER (AIM); text from instant-messaging (IM) logs; user-initiated feedback (UIF) collected by systems such as WINDOWS 10, APPLE OS X, etc.; trouble documents or crash reports, e.g., collected automatically by an operating system or application; user comments provided in trouble documents or crash reports; log entries captured by an operating system or application, e.g., during normal operation or error conditions; log entries including data of user/system interactions; text captured by optical character recognition (OCR), e.g., of error dialogs presented in graphical form, or other screenshots or images of a computing environment; or text provided via customer support portals, e.g., online portals, such as those included in or associated with MICROSOFT OFFICE 365, MICROSOFT AZURE, GOOGLE DOCS, or other tools. In some examples, documents can be collected over time and analyzed for patterns, such as problems that recur whenever a user attempts to perform a particular task using a computing device.

The illustrated document 300 includes various sections relating to a particular user problem or feedback item. For example, document 300 includes a document number section 302 that includes an identifier (e.g., a unique identifier such as a globally-unique identifier, GUID) of the document 300. Document text section 304 includes free-form user text, e.g., feedback from a user in a natural language. Document data section 306 includes various data fields pertinent to the document 300. In the illustrated example, document 300 was submitted by user "JDoe" through the MICROSOFT WINDOWS User Initiated Feedback (UIF) system on Mar. 14, 2015 at 9:26:53 AM. The document 300 has not been modified since, as indicated by the blank "Last Modified by" and "Last Modified on" fields. In this example, the UIF system prompted the user to answer a survey question in addition to providing the user text in the document text section 304. The survey question asked had identification (ID) #42 in a survey question database, and the user's response to the survey question was "4" (e.g., on a scale of 1 to 5). In the illustrated example, document 300 includes the labels of the data fields (e.g., "Feedback Source") as well as the values in those data fields. In some examples, for at least one of the data fields, document 300 can include the values in those data fields but omit the labels of those data fields themselves. Similarly, a document storing survey responses can additionally include at least some the survey questions, or can omit some or all of the survey questions. In some examples in which at least some field labels (e.g., survey questions) are omitted, a document can include data associating the data values stored in the documents with the respective data fields. For example, a data value can be stored in association with an identifier of a data field, e.g., a GUID or serial number ("Survey Question ID" in the illustrated document 300).

In some examples, document data section 306 includes a "hardware type" representing the type of computing device 102 or 104 the user was using at the time the document 300 was created. In the illustrated example, the shown document 300 was created by a user using a tablet computer. In some examples, document data section 306 includes a unique identification value ("Hardware ID") of the computing device 102 or 104 the user was using at the time the document 300 was created, e.g., a GUID. In some examples, document data section 306 includes data from one or more sensors 136 of the computing device 102 or 104 the user was using at the time the document 300 was created. In the illustrated example, the shown document 300 was created by a user in a space with an ambient light level measured at the tablet of 250 lux. In some examples, the document data section 306 can include any number or type of fields providing information about the computing device or environment from or in which the document 300 was created or submitted.

In the illustrated example, certain information is reflected in relatively less structured formats than other information. For example, document data section 306 of document 300 includes numerous specific fields that can be represented directly, e.g., by corresponding database entries that represent or include the knowledge or data in those fields. In contrast, document text section 304 includes relatively less structured information, including the phrase "The 'fullscreen' button on Windows 10 apps should be in a different place."

To a trained human, e.g., a software developer, the phrase "The 'fullscreen' button on Windows 10 apps should be in a different place" can immediately convey a suggestion from user JDoe regarding the positioning of the "fullscreen" button. However, this knowledge is represented in a relatively unstructured format. In some examples, inference engine 124 can process relatively unstructured data such as document text section 304 to infer various motifs, e.g., problems such as software failures, actions such as replacing a failed power supply, or suggestions such as moving the "fullscreen" button on a WINDOWS 10 app.

In the illustrated example, the document text section 304 includes the phrase 308 "Windows 10" and the phrase 310 "maximize/restore buttons" (identified in FIG. 3 with dashed lines for clarity). Phrases 308 and 310 are used as examples in the discussion below. Solely for clarity of explanation, and without limitation, in various examples herein, phrase 308 is considered to be a phrase including a keyword 312, in this example "Windows," and phrase 310 is considered to be a phrase not previously known to the system. In some examples, a "keyword" as used herein can include a contiguous span encompassing more than one word, e.g., more than one space-delimited string of non-whitespace characters (in languages using spaces between words). For example, "Windows 10" can be a keyword 312.

Figure 4:
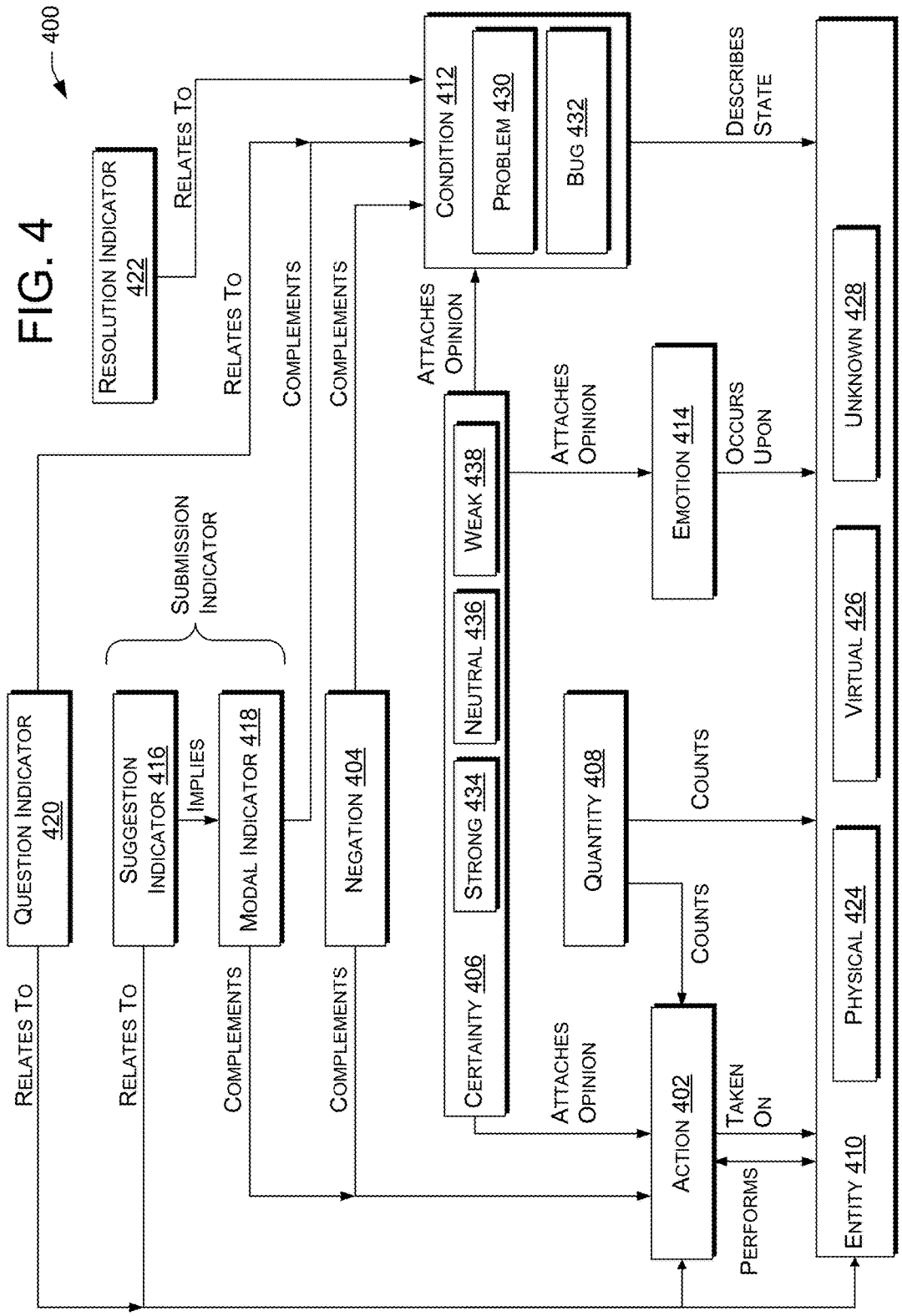
FIG. 4 shows an example ontology that can be employed in accordance with some examples.

FIG. 4 shows an example ontology 400 useful for representing the "semantic interpretation" of domain knowledge for a domain. Ontology 400 includes interconnected classes or hierarchies of classes. In some implementations, classes and subclasses in the ontology are defined and arranged in a taxonomy, as represented by nested blocks in FIG. 4. Labels on connectors indicate syntactical or grammatical interactions that are considered valid between the connected classes. Example classes that can be used in an ontology related to documents 108 are set forth in Table 1. Words or phrases corresponding to specific classes or subclasses of ontology 400 are referred to as "instances" of those classes or subclasses. In some examples, a set of classes includes some or all of the classes of ontology 400 or another ontology. Further examples of ontologies are discussed in U.S. application Ser. No. 13/535,366, entitled "Problem Inference from Support Tickets," filed on Jun. 28, 2012, and U.S. application Ser. No. 14/788,247, entitled "Utilizing Semantic Hierarchies to Process Free-Form Text", both of which are incorporated herein by reference.

TABLE 1

| Ontology Class | Describes |
| --- | --- |
| Entity | Thing that exists |
| Action | Behavior that can be caused or carried out upon, using, or by an entity |
| Condition | Describes the state of an entity |
| Resolution Indicator | Describes a change to a condition |
| Quantity | Describes the quantity of an entity/action |
| Negation | Changes the sense of a text segment to its opposite |
| Certainty | Adds strength/weakness to a phrase |
| Emotion | Feelings or beliefs held by the writer of the user text |
| Suggestion Indicator | Indicates that associated portion(s) of the user text represent suggestions, e.g., regarding items such as software or hardware |
| Modal Indicator | Indicates that an associated Action in the user text is hypothetical or desirable. |
| Question Indicator | Indicates that associated portion(s) of the user text represent questions, e.g., regarding items such as software or hardware |

The ontology can be constructed to relate the various ontology classes and subclasses according to defined interactions, and can be stored in the knowledge base 228. For example, individual word(s) or phrase(s) appearing in document(s) 108 can be mapped to the classes of an ontology. The mapping of the phrases to the ontology 400 can be stored in the knowledge base 228, e.g., as discussed below with reference to FIG. 5.

Ontology 400 can be used to express relationships between the different classes, which can provide for concise expression of pertinent information included in actionable items 110. Each class or subclass can have mapped to it one or more words or phrases and can correspond to some information provided by a document 108. In some implementations, the domain expert or other individual can select the particular class/subclass for each phrase, possibly assisted by a tool and/or partial automation.

The example ontology 400 can include one or more of the classes from Table 1, e.g., Entity, Action, Condition, Resolution, Incident, Quantity, Negation, Certainty, Emotion, Suggestion Indicator, Modal Indicator, or Question Indicator. Each class is represented by a corresponding block in FIG. 4, e.g., action class 402, negation class 404, certainty class 406, quantity class 408, entity class 410, condition class 412, emotion class 414, suggestion-indicator class 416, modal-indicator class 418, question-indicator class 420, and resolution-indicator class 422. As illustrated by the nested blocks, any particular class and its subclasses can be represented as trees or graphs of nodes in a taxonomy for that class.

Arrows and labels in FIG. 4 graphically represent relationships between individual classes consistent with the ontology 400. These relationships represent valid interactions between the ontology classes. For example, an action "taken" on an entity is a valid interaction according to the ontology 400, as shown by the arrow connecting the action class 402 to the entity class 410. Conversely, an action "taken" on a condition would not be a valid interaction according to the ontology 400 since there is no corresponding arrow illustrating such a relationship between the action class 402 and the condition class 412.

The Entity class 410 can correspond to phrases that represent an entity, i.e., a thing that exists in a real or virtual sense. In some examples, the entity can be a technical entity, such as a technical word or phrase. Examples include product names such as "XBOX," "PLAYSTATION," "LINUX," and "WINDOWS," component names such as "hard drive," and service names such as "cloud service." The entity class can include subclasses such as Physical-entity subclass 424 or Virtual-entity subclass 426. For example, a Physical Entity can be a tangible object such as an accelerometer, a gaming console. A Virtual Entity can be an intangible object such as a protocol, reference, variable, library, or method. Other examples of entities can include services, e.g., cloud services, software entities, replaceable entities, and logical entities.

In some examples, the Entity class 410 can have an "unknown-entity" subclass 428. The unknown-entity subclass 428 can be used in conjunction with sentences or other blocks of free-form user text that do not contain an identifiable entity, as described below with reference to FIG. 5. In some examples, the Entity class 410 can include subclasses such as a replaceable entity or a maintenance entity.

The Action class 402 can correspond to phrases that represent a behavior that is taken or carried out on or using an entity, or a behavior performed by an entity. Actions can include, e.g., behaviors a user is trying to accomplish with an entity or what a user expects an entity to do. Subclasses of the action class can include those that interact with an entity and/or alter the state of the entity, such as, for example, a Physical Action (e.g., replace, switch off, switch on, reboot, restart, open, etc.), a Maintenance Action (e.g., update, upgrade, downgrade, etc.), a Troubleshooting Action (e.g., test or inspect), and/or a Virtual Action (e.g., install, wipe, copy, access, animate, build, change, navigate, etc.).

The Condition class 412 can correspond to phrases that describe the state of an entity, e.g., an entity can have a faulty condition such as "illegal reference." Example conditions can include properties, modes or abnormal conditions (either physical or virtual), e.g., of an entity "failing to execute," "crashing," or "working intermittently." Words and phrases used in an instance of condition class 412 can be, e.g., subjective, e.g., "crashing," or categorical, e.g., "low" or "high." Example conditions can include problem conditions 430 (e.g., error, freeze, problem, difficult, etc.), or bug conditions 432 (e.g., representing software behavior determined to be faulty due to error in the software rather than in its environment).

The Quantity class 408 can correspond to words or phrases that count or describe the quantity of, e.g., an entity (e.g., two virtual desktops) or an action (e.g., clicked twice). Some implementations can use LowQuantity, MediumQuantity, and HighQuantity subclasses to distinguish phrases that reflect relatively low, moderate, and high quantities depending upon the context. A quantity can also be used to reflect severity, e.g., LowQuantity can correspond to a relatively minor or low volume incident whereas HighQuantity can correspond to a relatively major or high volume incident.

The Negation class 404 can correspond to text segments, e.g., words or phrases, that change the meaning of one or more other words or phrases to a substantially opposite meaning, e.g., "did not" changing "reinstalled the prior version" to "did not reinstall the prior version." The negation class can include a SyntheticNegations subclass that uses verbs or nouns to change the meaning of a condition, incident, or action, e.g., phrases such as "absence of," "declined," "denied," and the like. The Negation class 404 can also include AnalyticNegations subclass that uses "not" to change the meaning of a text segment describing a condition, incident, or action. In some examples, the Negation class 404 can also correspond to words or phrases that change the meaning of text segments describing problems, bugs, or conditions, e.g., "not" in the example phrase "ONEDRIVE is not crashing any more." In some examples, instances of the Negation class 404 can be applied to any text segment(s), e.g., individual words or phrases, to instances of other classes, or to combinations of any of those. An example is described below with reference to FIG. 10. In another example, a negation "not" can be applied to the entire phrase "losing my emails" to indicate that a problem with email loss has been resolved. Pushdown grammars can be used to parse user text, and instances of the Negation class 404 can be applied to one or more nodes of a parse tree. These examples of Negation class 404 are for purposes of illustration and are not limiting. Further examples are discussed below with reference to FIG. 10.

The Certainty class 406 can correspond to words or phrases that represent confidence of the user regarding an entity, condition, or emotion represented in the free-form user text, e.g., by adding strength or weakness to a text segment. In the example sentence "I confirm that the keyboard shortcuts work," "confirm" can be associated with the certainty class 406. The certainty class 406 can include a StrongCertainty subclass 434, e.g., phrases such as "confirm" or "affirmative" that denote certainty or high confidence. The certainty class 406 can also include a NeutralCertainty subclass 436, e.g., phrases such as "not sure." The certainty class 406 can also include a WeakCertainty subclass 438, e.g., corresponding to phrases such as "unlikely" or "doubtful" that denote uncertainty or low confidence. Note that phases in the WeakCertainty subclass can be phrases that may not explicitly indicate negative sentiment, but rather tend to be used by individuals when speculating about the nature of, e.g., a missing feature or unexpected behavior in software or hardware.

The Emotion class 414 can correspond to words or phrases that represent feelings or beliefs of the user writing the free-form user text. For example, in the sentence "MICROSOFT is great," "great" is an emotion the writer feels about the entity "MICROSOFT". Other example instances include "awesome," "lousy," "angry," "satisfied," etc. Instances of the Emotion class can occur, e.g., in "delighters," e.g., stories or other expressions of a positive experience with an entity, e.g., a product, service, or feature.

The suggestion-indicator class 416 can correspond to words or phrases that represent the presence of a suggestion. Example instances of the suggestion-indicator class 416 can include, e.g., "allow," "enable," "improve," "make it possible, "please," "you should," "should," etc.

The modal-indicator class 418 can correspond to words or phrases, such as modal auxiliaries in English, that indicate that an associated instance of the Action class 402 in the free-form user text is hypothetical or desirable. Example instances of modal-indicator class 418 can include, e.g., "it would be nice", "it would", "could," etc. In some examples, instances of the modal-indicator class 418 can include, e.g., imperative verbs such as "add," "change," or "remove." In some examples, an instance of suggestion-indicator class 416, e.g., "you should," implies or includes a corresponding instance of modal-indicator class 418, e.g., "should." As used herein, the term "submission indicator" refers to an instance of suggestion-indicator class 416 or of modal indicator class 418, or any combination thereof. In some examples, a submission indicator can indicate a problem, e.g., with hardware or software, to which the party providing the document wishes a solution. In some examples, the negation of a submission indicator can correspond to, e.g., a problem that has been resolved.

The question-indicator class 420 can correspond to words or phrases that represent the presence of a question, or words or phrases that are used to elicit information, e.g., regarding items such as software or hardware, or other, e.g., entities, actions, or conditions. Example instances of question-indicator class 420 can include, e.g., "what does this mean," "how does this work," "why is my program crashing," "how to play my videos," or "where is my program installed?"

The resolution-indicator class 422 can correspond to words or phrases that represent a resolution of a prior problem. Example instances of resolution-indicator class 422 can include, e.g., "fixed," "working," "repaired," and so on. As discussed below, the presence of a resolution-indicator class 422 instance does not necessarily imply that the problem is solved. The phrases "is working" and "is not working" both contain an instance ("working") of the resolution-indicator class 422, but are opposite in sense. In some examples, a negation of a resolution indicator can correspond to, e.g., a problem that needs to be resolved. In some examples, an instance of the modal-indicator class 418 associated with an instance of the resolution-indicator class 422, such as the phrase "should be fixed," can correspond to, e.g., a problem that needs to be resolved.

Other classes can be present. For example, a Property class can represent static, volatile, dynamic, or other properties of entities. A Privacy class can correspond to words or phrases that indicate a user's expectations or desires with respect to access to information or other entities, e.g., "personal" or "public."

Example instances of entity class 410 can include products, features, services, and components. For example, an entity class 410 may represent or include words related to a feature, product, software, or thing, such as "account," "password," "drive," "keyboard," "mouse," "screen," "computer," "phone," "interface," etc.

Example instances of condition class 412 can include states, e.g., properties, modes or (abnormal) conditions (either physical or virtual), associated with an entity, such as "failing to execute," "crashing," "working intermittently," etc. A state of an entity may be binary (e.g., up vs. down), subjective (e.g., crashing), categorical (e.g., low, high, etc.), quantitative (e.g., 'level 3') or other types, as well as their combinations. In some examples, condition instances can be associated with instances of classes for actions 402, conditions 412 (e.g., problem conditions 430 or bug conditions 432), questions 420, certainties 406, submission indicators (e.g., suggestion indicators 416 or modal indicators 418), quantities 408, emotions 414, etc.

Example instances of action class 402 may include words or phrases that represent a behavior that is taken or carried out on or using an entity, or a behavior performed by an entity, such as "click," "browse," etc.

Example instances of problem-condition class 430 may include words or phrases that represent a problem or issue with an entity, such as "crashing," "disconnected," etc.

Examples instances of a submission indicator class (e.g., instances of suggestion-indicator class 416 or modal-indicator class 418) may include words or phrases that relate to a new behavior or change in an existing behavior of an entity, such as "add new shortcut," "change API call/settings name," "remove animations," etc. For example, the suggestion-indicator class 416 may include words or phrases that relate to a feature request by a user.

Example instances of a question class 420 may include words or phrases that are used to elicit information, such as "what does this mean," or "how does this work," etc.

Example instances of an emotion class 414 may include words or phrases that represent feelings or beliefs of a user, such as "like new app interface," "find animations confusing," etc.

A domain expert or other individual can assign specific words or phrases, e.g., remaining in the post-filtered subset discussed below with reference to the phrase-filtering module 236, to one or more classes or subclasses of ontology 400. In this way, the knowledge base 128 can include a mapping of various phrases in the documents 108 to classes and/or subclasses of the ontology 400. The ontology 400 can be constructed to relate the various ontology classes and subclasses according to defined interactions and can be stored in the knowledge base 128.

FIG. 4 shows an example of a domain ontology 400. The knowledge base 228 can include one or more domain ontologies. The knowledge base 228 can additionally or alternatively include one or more global or universal ontologies covering terms in at least two domains.

Figure 5:
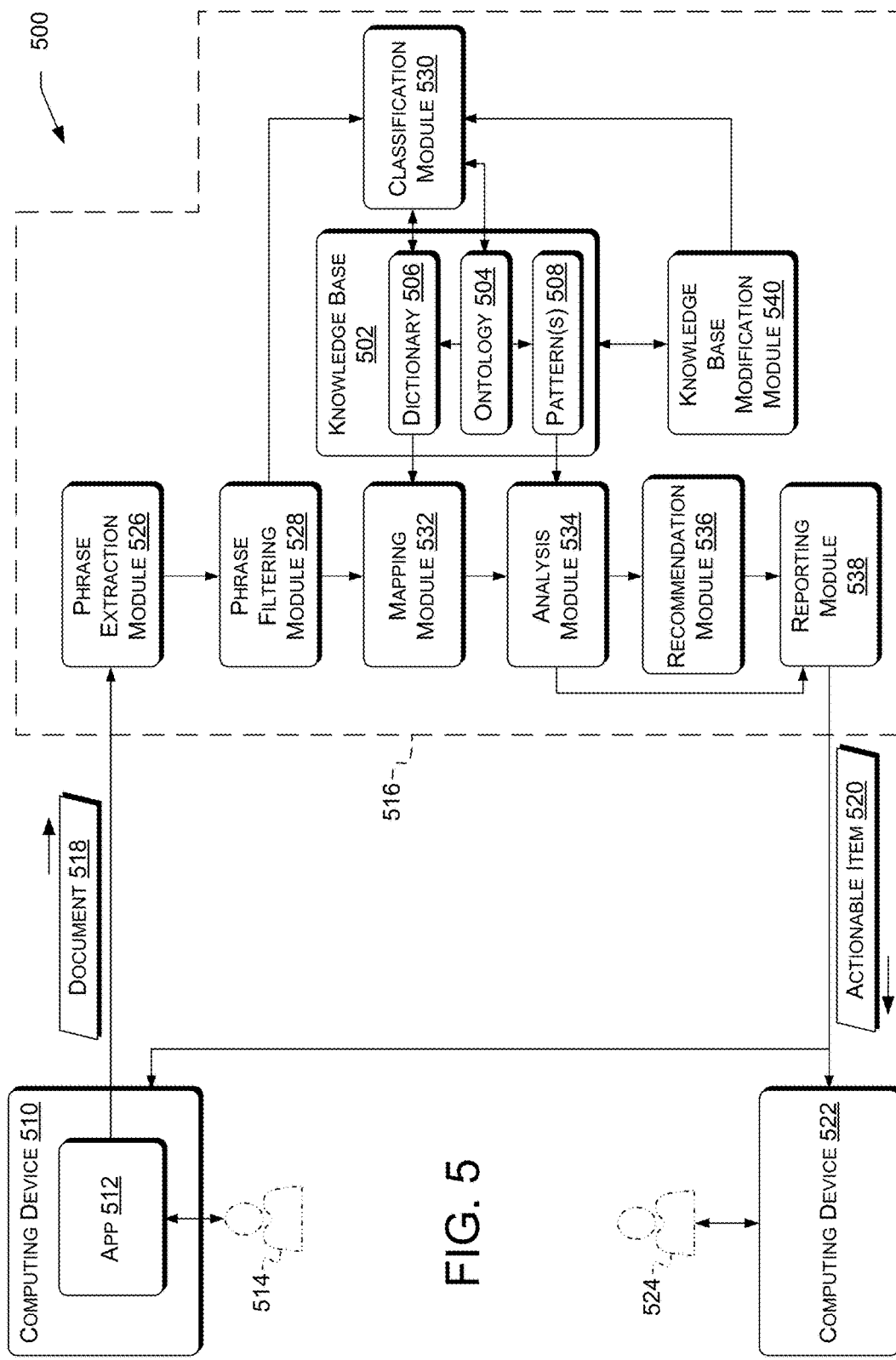
FIG. 5 is a dataflow diagram depicting example module interactions during provision of documents, text analysis of those documents, and updating of a dictionary.

FIG. 5 is a dataflow diagram 500 illustrating example interactions between the modules illustrated in FIG. 2. Modules and operations shown in FIG. 5, and also in FIGS. 6-8, as well as processing steps shown in FIGS. 9-15, can be performed in series or parallel, or can be pipelined, e.g., by the document 108 or by text segment(s) within document(s) 108, in any combination.

Some of the modules described below make use of a knowledge base 502, which can represent the knowledge base 228, FIG. 2. The knowledge base 502 can be stored on the computer-readable media 222, FIG. 2. The knowledge base 502 can include at least one of an ontology 504 (which can represent the ontology 400), a dictionary 506, and a pattern set 508 including one or more grammar pattern(s). The dictionary 506 can include a trie or other data structure or computational model mapping individual words or phrases of the free-form user text of the respective document to individual classes of a model such as the ontology 504. The pattern set 508 can include a formal grammar, e.g., a context-free grammar (CFG), or other representation of a mapping between sequences of classes of the model and motifs. Other examples of patterns in the pattern set 508 are discussed below with reference to the phrase-filtering module 528. In some examples, ontology 504 is represented implicitly in a set of classes shared at least in part between dictionary 506 and pattern set 508. "Classes" can also be referred to as "labels" that identify a function or role of the text segment in the free-form user text of a document 518. In some examples, the knowledge base 502 can also include a synonym list used to collapse various synonymous terms into a standardized term. For example, the terms "browser," "INTERNET EXPLORER" and "IE10" can each mean the same thing in the context of a software entity. In this way, entries in the synonym list for each of these terms can map to "browser," for example.

Some phrases may not be suited for use within the ontology 504, e.g., because of reduced specificity relative to other phrases. For example, in the context of suggestions for the source code of open-source projects, the phrase "handler" may lack specificity compared to the phrase "interrupt handler" for the purposes of understanding a suggestion. The phrase "interrupt handler" is more specific and provides more context for semantic interpretation. For this reason, in some implementations, the knowledge base 502 can includes phrases that are determined to be sufficiently specific for mapping to the ontology. For example, the bigram "interrupt handler" can be mapped in knowledge base 502 to a particular class and/or subclass of the ontology 504 model and the unigram "handler" can be omitted from knowledge base 502.

In some examples, a computing device 510, which can represent computing device 104, can run or otherwise host an app 512, e.g., a smartphone app, desktop application, or command-line utility. For example, the processing unit 116, FIG. 1, of computing device 510 can execute one or more program module(s) of the app 512, e.g., computer program instructions 226, FIG. 2. The app 512 can interact with a user 514 (or other entity). Via the app 512 and/or other component(s) of computing device 510, user 514 can provide a document 518, e.g., as discussed above with reference to FIG. 3. In some examples, the app 512 or other(s) component of computing device 510, can transmit and receive data such as documents 518 or actionable items 520, e.g., via an HTTP connection carrying API messages in the representational state transfer (REST) or Web Services styles.

A computing device 516, which can represent computing device 102, e.g., a computing device in cluster 106, can receive one or more document(s) 518, which can represent document(s) 108, e.g., using communications interface 230, FIG. 2 (omitted here for brevity) or another interface. The computing device 516 can determine one or more actionable items 520, which can represent actionable items 110, FIG. 1. The computing device 516 can then transmit the actionable items 520 to a computing device 522 of or associated with a user 524 (or other entity), e.g., a system administrator or manager, that is associated with management of the software or hardware that is a subject of the document 518. In some examples, the computing device 516 can additionally or alternatively transmit the actionable items 520 to computing device 510. In some examples, computing device 516, e.g., a node in a computing cluster or a cloud server, can implement at least one of modules 526, 528, 530, and 532, e.g., modules 530 and 532. Such a computing device 516 can, e.g., receive phrases of text and provide corresponding tag sentences, classes of a model, synonyms, or other information determined based at least in part on knowledge base 502.

In some examples, a phrase-extraction module 526, which can represent the phrase-extraction module 234, or another component of computing device 200, can be configured to filter documents 518 based on document metadata. For example, the phrase-extraction module 526 can be configured to process only documents having particular keywords in title or subject metadata.

In some examples, the phrase-extraction module 526 can be configured to identify various phrases (e.g., n-grams) that can appear in the document 518. For example, the phrases can be repeated patterns of linguistic elements, e.g., n-grams of length one or more that appear in multiple instances in the documents 518. The phrase-extraction module 526 can apply a two-pass phrase extraction technique to obtain a frequency estimate of n-grams in the documents 518.

In some examples, the phrase-extraction module 526 is configured to perform one or more of the processing acts described below. In some examples, text in the documents 518 can be tokenized into sentences. For example, the documents 518 can be parsed into individual unigrams (e.g., words) and delimiters such as periods, question marks, or exclamation marks can be used to identify sentences. In some examples, specified punctuation characters can be removed from the documents 518, e.g., after division into sentences. In some examples, text in the documents 518 can be divided into n-grams. In some examples, redundant phrase extraction can be performed on documents 518 via word-level compression. The phrase-extraction module 526 can use a compression algorithm to operate on the tokenized documents. For example, some implementations can use a word-level Lempel-Ziv-Welch ("LZW") or other "dictionary-based" compression algorithm to build a compression dictionary of phrases (e.g., sequences of unigrams) from the tokenized documents 518, although other compression algorithms can be used as well. Note that the compression dictionary is independent of dictionary 506 in knowledge base 502. Generally, the compression algorithm can compress the text of the tokenized documents 518 and output compressed text while building a compression dictionary of each phrase that appears in the compressed text. In some examples, the compressed output (e.g., a compressed binary) is discarded and the compression dictionary is retained for subsequent processing. The compression dictionary can include some or all sequences of phrases of any length, e.g., applying the compression to just the phrase "the regular order" from the document text section 304, FIG. 3, can result in compression-dictionary entries including "the", "regular", "order", "the regular", "regular order", "the regular order", and so on for the entire document 518. Note that some implementations can include only repeated phrases in the compression dictionary. Relatively infrequent phrases can use longer encoding since they will have less of an impact on the size of the compressed output.

The documents and the compression dictionary can then be used to perform frequency estimation of redundant phrases. The frequency estimation can be performed using a pattern matching technique such as the Aho-Corasick algorithm. For example, an ordered representation of the compression dictionary can be constructed. For example, a finite state automaton (e.g., a trie) can be used to represent the compression dictionary, with an empty string at the root, unigrams at layer 1, bigrams at layer 2, and so on. Generally speaking, the trie can be used to look up individual phrases in the compression dictionary.

Frequency estimation can be performed for individual phrases in the documents 518. For example, the frequency estimation can be performed in a single pass over the documents 518 to match phrases (n-grams) in the documents 518 to entries in the trie. The estimated frequencies can include respective frequenc(ies) with which individual entr(ies) in the compression dictionary appeared in the documents 518.

In some examples, a phrase-filtering module 528, which can represent the phrase-filtering module 236, can be configured to filter the extracted phrases from the phrase-extraction module 526 to identify a subset of the phrases that have relatively significant meaning, e.g., that may contribute to understanding the actionable item 520 or other motif in the document 518. Generally speaking, the phrase-filtering module 528 can apply filtering to the phrases identified by the phrase-extraction module 526 to eliminate certain phrases, e.g., using the frequencies estimated by phrase-extraction module 526 or other criteria. The phrase-filtering module 528 can also apply information theoretic measures to perform filtering based on computed importance of the phrases.

In some examples, phrases that appear frequently in the existing documents 518 can be useful for inferring motifs from the documents 518. For example, the phrases "microsoft windows" and "user option" may be helpful in understanding motifs in a document 518 that suggests an additional user option be added to MICROSOFT WINDOWS. In another example, a phrase such as "SQL Server 2012 R2 Enterprise Edition" may be helpful in understanding motifs in a document 518 that describes a problem with installation or operation of that specific software package. In contrast, other phrases can also appear frequently in the documents 518, but these phrases can be less useful for understanding, e.g., specific motifs in the documents 518. For example, the sentence "I love it!" may not be not helpful for identifying an actionable item 520 such as a user suggestion. In other examples, when documents 518 are emailed, stock phrases such as "in reply to" and "message forwarded on" may occur very frequently but not be directly indicative of a motif, e.g., an actionable item 520 such as a user suggestion. In still other examples, boilerplate phrases added by electronic agents, e.g., "Thank you for contacting IT support. Please call 1-800-555-1337 to contact the support team," may occur frequently but not be directly indicative of a motif.

In other examples of emailed documents 518, "reply all" messages can tend to duplicate prior conversations. This can result in some phrases appearing frequently in the documents 518 even if they do not relate directly to a motif in those documents 518. In some examples, the phrase-filtering module 528 is configured to filter out such phrases automatically while retaining other phrases that do tend to contribute to or indicate motifs in the documents 518.

In some examples, the phrase-filtering module 528 is configured to perform one or more of the processing acts described below. In some examples, repeated phrases and their frequencies can be obtained, e.g., from phrase extraction module 526. As discussed above, the phrases can include n-grams of varying lengths, e.g., unigrams, bigrams, etc., up to arbitrary lengths. Phrases can then be removed from further consideration using one or more filters.

In some examples of filters, predetermined phrases such as the "IT support" message above can be filtered out. Predetermined phrases can be, e.g., phrases on a list of literal texts, regular expressions, or other templates.

In some examples of filters, length and/or frequency filtering can be performed. For example, relatively long-length phrases tend to be "noisy" n-grams due to long repeated phrases (e.g., automated phrases) in the documents 518. Emails and frequently-repeated templates can include long phrases that appear often in the documents 518. Such phrases tend to be relative long in length, e.g., many automated emails can include phrases such as "if you need assistance outside of these hours please call the toll free number . . . " and so on. Such phrases tend to be of relatively little value in inferring motifs from a document 518. Thus, relatively long repeated phrases, e.g., over a length of 20 words, can be filtered out regardless of how many times the phrases appear in the documents 518. In some examples, n-grams in a document 518 can be ranked by a combination of length and frequency, and a predetermined number of the highest-ranking (longest and highest-frequency) n-grams can be filtered out.

In some examples of filters, relatively low-length phrases that appear with relatively low frequency can be filtered out. Examples of relatively low frequencies can include, e.g., phrases occurring in less than a certain percentage (e.g., 1%) of the documents 518 or occurring fewer than a selected of times (e.g., <10 occurrences in 1000 documents 518). These phrases can include, e.g., multiple instances of mistyped words, such as "shuold read my mnd."

In some examples of filters, unigrams, stop words or phrases, or words or phrases containing numbers can be filtered out. In some examples of filters, words phrases containing numbers can be retained for further processing.

The phrase-filtering module 528 can be configured to apply any of the above-noted filters or other filters to the identified phrases. For example, in determining user suggestions related to the APPLE IPHONE, the phrase-filtering module 528 can be configured to retain (i.e., not filter out) phrases containing numbers. This can permit distinguishing suggestions relating to products whose names differ only by a number (e.g., IPHONE 5 versus IPHONE 6).

In some examples, the phrase-filtering module 528 can be configured to perform part-of-speech processing to select phrases remaining after filtering that match predetermined (or otherwise selected) part-of-speech patterns. For example, Justeson-Katz (J-K) collocation filtering can be applied to identify phrases matching part-of-speech patterns such as [.* Adjective Noun .*], [.* Noun Noun .*], [.* Adjective Adjective Noun .*] [.* Adjective Noun Noun .*] [.* Noun Adjective Noun .*] [.* Noun Noun Noun .*] [.* Noun Preposition Noun .*], etc. Phrases matching the part-of-speech patterns can be selected and other patterns discarded.

As used herein, patterns, including part-of-speech patterns and grammar patterns, are represented textually surrounded by square brackets ("[", "]"). In the listed J-K patterns and other patterns herein, ".*" represents zero or more instances of any element, e.g., a character or word (e.g., excluding newlines). Adjacent elements are matched in order in patterns herein. The term "pattern," as used herein, is not restricted to patterns expressible with this specific form of textual representation. "Patterns" can include literal word or word-sequence matches, regular expressions, context-free grammars, context-sensitive grammars, recursive grammars, or other computational models configured to determine, for a segment of user text or tagged user text (e.g., a tag sentence, as described below), whether that user text matches or otherwise satisfies the pattern. As used herein, a "pushdown grammar" is a grammar that uses a pushdown automaton (PDA) or computational technique at least as strong as a PDA to process. For the avoidance of doubt, conventional POSIX extended regular expressions (EREs), as well as other regular-expression flavors that do not support recursive patterns, are not capable of expressing pushdown grammars (notwithstanding that a set of regular expressions recursively expanded to a selected depth before matching may be able to parse texts including submatches that nest down to that depth). In some examples, pushdown grammars can include grammars parseable by computational techniques at least as strong as a pushdown automaton, e.g., context-free grammars, context-sensitive grammars, or recursive grammars. In some examples, Perl-Compatible Regular Expressions (PCRE) or Perl 6 rules, which do support recursive patterns, can be used to parse pushdown grammars.

In some examples, the phrase-filtering module 528 can be configured to perform filtering, e.g., of the selected phrases, based on one or more information theoretic measures. For example, residual inverse document frequency (RIDF) and mutual information (MI) measures can be computed for individual phrase(s) remaining after any previously-applied filtering or selecting processing. RIDF represents a difference between the proportion of documents 518 that contain a term (e.g., a text segment such as a word or phrase) and the proportion of documents 518 that would contain the term under a random model following, e.g., a Poisson distribution. MI represents a difference between the probability of two words appearing together and the probabilities of those words appearing independently.

In some examples, the phrase-filtering module 528 can be configured to select n-grams with relatively negative MI scores (e.g., below a threshold of, e.g., −10). These words tend not to be found in standard dictionaries, e.g., because they include technical words or terms used in unconventional ways. In some examples, the phrase-filtering module 528 can be configured to select n-grams with relatively high RIDF scores, e.g., above a threshold of 4. In some examples, the phrase-filtering module 528 can be configured to select n-grams with both relatively negative MI and relatively high RIDF scores. In some examples, phrases with negative MI and high RIDF tend to be domain-specific phrases that do not appear in conventional dictionaries and can be added to dictionary 506, e.g., a domain-specific dictionary, for further processing. Words or phrases not selected can be discarded, in some examples.

In some examples, the phrase-filtering module 528 can be configured to select words or phrases with high RIDF (e.g., above a threshold of 4) and positive MI (e.g., above a threshold of 0.0) from the documents 518. These words or phrases can include words that are part of a general vocabulary (e.g., words found in a conventional English dictionary). Such phrases tend to be included in sentences and can be useful for motif inference, subject/object differentiation, and/or other subsequent processing discussed herein. Words or phrases not selected can be discarded, in some examples.

In some examples, words or phrases determined by the phrase extraction-module 526 or the phrase-filtering module 528 can be provided to mapping module 532 or classification module 530. Such words or phrases can include words or phrases located in the free-form user text (e.g., from document text section 304) of a single document 518, at least one document 518, or a plurality of documents 518. In some examples, the phrase-filtering module 528 can be configured to additionally or alternatively determine characteristic pattern(s) associated with respective word(s) or phrases(s) of the free-form user text. For example, the characteristic pattern for a text segment can include a tag sentence, as described below, a sequence of part-of-speech tags, or other forms described herein.

In some examples, a classification module 530, which can represent the classification module 246, can be configured to determine an association between a first text segment, e.g., a word or phrase in the free-form user text, and a first individual class of a model, e.g., of ontology 504. The classification module 530 can determine the association, e.g., based at least in part on a characteristic pattern associated with the first text segment. Examples are discussed below with reference to FIGS. 6-15. The classification module 530 can update the dictionary 506 to include the association.

In some examples, the classification module 530 is configured to determine a particular text segment that is not associated with a stored dictionary 506 of the knowledge base 502 and that is present in one(s) of the plurality of documents 518. For example, the classification module 530 can take as input words or phrases from the phrase-filtering module 528 that are not found in the dictionary 506. In this example, the dictionary 506 includes respective attribute(s) for individual one(s) of the words or phrases in the dictionary 506, in addition to the classes to which those words or phrases map. Some examples of attributes include, but are not limited to, part(s) of speech of word(s) or of word(s) in phrase(s), identification of which of the Justeson-Katz patterns a phrase matches, spatial relationships between words in a phrase, context(s) in which a phrase can occur (e.g., before or after a verb), stems of word(s), e.g., in a phrase (e.g., "run" for "running"), synonyms of word(s), e.g., in a phrase, order of selected words in a phrase, e.g., words considered to be important based on, e.g., RIDF or MI scores, or distances between ones of the selected words.

In some examples, the classification module 530 is configured to determine one or more respective attribute(s) of the particular text segment. For example, the classification module 530 can determine parts of speech or other one(s) of the attribute(s) listed above, e.g., using techniques described herein with reference to the phrase-extraction module 526 and the phrase-filtering module 528. The determined attribute(s) of the particular text segment can be arranged, e.g., as a "feature vector" expressing values of the attribute(s) in a predetermined order.

In some examples, the classification module 530 is configured to update the dictionary 506, e.g., to associate, in the dictionary 506, the particular word with a particular class of the model based at least in part on the one or more attribute(s) of the particular text segment and one or more of the attribute(s) of individual one(s) of the words or phrases in the dictionary 506. For example, the classification module 530 can provide the feature vector to a neural network or other classifier and receive a particular class of the model. The classification module 530 can then update the dictionary 506 to record an association between the particular text segment and the particular class of the model. The classification module 530 can also store at least some of the determined attribute(s), e.g., the feature vector, in the dictionary 506 as attribute(s) of the particular text segment. In some examples, the classification module 530 can store, as an attribute of the particular text segment, an indication that the class was determined automatically rather than being provided by a human domain expert. In some examples, the classification module 530 can provide information about words, phrases, attributes, and mappings to the knowledge-base modification module 540. In some of these examples, the knowledge-base modification module 540 can then make changes to the knowledge base 502.

In some examples, the classifier provides a confidence value or other indication of the confidence of the class determination based on the feature vector. In some of these examples, the classification module 530 is configured to compare the confidence value to a predetermined threshold. If the confidence value is below the predetermined threshold, the classification module 530 can transmit or present an indication of the particular text segment, e.g., to a domain expert. The classification module 530 can additionally transmit at least some of the attribute(s) of particular text segment, the user text in which the particular text segment occurred, or other information that can be helpful to the domain expert in assigning a class to the particular text segment. The classification module 530 can then receive, e.g., from the domain expert via a user interface, a class for the particular text segment. That class can be a class newly added to the model (ontology 504) for this particular text segment, or can be an existing class in the ontology 504.

Other examples of determination of words or phrases not found in dictionary 506, and of assigning classes to those words or phrases, are discussed below with reference to FIGS. 6-15. In some examples, the classification module 530 can be configured to carry out processes as described below.

In some examples, a mapping module 532, which can represent the mapping module 238, can be configured to receive individual words or phrases of the free-form user text of the individual ones of the plurality of documents 518 including free-form user text. The mapping module 532 can map one(s) of the received individual words or phrases to individual classes of a model, e.g., an ontology 400 or 504. For example, the individual classes can include a question-indicator class 420, an emotion class 414, or other classes described herein or otherwise defined in a model. In some examples, the mapping module 532 can determine synonyms of ones of the individual words or phrases, e.g., using dictionary 506, as described above. The mapping module 532 can then determine at least some of the individual classes of the model based at least in part on the synonyms instead of, or in addition to, the individual words or phrases. In a nonlimiting example given above, the dictionary 506 can be configured to map "browser," "INTERNET EXPLORER" and "IE10" to the synonym "browser." The mapping module 532 can then determine the classes using the word "browser" to avoid an over-specified mapping, or using both "browser" and the original word to provide more specificity.

The terms "mapping" and "tagging" are used interchangeably herein to describe techniques or processes for associating classes with words or phrases. A particular text segment can have one or multiple tags, i.e., can be associated with one or more classes of the model. For example, the word "should" can be associated with both the suggestion indicator class 416 and the modal indicator class 418, both FIG. 4. In some examples, the mapping module 532 can determine a collection of class(es) of the model associated with individual word(s) or phrase(s) of the free-form user text based at least in part on the association determined by the classification module 530. As used herein, the term "collection" refers to an individual item or group of multiple items.

The model can include one or more classes such as those described above with reference to FIG. 4, e.g., a suggestion-indicator class. As used herein, the term "tag sentence" refers to a sequence of tags corresponding to some or all of the free-form user text, arranged in the same order in which the corresponding words or phrases are presented in the user text. A tag sentence is not required to correspond to a complete sentence in the user text. In some examples, individual tag(s) in a tag sentence can be associated with corresponding words or phrases. Tag sentences are represented in this document as quoted lists of <text segment>/<class> pairs, e.g., "ball/Entity bounce/Action" for the sentence "the ball bounces." In some examples, a tag sentence can be represented as a list of one or more pairs, each pair including a word or phrase and an associated ontology class.

In some examples, the mapping module 532 can be configured to determine, for individual sentence(s) or other delimited subsets of the free-form user text, whether an entity (a text segment of entity class 410) is present in that sentence or other subset. In some of these examples, if no entity is present, the mapping module 532 can add to the tag sentence an unknown-entity class 428, even in the absence of a specific word or phrase with which to associate the unknown-entity class 428.

For example, in the sentence "if it could work better, that would be great," the subject, "it," is a stopword and so is filtered out in this example. As a result, no instance of entity class 410 is expressly identified in the sentence. The result of the phrase-extraction module 526, the phrase-filtering module 528, and the mapping module 532 can be the tag sentence "could/Modal-Indicator work/Action would/Modal-Indicator great/Positive-Emotion." Since no entity is present in this tag sentence, the mapping module 532 can add an instance of the unknown-entity subclass 428 to provide to the analysis module 534 the tag sentence, e.g., "-/Unknown-Entity could/Modal-Indicator work/Action would/Modal-Indicator great/Positive-Emotion" or "work/Action would/Modal-Indicator great/Positive-Emotion-/UnknownEntity could/Modal-Indicator," where "-" represents the instance of the unknown-entity subclass 428.

In some examples, an analysis module 534, which can represent the analysis module 240, can be configured to identify motifs expressed in the documents 518. For example, analysis module 534 can determine, for individual ones of the plurality of documents, corresponding user suggestions (text corresponding to a suggestion motif). The user suggestions can be, e.g., suggestions regarding software or hardware, suggestions regarding an update to a software or hardware element, suggested action(s) to be taken to improve an entity, or suggestions regarding an item, e.g., a product, machine, service, or any of those sold via electronic commerce.

In some examples, the analysis module 534 can be configured to identify actionable items 520, i.e., selected motifs found in user feedback or other free-form user text. For example, the analysis module 534 can be configured to determine an actionable item 520 associated with the at least one document 518 based at least in part on the collection of class(es) determined by the mapping module 532 and at least one grammar pattern, e.g., of the pattern set 508. The analysis module 534 can provide the actionable item 520 or an indication thereof to, e.g., the recommendation module 536 or the reporting module 538.

User feedback may be identified as including an actionable item 520 when a particular motif is associated with the user feedback. An actionable item 520 may generally include a problem motif, a suggestion motif, a question motif, or other motif that may require attention of a user (e.g., an administrator or other user 524). For example, if the analysis module 534 determines that a sentence is associated with a problem motif, the analysis module 534 may determine that the sentence relates to an actionable item 520 (e.g., a problem). To illustrate, a sentence that states "These account settings are confusing" may be associated with a problem for an account entity (e.g., problem motif—(account settings)/Entity followed by (confusing)/ProblemCondition). Here, the sentence is flagged as including an actionable item so that an administrator of the account settings may address the problem. In some examples, the actionable item 520 can include a user suggestion regarding software or hardware, e.g., "my computer should levitate" (computer/Entity should/Suggestion-Indicator levitate/Action).

Analysis module 534 can identify these motifs, e.g., actionable items 520, FIG. 1, for example user suggestions, based at least in part on a comparison of the mapped words or phrases for the respective document to a predetermined (or otherwise selected, and likewise throughout) grammar pattern, e.g., stored in the pattern set 508. For example, analysis module 534 can identify these motifs based at least in part on individual one(s) of the mapped words or phrases for the respective document 518 that match a predetermined grammar pattern or on mapped words or phrases of the respective document match the predetermined grammar pattern for a motif, e.g., a suggestion motif. Example grammar patterns can express relationships between classes in a tag sentence such as proximity or order. These relationships can be expressed, e.g., using CFGs or other grammars, e.g., regular expressions that treat tags as atomic rather than characters of text and that can thus be applied to tag sentences. In some examples, analysis module 534 can apply the predetermined grammar patterns to the tag sentences, e.g., to the mapped classes and subclasses corresponding to the user text. In some examples, the pattern set 508 can be updated dynamically, e.g., to add, remove, or modify patterns, during analysis of a user text or between analyses of two user texts.

In some examples, the analysis module 534 or other component(s) of the computing device 516 are configured to identify set(s) of one or more of the mapped words or phrases that correspond to the predetermined grammar pattern. In some of these examples, the predetermined grammar pattern is associated with a motif representing an actionable item 520, e.g., a user suggestion. In some examples, the predetermined grammar pattern can define a first class of the model preceding a second class of the model. In some examples, the predetermined grammar pattern can indicate that a suggestion-indicator class 416 (the first class) followed by an entity class 410 (the second class) corresponds to a motif representing an actionable item 520, e.g., a user suggestion such as a sentence beginning "It would be nice if WINDOWS . . . ".

In some examples, the predetermined grammar pattern can indicate that a modal-indicator class 418 (the first class) followed by an entity class 410 (the second class) corresponds to a motif representing an actionable item 520, e.g., a user suggestion such as "add/Modal-Indicator new shortcut/Entity," "change/Modal-Indicator API/Entity call or settings name," or "remove/Modal-Indicator animations/Entity." In some examples, the predetermined grammar pattern for the suggestion motif defines a first class of the ontology 504 preceding a second class of the ontology 504. The first class or the second class in some of these examples comprises a suggestion-indicator class 416 for words or phrases that represent presence of a suggestion in the free-form text of document(s) 518.

Example grammar patterns for various motifs are listed in Table 2. Square brackets surround patterns, parentheses denote grouping, and vertical bars ("|") denote alternation, i.e., matching any of the options separated by the vertical bars in a particular group. The mapping module 532 can be configured, in some examples, to apply one or more of the example patterns in Table 2 to the tag sentence or tagged text from the phrase-filtering module 528. In an example, the tagged sentence "HALO/Entity should/Modal-Indicator teleport/Action me in real life" matches the pattern in the first row of Table 2 since it has a group of an instance of modal-indicator class 418 followed by an instance of action class 402, and that group follows an instance of entity class 410.

TABLE 2

| Motif | Example Pattern |
|---|---|
| Suggestion | [.* (Modal-Indicator .* Action | Suggestion-Indicator) .*] preceding or following [Entity] |
| Suggestion | [Submission-Indicator] preceding or following [Entity] |
| Suggestion | ([Submission-Indicator] preceding or following [Entity]) followed by [Action] |
| Problem | [Problem-Condition | Condition | Negation .* Action] |
| Problem | [Entity] preceding or following [Problem-Condition] |
| Action | [Entity] preceding or following [Action] |
| Question | [Entity] preceding or following [Question-Indicator Action | Question-Indicator Problem-Condition] |
| Question | [Entity] preceding or following [Question-Indicator Negation .* Action] |

In some examples, the patterns can include subpatterns, or subpatterns can be used to compose a higher-level pattern in a recursive manner. For example, [Entity] can represent [Virtual-Entity|Physical-Entity|Replaceable-Entity|Maintenance-Entity]. In another example, [Submission Indicator] can represent [Suggestion-Indicator|Modal-Indicator].

In some examples, the analysis module 534 is configured to query the dictionary 506 using one(s) of the words or phrases from the phrase-filtering module 528. The dictionary 506, e.g., implemented using a trie or hash map, can provide class(es) of the model, e.g., ontology 504. The identified occurrences of the words or phrases can be tagged, e.g., in the free-form text or in sentences extracted therefrom, according to the provided class(es).

In some examples, the analysis module 534 is configured to process the tagged text of the documents to identify valid interactions according to the ontology 504. Document(s) 518, or individual sentence(s) in document(s) 518, can be filtered out if they do not include valid interactions according to the ontology 504. Examples of valid interactions are discussed above with reference to FIG. 4.

In some examples, the analysis module 534 is configured to infer motifs from the tagged sentences, e.g., those not filtered out based on interactions. Nonlimiting examples of motifs can include Problems, Actions, or Suggestions. Problems can identify a particular entity (e.g., operating system or hard drive) and associated state, condition, or symptoms (e.g., crash or defective). Actions can identify actions performed by or on an entity, e.g., to improve or alter the state of the entity, such as rebooting a computer or restarting an application. Suggestions can identify user suggestions, e.g., regarding improvement of hardware or software, e.g., "make it more reliable" or "allow font sizes of 6.14 points."

Note that the Action motif is different from the action class 402 of the ontology 400. The Action motif is an inferred meaning obtained from a given document 518, whereas the action class 402 is a way of identifying selected words or phrases in the dictionary 506. A document 518 containing a text segment tagged with the Action class 402 may or may not include text corresponding to the Action motif.

In some implementations, the analysis module 534 can be configured to match certain grammar patterns to the tagged sentences to identify the motifs. For example, the analysis module 534 can use different grammar patterns for each of the types of motifs, e.g., Problems, Actions, or Suggestions. The grammar patterns can be built using the classes or subclasses of the model, e.g., ontology 504. Examples are discussed above with reference to Table 2.

In some implementations, the analysis module 534 can analyze both unstructured data such as free-form text in the documents 518 and structured data from the documents 518 and/or other data. In some examples, structured data from a document 518 (e.g., Survey Question ID or Survey Response from document data section 306, FIG. 3) can be appended to the free-form text and analyzed as discussed above. In some examples, structured data can be tagged by mapping module 532 and tested against grammatical patterns in pattern set 508.

In some examples, inferred motifs can be verified against data in the document data section 306, e.g., a flag indicating that a suggestion is present in the document text section 304 of a given document 300. For example, the analysis module 534 can be configured to compare motifs directly extracted from structured data to motifs inferred from free-form text to see if the motifs match. In some examples, the analysis module 534 can be configured to infer the motifs based at least in part on data external to the documents 518, e.g., automatic-upgrade cycles of software entities or batch numbers of parts used in hardware entities. For example, the analysis module 534 can determine that a Suggestion motif is present using more relaxed grammar patterns during the week following a software rollout than in subsequent weeks.

In some examples, a recommendation module 536, which can represent the recommendation module 242, can be configured to analyze individual ones of the actionable items 520 (e.g., user suggestions) from analysis module 534 to generate one or more actionable items 520, e.g., recommendation(s). The recommendation(s) can, e.g., relate to an update to the software or hardware. The recommendation module 536 can determine the actionable item(s) 520, e.g., as the top-ranked one or more items in a ranked list of the actionable items 520. The recommendation module 536 can determine the actionable item(s) 520, e.g., based on the number of times a particular actionable item 520 has been determined. For example, the number can indicate the number of times a user suggestion has been made in (e.g., determined by the analysis module 534 for or with respect to) the plurality of documents 518. The recommendation module 536 can be configured to make this determination, e.g., based on metadata associated with actionable items 520 (e.g., a count of "Like" or "Me Too" comments on a user feedback site), or based on relative priorities of the entities identified in the actionable items 520. In a nonlimiting example of relative priorities, actionable items 520 related to an operating system, such as WINDOWS, might be higher or lower priority than actionable items 520 related to an application program such as OFFICE in various example configurations of recommendation module 536.

In some examples, a reporting module 538, which can represent the reporting module 248, can be configured to present or transmit an indication of at least one actionable item 520, e.g., provided by the analysis module 534. Additionally or alternatively, the reporting module 538 can be configured to present or transmit an indication of the actionable item 520, e.g., provided by the recommendation module 536. For example, the reporting module 538 can be configured to send the recommendation to a computing device 522 of a user 524 that is associated with management of the software and/or hardware, as discussed above. The reporting module 538 can additionally or alternatively transmit indication(s) of one or more of the actionable item(s) 520 from the analysis module 534. For example, the reporting module 538 can include or communicate with a database front-end or Web server to provide dashboard or other user-interface representations of actionable item(s) 520 or 520.

In some examples, an actionable item 520 includes a ranking of the actionable items 520, e.g., based on selected ranking criteria. In some of these examples, a first actionable item 520 (e.g., a first user suggestion) is ranked higher than a second actionable item 520 (e.g., a second user suggestion) when the first actionable item 520 occurs more frequently in the plurality of documents 518 than does the second actionable item 520. In some examples, an actionable item 520 includes a ranking determined based at least in part upon ranking criteria that can include at least some of: pre-defined knowledge, specific top-k actionable items (k∈ $\mathbb{Z}$), or which user or data channel was the source of the document 518 including the suggestion.

In some examples, a knowledge-base modification module 540, which can represent the knowledge-base modification module 244, is configured to determine a first text segment in the free-form user text. For example, the knowledge-base modification module 540 can determine a text segment not represented in the dictionary 506 of the knowledge base 502. The knowledge-base modification module 540 can then determine that the first text segment has a threshold level of similarity to a second, different text segment represented in the dictionary 506 of the knowledge base 502. The threshold level of similarity can be, e.g., a subset relationship or a specified Hamming distance in tokens. For example, the phrase "SQL SERVER 2012" is a subset of the phrase "SQL SERVER 2012 R2 ENTERPRISE EDITION." In this example, the knowledge-base modification module 540 can determine that the former has the threshold level of similarity to the latter. The knowledge-base modification module 540 can then replace the second text segment in the dictionary 506 of the knowledge base 502 with the first text segment. This can permit reducing the memory consumption and computational load of the dictionary 506 while retaining accuracy in identification of motifs in documents 518, or balancing accuracy and memory consumption. For example, the level of specificity or generality of words or phrases in the dictionary 506 of the knowledge base 502 can be adjusted, e.g., to provide effective detection of motifs in a given set of documents 518.

In some examples, the knowledge-base modification module 540 is configured to add, for individual words mapped to at least one class of the model, at least one of one or more synonyms of the respective word or one or more lexical or morphological forms of the respective word to a knowledge base 502 dictionary 506 associated with the model. A morphological form of a term can include, e.g., a stem of a term plus any endings (suffixes) of the stem (e.g., for a stem of "confuse"—"confusing," "confused," "confuses," "confusion," etc.). In an example, the dictionary 506 includes the word "work" associated with the condition class 412. The knowledge-base modification module 540 can use a stemming algorithm or other information to add "working," "works," and "worked" to dictionary 506 so that those forms map to the same class as the word "work." In some examples, the knowledge-base modification module 540 can add past- or future-tense forms of present-tense entries, plural forms of singular entries (or vice versa), or other grammatical variants or spelling variants ("gray" vs. "grey") of terms to the dictionary 506.

In some examples, the reporting module 538 can be configured to generate various forms of output that represent the processing by the analysis module 534 or the recommendation module 536. For example, the reporting module 538 can transmit data of or indicating an actionable item 520 or a ranking of the actionable items 520 to the computing device 522, as discussed above. This can, e.g., facilitate a decision relating to an update of software or hardware identified as an instance of entity class 410 in the document(s) 518.

In some examples, the reporting module 538 can generate various visualizations, e.g., graphical interfaces, that reflect motifs inferred by the analysis module 534. The graphical interfaces can reflect individual user suggestions or trends across multiple suggestions. The reporting module 538 can provide interface options such as menu selections to filter by product name, product model (e.g., WINDOWS 7 versus WINDOWS 10 or GMAIL beta versus GMAIL non-beta), or other fields to identify particular properties of suggestions that are obtained from the documents 518. The reporting module 538 can also implement a queryable application programming interface (API), e.g., a REST, Web Services, or other API, to allow other modules (e.g., third-party software) to access the output.

In some examples, the reporting module 538 can provide a graphical representation of a motif tree showing the motif(s), ontology classes and subclasses, and words or phrases found in one or more document(s) 518. Such a tree can show how the motif(s) were identified. The reporting module 538 can present the motif tree as part of a graphical user interface that allows a user to interact with the motif tree. For example, users can move the mouse cursor over a given node and the immediate parent and sibling nodes can be highlighted. This can be useful, for example, for helping users quickly grasp the significance of relatively complicated motif trees.

In some examples, the reporting module 538 can provide a graphical representation of trends across multiple documents 518, e.g., by showing a "tag cloud" of entities or a view showing icons indicating, e.g., by their size or color, how frequently particular words or phrases, classes, or motifs occur in the analyzed documents 518. Example icons can include circles sized relative to the number of instances of individual motifs extracted from the documents 518. The graphical representation can include or be presented accompanying selectable user options to view analyses of documents 518 at user-specified levels of granularity.

In some examples, an entity 514, e.g., a user, can receive actionable item 520, e.g., via an app 512 or other component of, or executing on, computing device 510. Examples are discussed above. In some examples, entity 514 can provide feedback information the system can use to improve the accuracy and utility of the output. In some examples, entity 514 can provide an indication of text in a document for which actionable item 520 should have been identified, in the judgment of entity 514, but for which the system did not identify actionable item 520. For example, app 512 can present at least part of a document via a user interface. The user interface can additionally present a prompt, such as "select the portion of the document you believe should be acted on." The user interface can permit entity 514 to highlight, circle, touch, or otherwise indicate text or other contents of the document. App 512 can then transmit feedback information of at least the indicated portions to the system.

In some examples, app 512 can, e.g., via a user interface, receive indications from entity 514 that multiple technical phrases in at least one document refer to the same entity or other ontology-class instance. For example, the user interface can present document(s) and receive touches, drags, or other inputs indicating synonyms or relationships between words or technical phrases. For example, app 512 can receive input from entity 514 indicating that the words "XB1" and "XBOX ONE" occurring in one or more document(s) represent the same entity. Indications of synonyms or other associations can be provided as feedback information.

In some examples, app 512 can permit entity 514 to annotate or modify actionable item 520 or outputs of intermediate stages of processing. For example, document 518 can include the text "start is crashing." Actionable item 520, or the output of mapping module 532, can include the tagged words "start/Entity" and "crashing/State." App 512 can present these tagged words (or phrases) and receive modified tags or text, e.g., from entity 514. For example, entity 514 may, via a user interface provided by app 512, modify the text to read "start of an app is crashing," and modify the tag sentence to indicate "app/Entity startup-crashing/Condition." The modified text and tag sentence can be provided as feedback information.

In some examples, feedback information such as described in the preceding paragraphs can be provided, e.g., to knowledge-base modification module 540. Module 540 can adjust knowledge base 502 based at least in part on at least some of the feedback information. In an example in which knowledge base 502 includes at least one machine-learned computational model, e.g., a neural network, module 540 can add the feedback information to a training dataset or otherwise update the training dataset based at least in part on the feedback information. The inputs associated with the feedback information can include document 518 or other information used in determining the module output(s), e.g., output(s) of at least one of modules 526, 528, 530, 532, 534, or 536, or actionable item 520, with which the feedback information is associated.

Illustrative Processes

Figure 6:
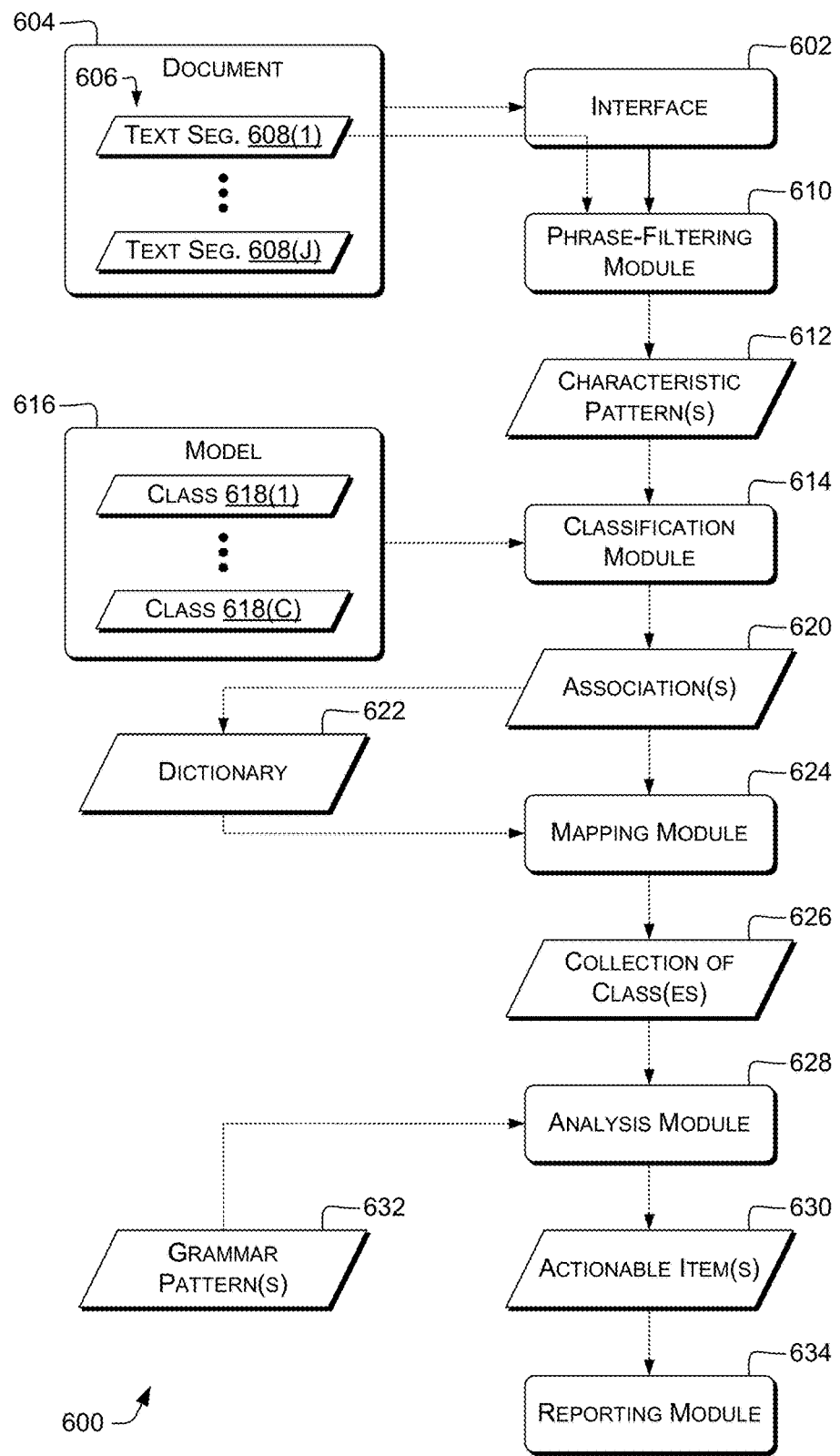
FIG. 6 is a dataflow diagram that illustrates an example process for determining actionable item(s), and example data items.

FIG. 6 is a dataflow diagram that illustrates an example process 600 for determining actionable item(s), and example data items. For clarity, process flows are shown using solid or dash-dot lines, and data flows, or process flows that coincide with data flows, are shown using stippled lines.

Example functions shown in FIG. 6 and other flow diagrams, dataflow diagrams, and example processes herein can be implemented on or otherwise embodied in one or more computing devices 102 or 104, e.g., using software running on such devices. For the sake of illustration, the example process 600 is described below with reference to processing unit 218 and other components of computing device 200, FIG. 2, and to ontologies, dataflows and operations discussed above with reference to FIGS. 4 and 5, that can carry out or participate in the steps of the example method. However, other processing units such as processing unit 116 and/or other components of computing devices 102 or 104 can carry out steps of described example processes such as process 600. Similarly, example methods or dataflows shown in FIGS. 7-9 and 11-15 are also not limited to being carried out by any particularly-identified components.

The order in which the operations are described in each example flow diagram, dataflow diagram, or process is not intended to be construed as a limitation, and any number of the described operations can be combined in any order and/or in parallel to implement each process. Moreover, the operations in each of FIGS. 6-9 and 11-15 can be implemented in hardware, software, and/or a combination thereof. In the context of software, the operations represent computer-executable instructions that, when executed by one or more processors, cause one or more processors to perform the recited operations. For example, modules and other components described below can be stored in a memory, e.g., computer-readable media 222, and executable by at least one processor, e.g., processing unit(s) 218, to perform the described functions. In the context of hardware, the operations represent logic functions implemented in circuitry, e.g., datapath-control and finite-state-machine sequencing functions.

In some examples, interface 602 can receive at least one document 604, which can represent document 108. Document 604 can include text segment(s), e.g., free-form user text 606. Interface 602 can represent, e.g., communications interface(s) 130, FIG. 1, such as a memory interface or network interface. Interface 602 can provide document 604 or free-form user text 606 to phrase-filtering module 610, e.g., via phrase-extraction module 234 (omitted for brevity). In the illustrated example, free-form user text 606 includes one or more text segment(s) 608(1)-608(J) (labeled "text seg.", and individually or collectively referred to herein with reference 608), where J is any integer greater than or equal to 1. Text segment(s) 608 can include or represent, e.g., words or phrases. For clarity of explanation, and without limitation, a text segment 608(1) is described in some examples below as phrase 310, FIG. 3, "maximize/restore buttons".

In some examples, a phrase-filtering module 610 can determine a characteristic pattern 612 associated with a text segment 608, e.g., a first word or phrase, in the free-form user text 606. The phrase-filtering module 610 can represent phrase-filtering module 236, FIG. 2. For example, the characteristic pattern 612 can include (or represent, and likewise throughout the following discussion) a part-of-speech (PoS) pattern, e.g., a Justeson-Katz pattern such as those described above or another sequence or structure of parts of speech. In some examples, the characteristic pattern 612 can include a dependency tree expressing relationships between words, e.g., in the Universal Dependencies set. In some examples, case (upper or lower) or punctuation can be represented in the characteristic pattern 612, or can be omitted therefrom. In a nonlimiting example, the characteristic pattern 612 of phrase 310 can include the PoS pattern "<noun> <noun> <plural-noun>", i.e., two singular nouns followed by a plural noun (abbreviations are in Table 4, below).

In some examples, a classification module 614 can receive or otherwise operate in conjunction with a model 616 including one or more classes 618(1)-618(C) (individually or collectively referred to herein with reference 618), where C is any integer greater than or equal to 1. Classification module 614 can represent classification module 246, FIG. 2. Model 616 can represent, e.g., ontology 400 or 504.

The classification module 614 can be configured to determine an association 620 between a first text segment (e.g., word or phrase), e.g., text segment 608(1), in the free-form user text 606 and a first individual class of the classes 618 of the model 616. For purposes of explanation, without limitation, the first individual class is described in some examples below as class 618(1). The classification module 246 can determine the association 620 based at least in part on the characteristic pattern 612 associated with the first word or phrase. In some examples, as noted above, the characteristic pattern can include a part-of-speech (PoS) pattern. The classification module 614 can determine the association 620 based at least in part on a reference PoS pattern, e.g., as discussed below with reference to decision block 702. In some examples, the classification module 614 can store the association 620 in a dictionary 622, which can represent, e.g., dictionary 506. In the example of phrase 310, "maximize/restore buttons," the classification can indicate that characteristic pattern 612 is associated with the Entity class 410. Therefore, the association 620 can be "maximize restore buttons→Entity" (in an example in which case and punctuation are not significant).

In some examples, the phrase-filtering module 610 and the classification module 614 can use a pushdown grammar or other representation to determine characteristic patterns 612 or associations 620. For example, the STANFORD parse of the user text illustrated in document text section 304, FIG. 3, includes "compound" universal-dependency edges from "Maximize/Restore" to "Minimize" and from "Maximize/Restore" to "Close," an "nsubj" edge from "appear" to "buttons," and an "nmod" edge from "appear" to "Maximize/Restore." That is, "buttons" is the subject of the verb "appear," and "buttons" is modified by the compound of "Minimize," "Close," and "Maximize/Restore" in this example. The phrase-filtering module 610 or the classification module 614 can use these edges to determine that "minimize button", "close button", and "maximize/restore button" are separate phrases, e.g., using tree-matching techniques such as those described herein. The phrase-filtering module 610 can determine respective characteristic patterns for the phrases, and the classification module 614 can determine respective associations 620 for the phrases.

In some examples, the characteristic pattern can include at least one of a co-occurrence relationship, a residual inverse document frequency (RIDF) value, a term-frequency (TF) value, an inverse document frequency (IDF) value, or a mutual information (MI) value.

In some examples, a mapping module 624 can determine a collection 626 of class(es) 618 of the model 616 associated with a first document 604 based at least in part on the association 620. The mapping module 624 can determine the collection 626 based at least in part on a text segment(s) 608 (e.g., word(s) or phrase(s)) of the first document 604, e.g., text segment 608(1). The collection 626 can include, e.g., a tag sentence. In some examples, the mapping module 624 can retrieve one or more of the class(es) 618 from the dictionary 622 and include at least one of those class(es) in the collection 626. Examples of determination of classes using a dictionary such as dictionary 506 or 622 are discussed above with reference to dictionary 506 and mapping module 238. In some examples, the mapping module 624 can determine, e.g., based at least in part on the association 620, respective collections of class(es) 618 of the model 616 associated with individual document(s) 604, e.g., based at least in part on text segment(s) 608, e.g., individual word(s) or phrase(s), of the free-form user text 606 of the respective document(s) 604. For example, the mapping module 624 can process each document 604 individually. The mapping module 624 can process each text segment 608 individually, in some examples.

In some examples, as discussed above, individual class(es) 618 of the model 616, e.g., classes 618 in collection 626, can include at least one of: a suggestion-indicator class 416 or a modal-indicator class 418 for text segment(s) 608 that represent the presence of a suggestion, an entity class 410 for text segment(s) 608 that represent an entity, an action class 402 for text segment(s) 608 that represent a behavior that is taken on an entity, a certainty class 406 for text segment(s) 608 that represent the confidence of the user regarding an entity or condition represented in the free-form user text 606, an emotion class 414 for text segment(s) 608 that represent feelings or beliefs of the user writing the free-form user text 606, or a negation class 404 for text segment(s) 608 that change the meaning of one or more other text segment(s) 608 as described above, e.g., to a substantially opposite meaning.

In some examples, an analysis module 628 can determine an actionable item 630 associated with the at least one document 604 based at least in part on the collection 626 and at least one grammar pattern 632. The analysis module 628 can represent analysis module 240, FIG. 2. The actionable item 630 can represent actionable item 520, FIG. 5. The grammar pattern 632 can be, e.g., included in pattern set 508. Examples of determining actionable items such as actionable items 520 or 630 are discussed above with reference to pattern set 508, actionable items 520, and analysis module 240. Further examples of actionable-item determination are discussed below with reference to FIG. 10.

In some examples, the analysis module can determine that the collection 626 corresponds to the selected grammar pattern 632. For example, the selected grammar pattern 632 can define a pushdown grammar over a plurality of classes 618 of the model 616. In some examples, the pushdown grammar comprises at least one negation relationship, e.g., an instance of Negation class 404, between at least two classes 618 of the plurality of classes 618 of the model 616. For example, a pushdown grammar of grammar pattern 632 can correctly distinguish "The program is crashing" from "The program is not crashing," even though both have the same noun ("program") and verb form ("crashing"). The negation relationship can identify the "not" in the latter sentence. An example is discussed below with reference to FIG. 10.

In some examples, a reporting module 634 can present or transmit an indication of the actionable item 630. The reporting module 634 can represent reporting module 248, FIG. 2, with reference to which examples of presenting or transmitting indications are described above. For example, the indication can include or represent, e.g., a recommendation, suggestion, question, issue, or other actionable item described herein.

Figure 7:
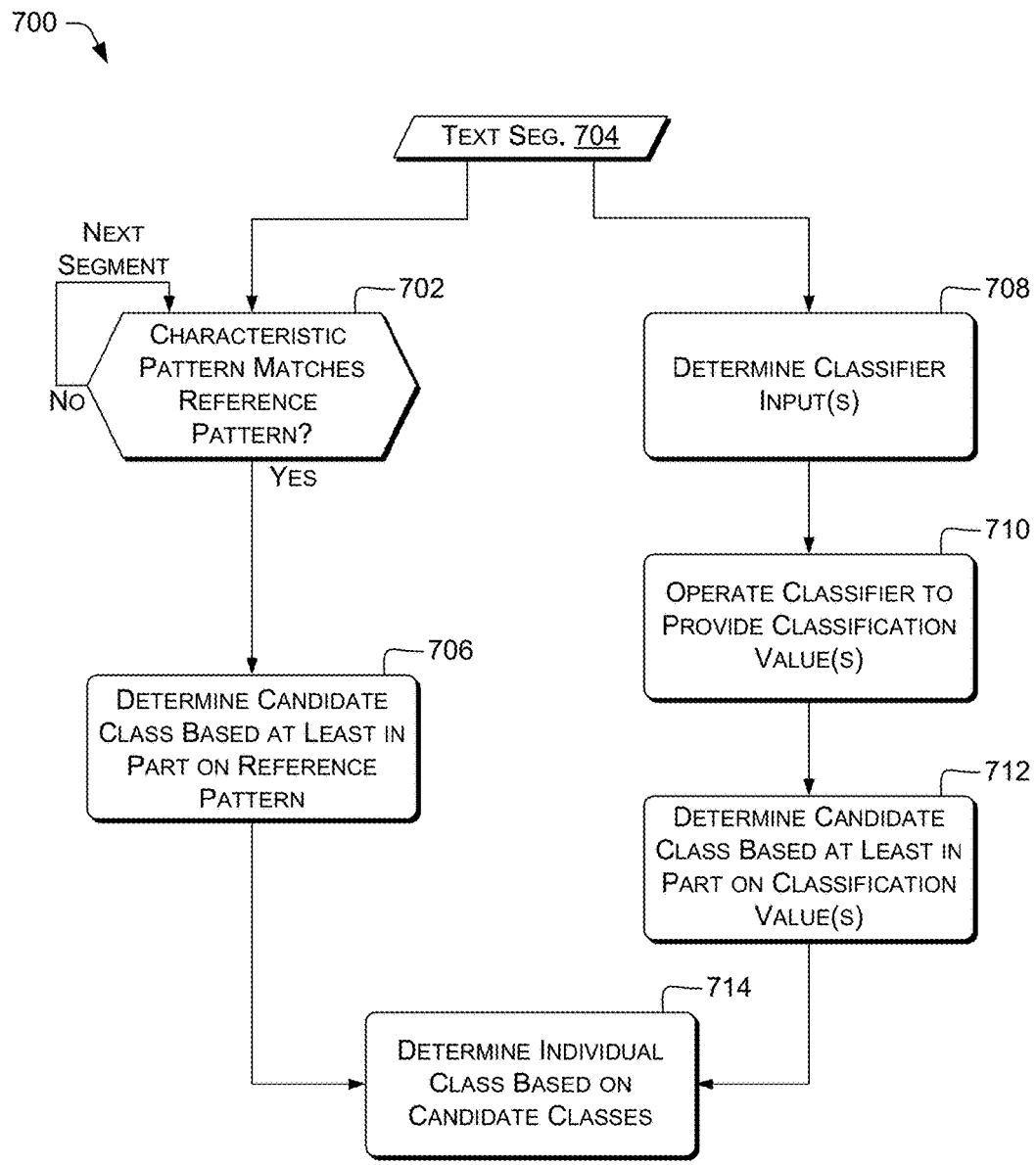
FIG. 7 is a flow diagram that illustrates example processes for determining association(s) between items of user text and class(es) of a model.

FIG. 7 is a flow diagram that illustrates example processes 700 for determining association(s) between items of user text and class(es) of a model. Illustrated operations can be performed, e.g., by classification module 246 or 614.

In some examples, at decision block 702, it can be determined whether the characteristic pattern 612, e.g., of a text segment 704, corresponds to a reference pattern. Text segment 704 can represent text segment 608, such as a word or phrase. In some examples in which the characteristic pattern 612 includes a part-of-speech (PoS) pattern, decision block 702 can include determining whether the PoS pattern matches a reference PoS pattern, or matches one or more of a plurality of reference PoS patterns. If so, decision block 702 can be followed by block 706. If not, decision block 702 can await another text segment 704 to process ("Next Segment").

In some examples, at block 706, the first individual class 618 of the model 616, e.g., a first candidate class, can be determined based at least in part on the reference PoS pattern. In some examples, at block 706, the first individual class 618 can be retrieved from a stored mapping indexed by at least one of the characteristic pattern 612 of the text segment 704 or the reference PoS pattern. The mapping can be stored, e.g., in CRM 222 or another memory or storage device described herein. For example, the stored mapping can include lookup table (LUT) or other structure including data items such as those described in Table 3. Abbreviations used in Table 3 are defined in Table 4, which shows, for each abbreviation, the corresponding Penn Treebank PoS tag. Other examples are discussed below.

TABLE 3

| Index (Characteristic or Reference Pattern) | Model Class |
|---|---|
| [<adjective> <noun>] | Entity |
| [<adjective> <plural-noun>] | Entity |
| [<noun> <noun>] | Entity |
| [<noun> <past-verb>] | Action |
| [<noun> <past-verb> <noun>] | Action |
| [<noun> <plural-noun>] | Entity |
| [<plural-noun>] | Entity |

TABLE 4

| Abbreviation | Penn Treebank PoS Tag |
|---|---|
| <noun> | NN |
| <plural-noun> | NNS |
| <past-verb> | VBD |
| <adjective> | JJ |

In some examples, at block 708, at least one classifier input can be determined based at least in part on text segment 704, e.g., a word or phrase (and likewise throughout this paragraph). For example, block 708 can include determining a portion of the free-form user text 606 within a selected distance of the text segment 704. The distance can be measured in, e.g., bytes, characters, words, sentences, paragraphs, pages, or other units. The portion can have any length. Additionally or alternatively, block 708 can include determining a stemmed version (or versions) of the text segment 704. For example, block 708 can include operating at least one of the Porter, Lancaster, or Snowball stemming algorithms on at least one word of the text segment 704 to provide respective stemmed version(s) of the text segment 704. Additionally or alternatively, block 708 can include determining respective degree(s) of correspondence between the characteristic pattern 612 and at least one reference pattern. For example, block 708 can include determining whether the characteristic pattern 612 corresponds respectively to individual ones of the patterns in Table 3 or other patterns.

In some examples, at block 710, a classifier can be operated to provide a classification value based at least in part on the at least one classifier input. In some examples, any of the classifier input(s) determined at block 708 can be used. In some examples, the characteristic pattern can be used as a classifier input. The classifier can include, e.g., a One-vs.-All two-class decision forest classifier, a Support Vector Machine (SVM) classifier, a multilayer perceptron trained for classification, or another classifier.

In some examples, at block 712, the first individual class 618 of the model 616, e.g., a second candidate class, can be determined based at least in part on the classification value. In some examples, the classification value is, includes, or otherwise directly indicates the first individual class 618. For example, the classification value can be 0 for Entity, 1 for Action, 2 for Negation, and so forth. In other examples, the first individual class 618 can be determined using the classification value and other information.

In some examples, at block 714, the first individual class 618 of the model 616 can be determined based one or more candidate class(es), e.g., based at least in part on the first and second candidate classes described above with reference to blocks 706 and 712, respectively. In some examples, block 706 can determine a first candidate class of the model and block 712 can determine a second candidate class of the model. In some examples, block 714 can include comparing the first candidate class of the model to the second candidate class of the model. If the first candidate class matches the second candidate class, the first individual class 618 can be determined to be either the first candidate class or the second candidate class. In an example, if both candidates are, e.g., a Condition class 412, the first individual class 618 can be determined to be a Condition class 412.

In some examples, e.g., if the first candidate class does not match the second candidate class, a confidence value provided by the classifier and associated with the second candidate class can be compared with a predetermined threshold. If the confidence value exceeds the threshold, the first individual class 618 can be determined to be the second candidate class from the classifier (blocks 708-712). If not, the first individual class 618 can be determined to be the first candidate class from the pattern-matcher (blocks 702, 706).

In some examples, the first candidate value and the second candidate value can be stored, e.g., in a training dataset. In some examples, an indication of the first candidate value and the second candidate value can be presented to a user, e.g., a domain expert, and input of a corresponding individual class can be received. The corresponding individual class can be stored in the training data, which can then be used to train the classifier. This can improve the performance of the classifier (block 710).

Figure 8:
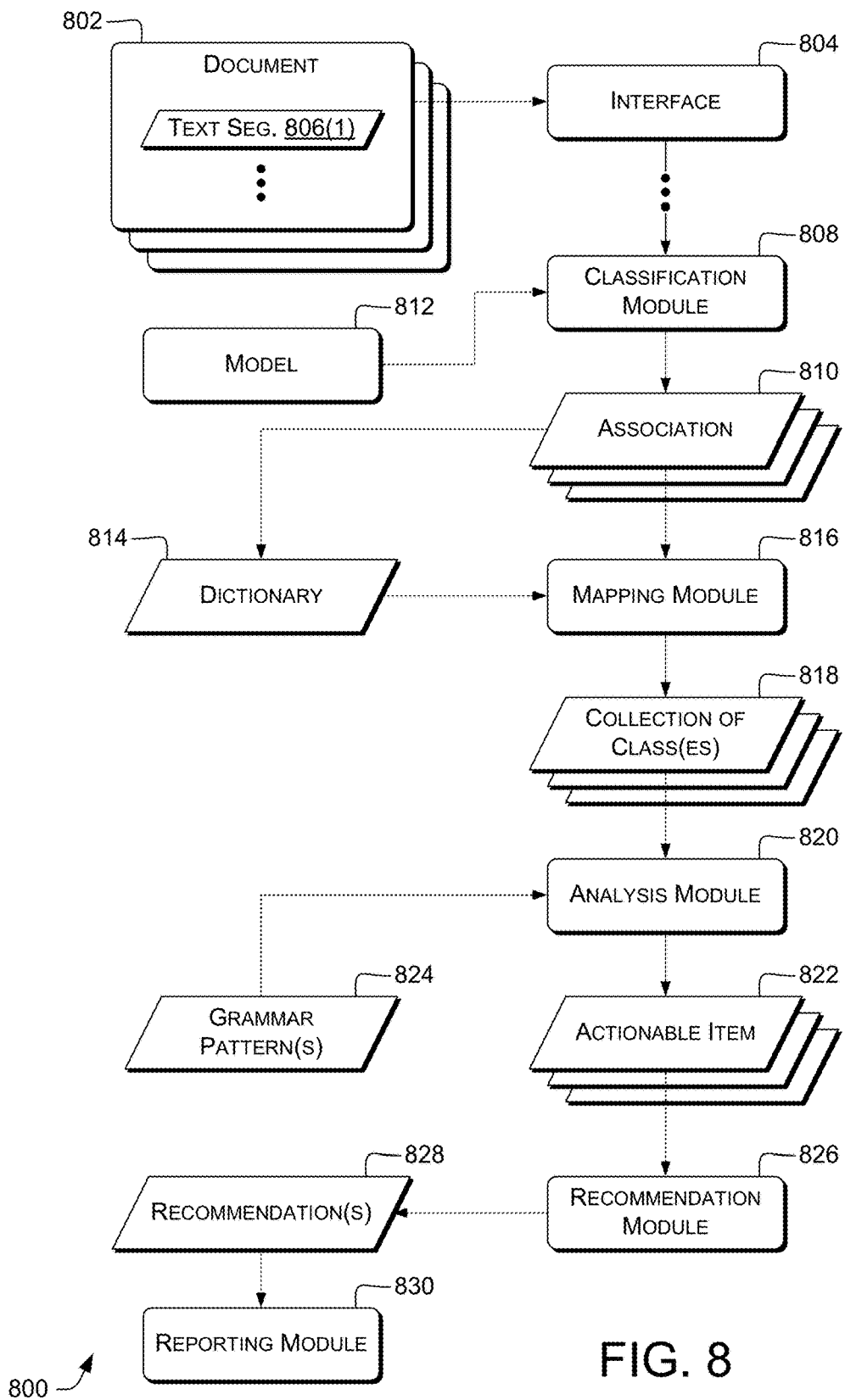
FIG. 8 is a dataflow diagram that illustrates an example process for determining actionable item(s), and example data items.

FIG. 8 is a dataflow diagram that illustrates an example process 800 for determining actionable item(s), and example data items. Diagram conventions are as discussed above with reference to FIG. 6. In the illustrated example, the at least one document 802, which can represent document 108, comprises a plurality of documents 802. Interface 804, which can represent interface 602, can receive text segments 806, which can represent text segments 608, from at least two of the plurality of documents 802. For brevity of illustration, without limitation, only text segment 806(1) is shown.

A classification module 808, which can represent classification module 614, can determine, e.g., at least one association 810, which can represent association 620, based at least in part on one of the documents 802, or can determine respective association(s) 810 for individual one(s) of the plurality of documents 802. The classification module 808 can determine the association(s) 810 based at least in part on a model 812, which can represent model 616. The classification module 808 can store at least one, or all, of the association(s) 810 in the dictionary 814, which can represent dictionary 622.

In some examples, a mapping module 816, which can represent mapping module 624, can determine respective collections 818 associated with individual documents 802 of the plurality of documents 802. Individual collections 818 can be determined, e.g., as described above with reference to collection 626.

In some examples, an analysis module 820, which can represent the analysis module 628, can determine respective actionable items 822 associated with individual documents 802 of the plurality of documents 802 based at least in part on the respective collections 818. Individual actionable items 822 can be determined, e.g., as described above with reference to actionable item 630, e.g., based at least in part on at least one grammar pattern 824, which can represent grammar pattern 632. In some examples, after processing of one document 802 by analysis module 820, interface 804 can receive another document 802 for processing.

In some examples, the analysis module 820 and/or other illustrated components can determine respective actionable items associated with individual documents through an iterative process. For example, operations discussed herein, e.g., with respect to parts 804, 806, 808, 810, 812, 814, 816, 818, 820, 822, and/or 824, can be performed individually for individual documents 802 of a plurality of documents. Operations can be performed serially for one document at a time, in batch, staged (e.g., determining associations 810 for multiple documents, then determining collections 818 for those documents), pipelined, or in other arrangements. The term "iterative" does not require a strict sequential processing of one document 802 at a time, although such a processing organization can be used.

In some examples, a recommendation module 826, which can represent recommendation module 242, can analyze individual one(s) of the actionable items 822 to generate a recommendation 828. Examples are discussed above, e.g., with reference to actionable item 520 and recommendation module 242. In some examples, the recommendation 828 can include, e.g., priority values of respective actionable items 822. For example, the recommendation 828 can include indications of actionable items 822 in a ranked order, and the priority values can be the order of the items. Additionally or alternatively, separate priority values, e.g., integers or real numbers, can be included in the recommendation 828 in association with respective actionable items 822.

In some examples, the recommendation module 826 can determine the recommendation 828 comprising a ranking of at least a first actionable item and a second actionable item of the actionable items 822. The first actionable item can occur more frequently in the plurality of documents 802 than the second actionable item, and can thus be ranked higher in the recommendation 828 than the second actionable item. This can permit, e.g., presenting the recommendation 828 including ranked responses to a search query.

In some examples, a reporting module 830, which can represent reporting module 248, can present or transmit an indication of the recommendation 828. Examples are discussed above, e.g., with reference to actionable item 520, recommendation module 242, and reporting module 248. For example, the reporting module 830 can present or transmit an indication of at least one of the respective priority values.

Figure 9:
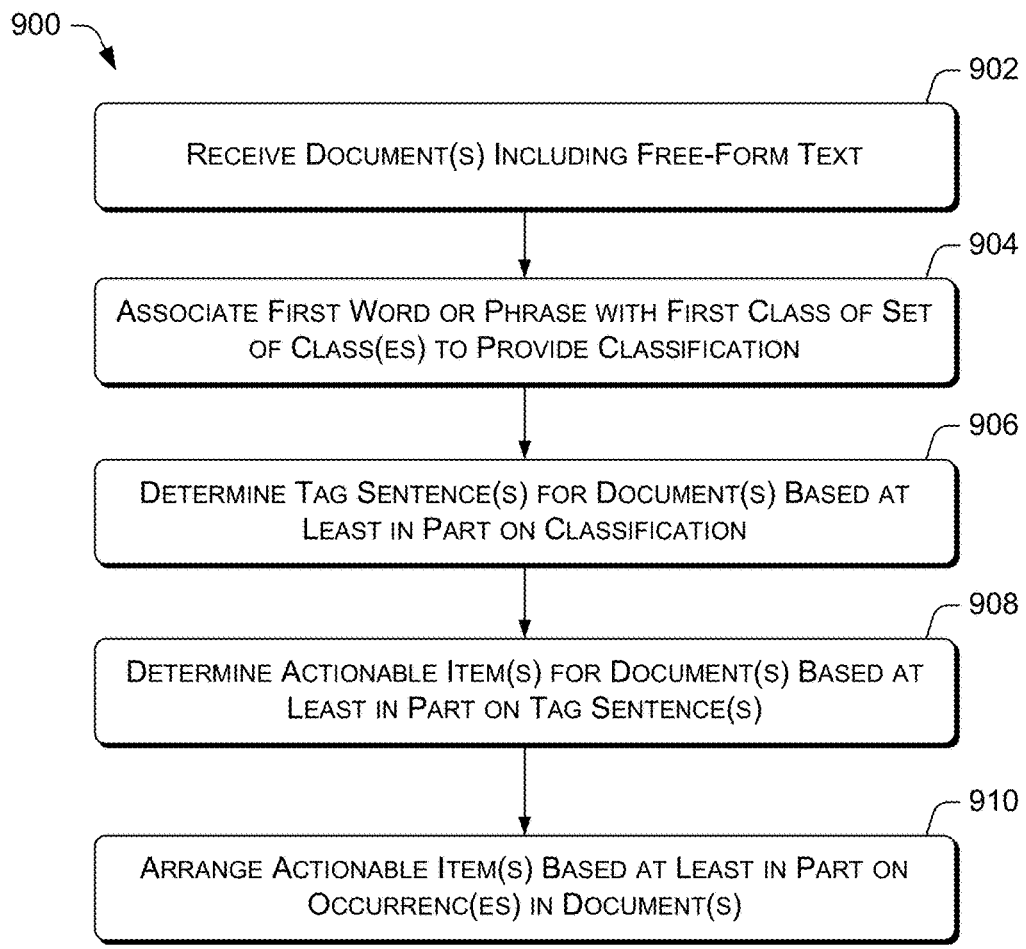
FIG. 9 is a flow diagram that illustrates an example process for ranking actionable items.

FIG. 9 is a flow diagram that illustrates an example process 900 for ranking actionable items. Illustrated operations can be performed, e.g., by a computing device such as computing device 200.

In some examples, at block 902, a plurality of documents can be received. Individual ones, e.g., at least two, of the plurality of documents can include free-form user text 606. The free-form text can include, e.g., feedback from a user in a natural language. Examples are discussed above, e.g., with reference to interface 602 and communications interface(s) 130. In some examples, block 902 can include receiving a document corpus comprising a plurality of text segments associated with respective documents of the document corpus.

In some examples, at block 904, a first word or phrase (or other text segment 608) of the free-form user text 606 of at least one document 108, e.g., a first document, of the plurality of documents 108 can be associated with a first class 618 of a set of classes to provide a classification. The association can be based at least in part on a characteristic pattern 612 associated with the first text segment 608. The set of classes can be or can be included in, e.g., model 616 or other models described herein, e.g., ontology 400 or 504. Examples are discussed above, e.g., with reference to classification module 246 or 614 or FIGS. 5-8. Functions described above with reference to the phrase-extraction module 234 or the phrase-filtering module 528 can be performed in order to provide, or as a prerequisite to providing, the classification, in various nonlimiting examples.

In some examples, the set of classes includes at least one of an entity class 410 for text segment(s) 608 that represent an entity, an action class 402 for text segment(s) 608 that represent a behavior that is taken on an entity, a certainty class 406 for text segment(s) 608 that represent the confidence of the user regarding an entity or condition represented in the free-form text, an emotion class 414 for text segment(s) 608 that represent feelings or beliefs of the user writing the free-form text, or a negation class 404 for text segment(s) 608 that change the meaning of one or more other text segment(s) 608 as described above. Examples are discussed above, e.g., with reference to FIG. 4.

In some examples, at block 906, respective tag sentence(s) can be determined for individual document(s) 108 of the plurality of documents 108, e.g., for a first document 108 and a second document 108. Examples of tag sentences are discussed above, e.g., with reference to FIG. 5. Functions described above with reference to the phrase-extraction module 234, the phrase-filtering module 528, or the mapping module 238 can be performed in order to provide the tag sentence(s). Examples of determining tag sentence(s) are discussed above, e.g., with reference to the mapping module 238 or 624. For example, the determining of tag sentences ("tagging") can be based at least in part on a stored dictionary 506 mapping text segment(s) 608 to one(s) of the set of classes, and the stored dictionary 506 can include the classification, as described above with reference to dictionary 622.

The tag sentence(s) can be determined based at least in part on the classification from block 904. An individual tag sentence can be associated with a respective text segment 608, e.g., a respective word or phrase of the free-form user text 606, of the respective document 108. An individual tag sentence can also be associated with a respective collection 626 of class(es) 618, the class(es) 618 being class(es) 618 of a set of classes such as model 616. In the example of phrase 310, "maximize/restore buttons," the classification can indicate that phrase 310 is associated with the Entity class 410. Accordingly, the tag sentence can include "'maximize/restore buttons'/Entity".

In some examples, at block 908, actionable items 630 can be determined for respective individual documents 108 of the plurality of documents 108, e.g., for the first document 108 and for the second document 108. Individual actionable items 630 can be determined based at least in part on the tag sentences associated with the respective document 108. Additionally or alternatively, multiple actionable items 630 can be determined for an individual document 108. Examples of determining actionable items 630 are discussed above, e.g., with reference to analysis module 240 or 628. For example, the actionable items 630 can include, e.g., suggestions or questions.

In some examples, the actionable items 630 can be determined based at least in part on the tag sentence(s) or other tagged text segment(s) 608 for the respective document, e.g., as described above with reference to the analysis module 240. For example, the computing device 102 can determine, for individual ones of the plurality of documents, that the tagged text segment(s) 608 of the respective document match a stored grammar pattern for a particular motif. Motifs can be represented by grammar patterns of classes of a set of classes. The set of classes can include at least one of the classes discussed above with reference to FIG. 4.

In some examples, it can be determined that the respective tag sentence of at least one document 108 matches a stored grammar pattern comprising a first class 618(1) of the set of classes associated with a second class 618(21) of the set of classes. The first class 618(1) can include negation class 404 and the second class can include a condition class 412. Such a tag sentence can indicate resolution of a problem. An example is discussed below with reference to FIG. 10.

In some examples, at block 910, the respective actionable items 630 for the individual documents 108 of the plurality of documents 108, e.g., the first document 108 and the second document 108 can be arranged in an order, e.g., based at least in part on occurrences of the actionable items 630, e.g., individual ones of the actionable items 630, from (e.g., in) the plurality of documents 108, or based at least in part on other ranking criteria described herein. Examples are discussed above, e.g., with reference to recommendation module 242 or 826 or actionable items 520.

In a nonlimiting example, the first document 108, and three other documents 108 of the plurality of documents 108, can be associated with the actionable item "popups should not steal focus when I am typing in a dialog box." The second document 108, and ten other documents 108 of the plurality of documents 108, can be associated with the actionable item "my videos won't play." The order can thus place "my videos won't play" before "popups should not steal focus . . . " since the former occurs in eleven documents 108 and the latter occurs in only four documents 108.

Figure 10:
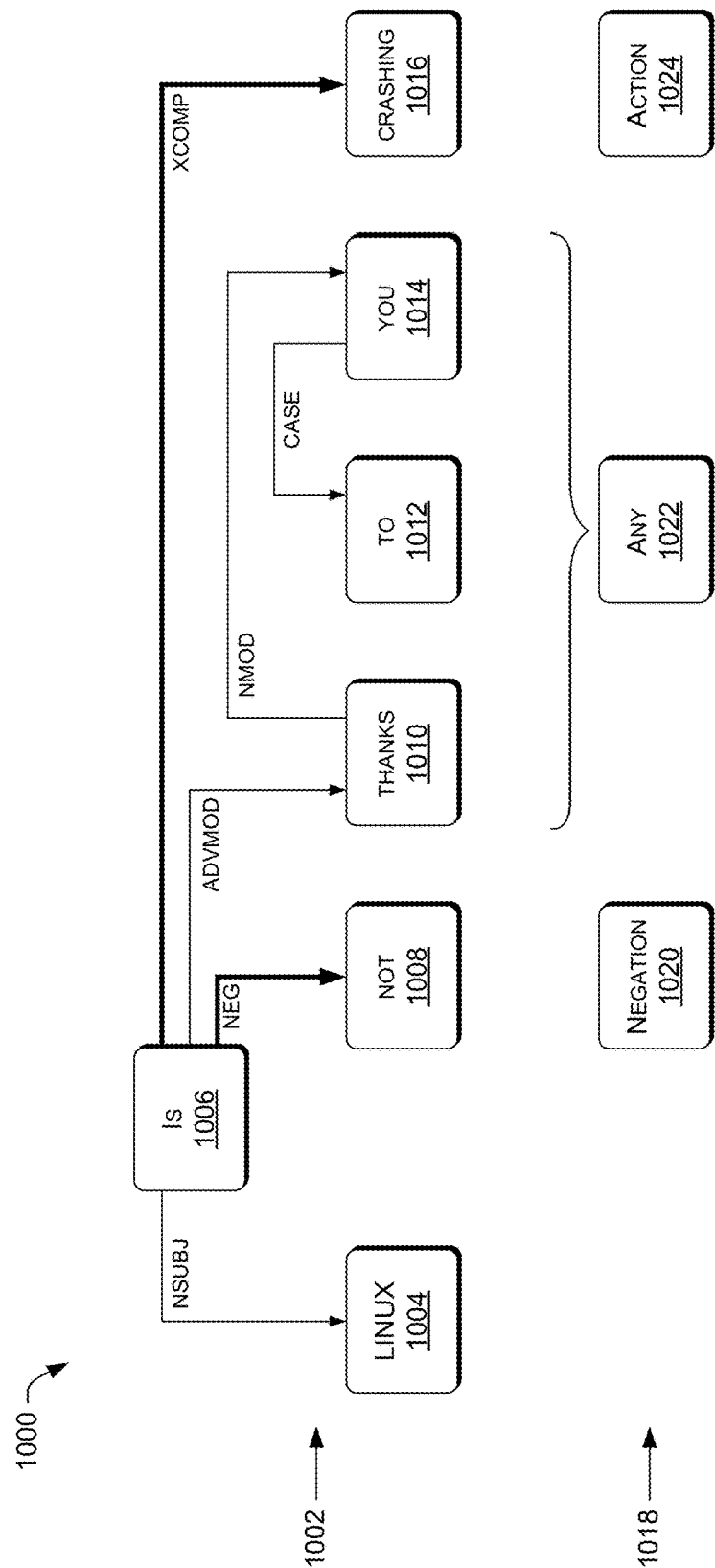
FIG. 10 shows two example parses of an example sentence.

FIG. 10 shows parses 1000 of an example sentence. The sentence is "LINUX is not, thanks to you, crashing." Boxes represent nodes. Parse 1002 is a dependency parse of the sentence, and arrows are labeled with the corresponding Universal Dependency relationships. The nodes are "LINUX" 1004, "is" 1006, "not" 1008, "thanks" 1010, "to" 1012, "you" 1014, and "crashing" 1016.

Parse 1018 is a regular-expression parse according to an example expression given in Table 2, in this example that a Problem motif can be represented by the pattern [Negation.* Action]. The nodes of parse 1018 are negation node 1020, corresponding to the word "not," "Any" node 1022, which represents the ".*" match-any operator, and action node 1024, corresponding to the word "crashing."

This example sentence identifies that a problem has been resolved. Moreover, this example sentence is an entirely valid English sentence. As shown, regular-expression parse 1018 determines that this example sentence expresses a problem, which is the opposite of the actual meaning of the sentence. However, the dependency parse correctly identifies that the words "is," "not," and "crashing" are related, notwithstanding the interspersed "thanks to you." Accordingly, a grammar pattern identifying the tree relationships "neg(is, not)" and "xcomp(is, <verb describing a problem>)" (depicted with heavy arrows) can correctly identify this example sentence and similarly-structured sentences as resolutions rather than as problems. Accordingly, the illustrated example sentence can be associated with a Resolution motif. Similarly, in some examples, sentences including instances of a resolution-indicator class 422, where that class is not associated with an instance of a Negation class, can be determined to be associated with a Resolution motif.

Examples of motifs include: Questions, Experiences (e.g., customer experiences with products or services), Suggestions (e.g., features requested by customers), or Innovations. For example, Innovations can include descriptions of newly-introduced products or services. Text associated with an Innovation motif can be provided, e.g., by the corporation or other entity offering the newly-introduced product or service. For example, microblog posts describing new products or services may be associated with the Innovation motif.

Figure 11:
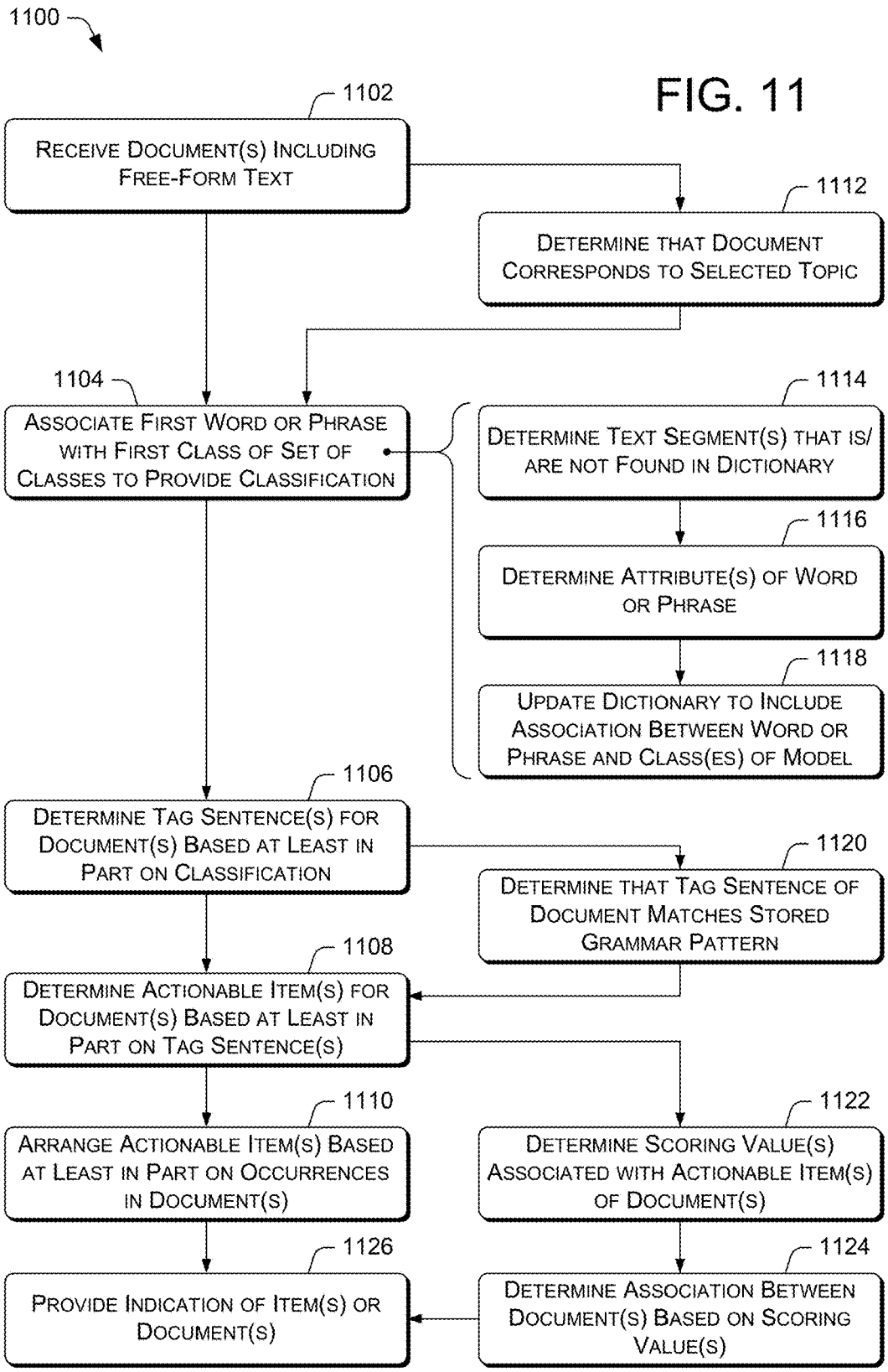
FIG. 11 is a flow diagram that illustrates an example process for determining or processing actionable items.

FIG. 11 is a flow diagram that illustrates an example process 1100 for determining or processing actionable items. Block 1102 can represent block 902. In some examples, block 1102 can be followed by block 1112 or block 1104. Block 1104 can represent block 904. In some examples, block 1104 can include blocks 1114, 1116, and 1118. Block 1106 can represent block 906. In some examples, block 1106 can be followed by block 1120. Block 1108 can represent block 908. Block 1108 can be followed by, e.g., blocks 1110 or 1122. Block 1110 can represent block 910.

In some examples, at block 1112, it can be determined that at least one document 108 of the plurality of documents 108, e.g., the first document 108, corresponds to a selected topic. Block 1112 can be performed, e.g., prior to at least one of the associating block 1104 or the determining block 1106 in which the tag sentence(s) are determined. Examples are discussed above, e.g., with reference to phrase-extraction module 234, FIG. 5. For example, the selected topic can correspond to a keyword, and block 1112 can include filtering out documents that do not include the keyword in respective document metadata, e.g., Title, Keywords, or Category metadata fields.

In some examples, at block 1114, a particular text segment or segment(s), e.g., a word or phrase (or other text segment 608, and likewise throughout this discussion), can be determined (e.g., located), in at least one of the plurality of documents 108. In some examples using block 1112, the particular text segment 608 can be located in at least one of the plurality of documents 108 that corresponds to the selected topic. In some examples, the particular text segment 608 is not associated with a dictionary, e.g., dictionary 506 or 622. For example, the particular text segment 608 can be located by checking detected text segment(s) 608 from phrase-filtering module 528 and retaining only text segment(s) 608 not found in the dictionary. The text segment 608 can be located, e.g., as discussed above with reference to the classification module 246.

The dictionary can include respective attribute(s) for individual one(s) of the text segment(s) 608 in the dictionary. The dictionary can be or include a stored dictionary mapping text segment(s) 608 to class(es) of a set of classes, e.g., ontology 400, and the tag sentences can be determined based at least in part on the dictionary. Examples are discussed above, e.g., with reference to the classification module 246.

In some examples, at block 1116, at least one attribute of the particular text segment 608 can be determined. For example, block 1116 can include determining, e.g., a feature vector. This can be done, e.g., as discussed above with reference to the classification module 246.

In some examples, at block 1118, the dictionary can be updated to include an association between the particular text segment 608 and particular class(es) of the set of classes based at least in part on the at least one attribute of the particular text segment 608 and one or more of the attribute(s) of individual one(s) of the text segment(s) 608 in the dictionary. This can be done, e.g., as discussed above with reference to the classification module 246. For example, the feature vector from block 1116 can be provided to a classifier and the resulting class stored in the dictionary. Examples are discussed above, e.g., with reference to FIG. 7. The set of classes can be associated, e.g., with an ontology such as ontology 400, or with another model.

In some examples, at block 1120, it can be determined, for individual ones of the plurality of documents 108, that the tag sentence of the respective document 108 (e.g., the first document 108) matches a stored grammar pattern, e.g., for a particular motif. The stored grammar pattern can include a first class of the set of classes associated with a second class of the set of classes. The first class can be or include a negation class 404 and the second class can be or include a condition class 412. In the example of FIG. 10, "not/Negation" can match the first class and "crashing/Condition" can match the second class. Examples are discussed above, e.g., with reference to the resolution-indicator class 422 and Table 2. Block 1120 can be followed by block 1108.

In some examples, at block 1122, one or more scoring value(s) can be determined. The scoring values can be associated with the respective actionable items 630 of at least some documents 108 of the plurality of documents 108, e.g., a first actionable item 630 of the first document 108 ("popups" in the example above) and a second actionable item 630 of the second document 108 ("videos"). For example, the scoring values can represent relevance of the documents 108 to a particular topic. The scoring values can be, e.g., scalar relevance scores, or can include feature vectors representing the respective actionable items 630 in a semantic feature space. In some examples, block 1122 can include determining one scoring value per document 108. In some examples, block 1122 can include determining one scoring value per actionable item 630 per document 108. In some examples, the scoring values can represent predicted importance to a user or other entity of an actionable item 630, but this is not required.

In some examples, block 1122 can include determining respective scoring values associated with multiple documents, e.g., the first document 108 and the second document 108, of the plurality of documents. The scoring values can be determined, e.g., based at least in part on the respective actionable items 630 of the documents. For example, value(s) determined based on individual actionable item(s) 630 of a particular document 108 can be summed or otherwise combined to provide value(s) associated with the particular document 108.

In some examples, scoring values can be determined based at least in part on content of document(s) 108. For example, scoring values can be determined based on particular instances in document(s) 108 of selected classes, e.g., an Entity class 410 instance indicating a particular product or service. In some examples, a scoring value for "Acme Widgets"/Entity can be determined as the percentage of mentions of "Acme Widgets" in a particular document 108 of a set of documents 108, or as an RIDF, MI, term frequency-inverse document frequency (TF-IDF) or other relevance score or statistic of "Acme Widgets"/Entity in a set of documents 108.

In some examples, scoring values can be determined based on co-occurrence of terms in a document 108. For example, result values can be determined based on occurrence in a document 108 of a problem motif associating an entity with a particular condition 412 such as "cracked," indicating a security failure related to the entity, or "flaky," indicating erratic or intermittent behavior of the entity. In another example, e.g., of processing documents 108 related to a cluster 106, result values can be determined based on co-occurrence of "virtual machine/Entity" and "availability/Condition."

In some examples, scoring values can be determined based on co-occurrence of classes in a document 108. For example, result values can be determined based on occurrence in a document 108 of a motif including, e.g., an entity class and a condition class, or another combination of classes. For example, documents including Entity+Problem-Condition combinations (e.g., phrases such as "AcmeOS/Entity is crashing/ProblemCondition") may receive higher scoring values than documents not including such phrases, but instead including phrases such as "I like/Emotion AcmeOS/Entity." This can permit more readily focusing attention on documents 108 including actionable items 630.

In some examples, scoring values can be additionally or alternatively determined based at least in part on significance data, e.g., stored in knowledge base 228. For example, knowledge base 228 can include data indicating specific entities that should be given higher or lower scoring values. For example, in a cluster 106 management context, entities such as "virtual machine," "directory," "server," or "host" can be given higher scoring values, and entities such as "word processor" or "game" can be given lower scoring values.

In some examples, at block 1124, an association between at least two of the at least some documents 108, e.g., between the first document 108 and the second document 108, can be determined based at least in part on the respective scoring values. This can permit grouping documents that are indicated by their respective scoring values to be similar or related. Grouping can be performed based on scoring values associated with documents 108 or with actionable items 630 therein, in any combination. In some examples, the respective scoring values can include, e.g., respective feature vectors. For example, a feature vector can include values related to an Entity expressed in the document and also values related to an Entity-State grouping or relationship. Block 1124 can include computing a similarity metric, e.g., the dot product of two of the respective feature vectors (e.g., as they are, or after normalization). Documents having dot products or other similarity value exceeding a selected threshold of value or rank (e.g., >0.9, or within the top 10%) can be included in a particular group.

In some examples, at block 1126, an indication can be provided of the arranged, e.g., ranked, actionable items 630. This can be done, e.g., as discussed above with reference to the reporting module 248. In some examples, block 1126 can include presenting, transmitting, or otherwise providing indication(s) of at least one of the grammar pattern(s) from block 1120, the scoring value(s) from block 1122, or the association(s) between documents from block 1124.

Figure 12:
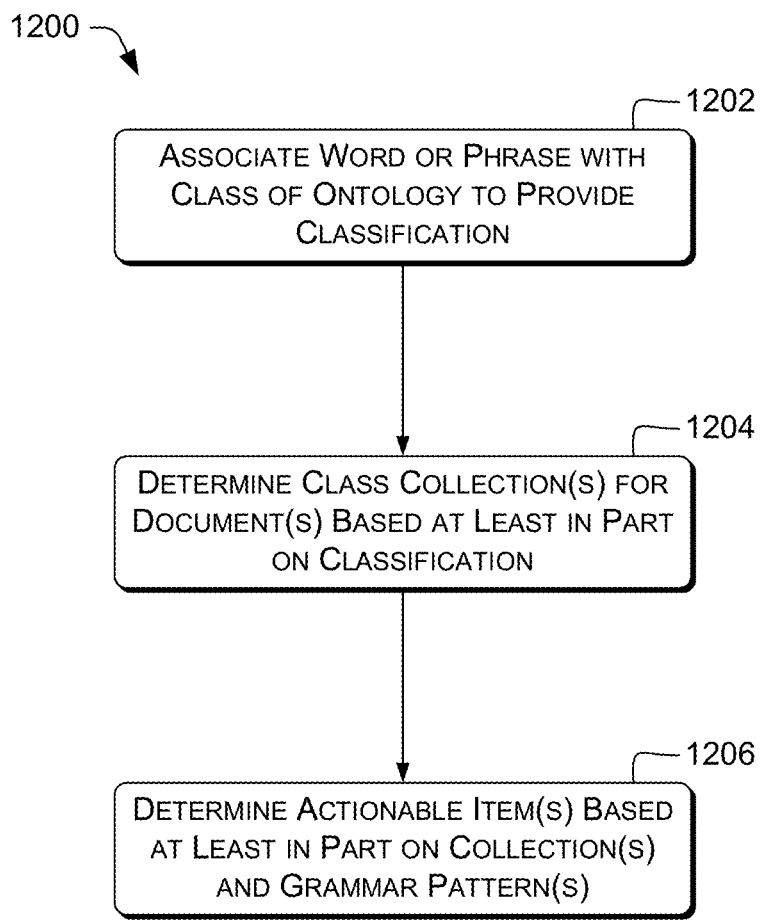
FIG. 12 is a flow diagram that illustrates an example process for determining an actionable item.

FIG. 12 is a flow diagram that illustrates an example process 1200 for determining an actionable item, e.g., using a computing device such as computing device 102, FIG. 1, or computing device 200, FIG. 2.

In some examples, at block 1202, a first text segment 608, e.g., a text segment 608, e.g., a word or phrase of free-form user text, of a first document of a plurality of documents can be associated with a first class of an ontology 504 to provide a classification. The documents can include text segment(s) 608, e.g., free-form user text. The association can be determined, or the classification provided, based at least in part on a characteristic pattern associated with the first text segment 608.

In some examples, at block 1204, respective class collections 818 can be determined for individual documents 108 of the plurality of documents 108 based at least in part on the classification. For example, a class collection 626 can be determined for the first document 108 or for a second document 108 of the plurality of documents 108. The second document 108 can be the same document as the first document 108 or can be a different document 108 of the plurality of documents 108. The class collection 626, or individual ones of the class collections 818, can be determined to map individual text segment(s), e.g., word(s) or phras(es) of the free-form user text, of the respective documents 108 to individual classes of the ontology 504.

In some examples, at block 1206, for individual one(s) of the plurality of documents, actionable item(s) 520 can be determined based at least in part on the respective class collection(s) 818 and a selected grammar pattern. For example, actionable item(s) 520 associated with the second document 108 can be determined based at least in part on the class collection 626 and the selected grammar pattern. In some examples, the selected grammar pattern can be or include a pushdown grammar.

Figure 13:
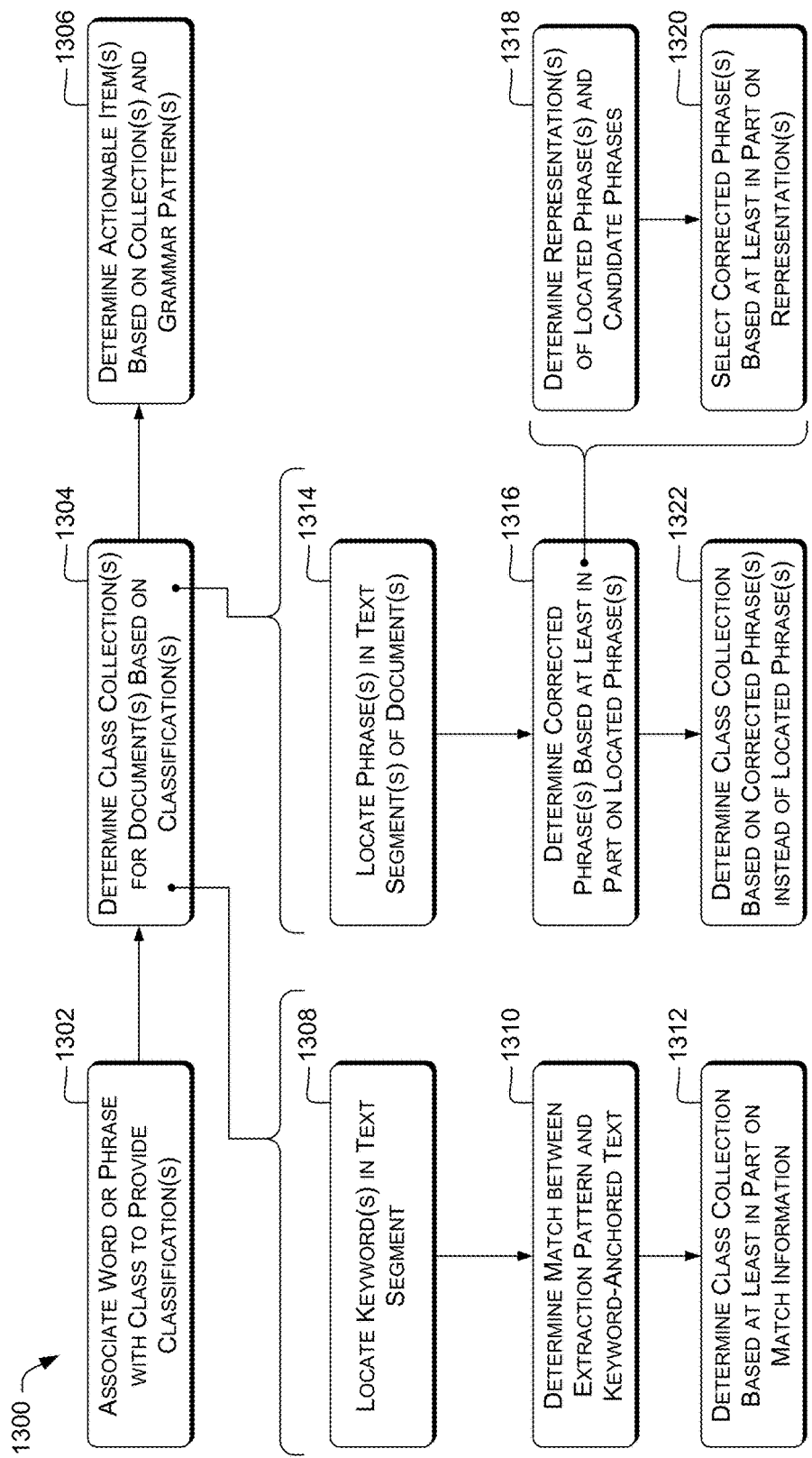
FIG. 13 is a flow diagram that illustrates an example process for determining an actionable item.

FIG. 13 is a flow diagram that illustrates an example process 1300 for determining an actionable item using a computing device, e.g., computing device 102, FIG. 1, or computing device 200, FIG. 2. Block 1302 can represent block 1202. Block 1304 can represent block 1204. In some examples, block 1304 can include blocks 1308, 1310, and 1312. In some examples, block 1304 can include blocks 1314, 1316, and 1318. Block 1306 can represent block 1206.

In some examples, at block 1308, a selected keyword can be located in a text segment 608 of a document 108, e.g., the first document 108 or the second document 108, to provide a keyword location. For example, the selected keyword can be a keyword included in a keyword list or dictionary. The keyword can be located, e.g., using the Knuth-Morris-Pratt matching algorithm or other string-search or string-matching algorithms. In some examples, the selected keyword is or includes a product name or other entity name. In the example of FIG. 3, phrase 308 includes keyword 312, namely, "Windows".

In some examples, at block 1310, a match can be determined between a selected extraction pattern and text segment(s) 608 anchored at the keyword location, e.g., a portion of the free-form user text of the document 108 (e.g., the first or second document 108). For example, the portion can begin at or immediately after the keyword location, can end at or immediately before the keyword location, can include the sentence or paragraph containing the keyword, or can otherwise be located with reference to the keyword location. Determining the match can provide match information corresponding to at least one text segment 608, e.g., a word or phrase, associated with the selected keyword. The match information can include, e.g., at least one of the matched text segment 608 or a location or extent of the matched text segment 608. In some examples, an extraction pattern can include at least one of a fixed text string, a regular expression such as a POSIX ERE, or a pushdown grammar. Extracting text segment(s) 608 matching extraction patterns can permit more readily determining actionable items, since, e.g., actionable items for an end-of-life product such as WINDOWS 3.1 may be very different from actionable items for an actively-maintained product such as WINDOWS 7.

In some examples, the extraction pattern can be associated with the selected keyword. Accordingly, in some examples, each keyword can have a respective unique extraction pattern. In some examples, a single extraction pattern can be associated with multiple keywords, or a single keyword can be associated with multiple extraction patterns.

In a nonlimiting example, keyword 312, "Windows", can be associated with the case-insensitive regular-expression extraction pattern /Windows\s*(\d{1,2}(\.\d{1,2})?|me|xp|nt)/i (in a flavor in which parentheses, braces, question mark, and pipe are metacharacters). This pattern will match text such as "Windows 10.1", "Windows Me", or "windows NT". This pattern will also match phrase 308, "Windows 10".

In another example, the keyword "Lumia" can be associated with the case-insensitive regular-expression extraction pattern /Lumia\s*\d{2,3}\s*(\w{2})?/i. This can permit extracting, e.g., "Lumia 950" and "Lumia 950 XL" as single phrases rather than as separate words and numbers.

In still another example, the keyword "handler" can be associated with the case-insensitive regular-expression extraction pattern /(interrupt|event|packet|fault)\s+handler/i. This can permit determining which handler is referred to, which can be useful in determining which subsystem of, e.g., an operating system may be relevant to the document mentioning the "handler".

In some examples, at block 1312, the class collection for the document 108 (e.g., the first or second document 108) can be determined based at least in part on the match information. For example, processing described above with reference to the mapping module 238, 624, or 816 can be performed using the matched text instead of or in addition to the keyword. Examples of determining the class collection are discussed above, e.g., with reference to mapping modules 624 and 816. Continuing the "Windows" example above, in a nonlimiting example of the sentence "Windows 8.1 fixed my problem with Windows 8," using the matched text can permit distinguishing "Windows 8.1" from "Windows 8" and assigning each to its own instance of the Entity class 410, rather than treating the sentence as being about "windows/Entity" generically.

In some examples, at block 1314, a second text segment 608 can be located in text segment(s) 608, e.g., in the free-form user text, of a document 108, e.g., the first document 108 or the second document 108. In some examples, the second text segment 608 can include a word or phrase associated with an instance of a class, e.g., the Entity class 410. Such words or phrases can be determined, e.g., by the phrase extraction-module 526 or the phrase-filtering module 528. In some examples, the second text segment 608 can include a word or phrase determined, e.g., by the phrase extraction-module 526 or the phrase-filtering module 528, even if that word or phrase is not associated with a specific class. Block 1314 can additionally or alternatively include determining that the second text segment 608 is incorrectly spelled or unknown. For example, block 1314 can include looking up the second text segment 608 in a dictionary, e.g., a phrase dictionary, and determining that the second text segment 608 should be corrected if the second text segment 608 is absent from the dictionary. In some examples, the dictionary can include, e.g., in internal phrase lists, e.g., a trie or hash table, or a connection to an external knowledge base such as WIKIPEDIA or FREEBASE.

In some examples, at block 1316, a corrected text segment 608 can be determined based at least in part on the second text segment 608. Block 1316 can include blocks 1318 and 1320, or can be followed by block 1322. In some examples, block 1316 can include computing a locality-sensitive hash or other representation of the second text segment 608. The hash value can then be used to determine corrected text segments 608. For example, the hash value can be used to perform nearest-neighbor search, e.g., using hashes of text segments according to a plurality of hash functions. In other examples, the hash value can be used as a query in a structure mapping hash values to corrected text segments 608. The dictionary can include, e.g., a spatial decomposition such as an octree or k-d tree, a binary search tree, or another data structure permitting determining the locality-sensitive hash value in the dictionary nearest to the hash value of the second text segment 608. Other techniques can be used, e.g., sorting or indexing of text segments 608 or locality-sensitive hash values.

In some examples, at block 1318, representation(s) can be determined of located phrase(s) and candidate phrase(s). An individual representation can be associated with a located phrase or with both a located phrase and a candidate phrase. In some examples, the representation of a located phrase can include a locality-sensitive hash value of that phrase.

In some examples, distances can be determined between the second text segment 608 and respective text segments of a plurality of stored candidate text segments. For example, the distances can be determined or expressed in a selected metric, such as Hamming distance, Levenshtein distance, or other edit-distance metrics. A representation can therefore include the edit between the located phrase and a particular candidate phrase, in some examples, In some examples, the candidate text segments can be selected, e.g., using locality-sensitive hashing as described above. In some examples, each text segment in a dictionary can be selected as a candidate.

In some examples, at block 1320, the corrected text segment 608 can be selected from among the plurality of stored candidate text segments based at least in part on the representation(s), e.g., the respective distances. For example, the candidate text segment corresponding to the smallest of the distances can be selected as the corrected text segment 608. In some examples, the corrected text segment 608 can be selected only if the respective distance is less than a selected threshold, or in response to the respective distance being less than a selected threshold. If all distances exceed the threshold, in some examples, the second text segment 608 can be selected to be the corrected text segment 608. In some examples, block 1320 can include selecting the corrected text segment 1608, e.g., using locality-sensitive hashing as described above.

In some examples, at block 1322, the respective class collection for the document 108 (e.g., the first or second document 108) can be determined based at least in part on the corrected text segment 608 instead of on the second text segment 608. Examples of determining the class collection are discussed above, e.g., with reference to mapping modules 624 and 816.

Figure 14:
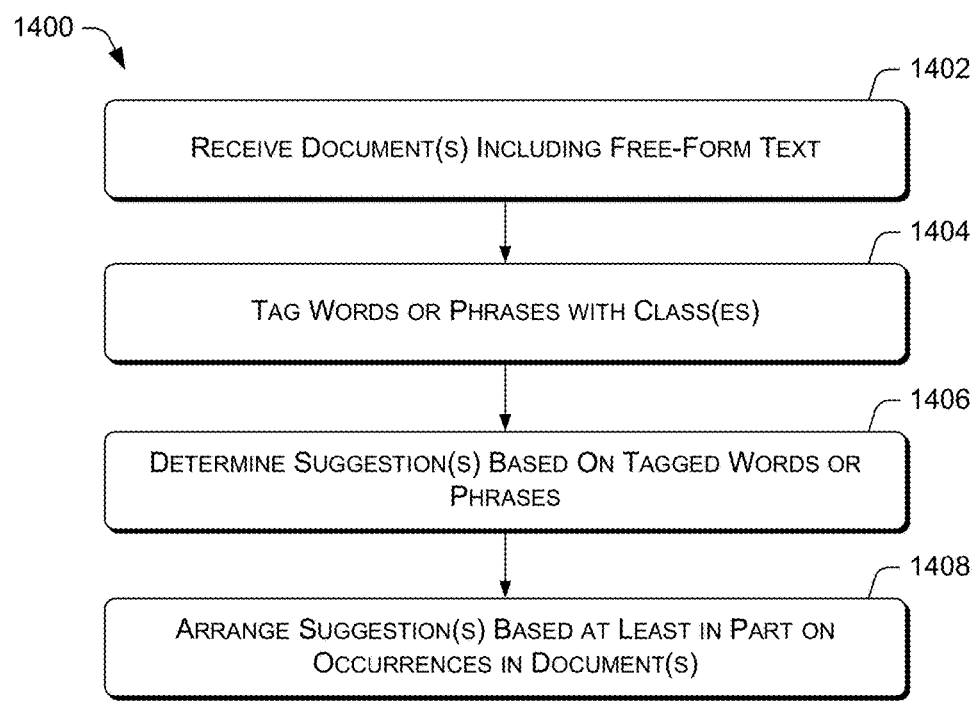
FIG. 14 is a flow diagram that illustrates example processes for determining user suggestions in documents.

FIG. 14 is a flow diagram that illustrates an example process 1400 for determining user-suggestion data using a computing device, e.g., computing device 102, FIG. 1, or computing device 200, FIG. 2. For example, the suggestion can relate to at least one of computing hardware (e.g., computing device 102 or 104), software (e.g., operating system 122, an application, a smartphone app, or a utility), a service (e.g., a cloud service or customer service provided by a business), or a user interface of a computing device or computer-mediated service.

At block 1402, a computing device 102 can receive a plurality of documents, individual ones of the plurality of documents including free-form text. The free-form text can include, e.g., feedback from a user in a natural language.

At block 1404, the computing device 102 can tag, for individual ones of the plurality of documents, individual text segment(s) 608, e.g., words or phrases of the free-form text, of the respective document with individual classes of a set of classes, at least one of the individual classes of the set of classes being a suggestion-indicator class 416. This can be done, e.g., as described above with reference to the phrase-extraction module 234, the phrase-filtering module 528, and the mapping module 238, and can be performed with reference, e.g., to dictionary 506. For example, the tagging can be based at least in part on a stored dictionary 506 mapping text segment(s) 608 to one(s) of the set of classes.

At block 1406, the computing device 102 can determine, for individual ones of the plurality of documents, a suggestion (or respective suggestions), e.g., regarding an update to an item, or including a suggested action to be taken to improve an entity, the entity being associated with the item. The suggestion(s) can be determined based at least in part on the tagged text segment(s) 608 for the respective document, e.g., as described above with reference to the analysis module 240. For example, the computing device 102 can determine, for individual ones of the plurality of documents, that the tagged text segment(s) 608 of the respective document match a stored grammar pattern for a suggestion motif. The grammar pattern for the suggestion motif can define a first class of the set of classes preceding a second class of the set of classes, the first class or the second class comprising the suggestion-indicator class 416 for text segment(s) 608 that represent the presence of a suggestion. The set of classes can include at least one of the classes discussed above with reference to FIG. 4.

At block 1408, the computing device 102 can arrange the suggestions in an order based at least in part on occurrences of individual ones of the suggestions for the plurality of documents, or based at least in part on other ranking criteria described herein. This can be done, e.g., as described above with reference to the recommendation module 242.

In some examples, block 1408 can include or be followed by a block (not shown) of outputting the arranged, e.g., ranked suggestions. This can be done, e.g., as discussed above with reference to the reporting module 248.

In some examples, at block 1406, the computing device 102 can additionally or alternatively determine, for individual ones of the plurality of documents, a question (or respective questions), regarding, e.g., an entity, action, or condition. In some examples, at block 1408, the computing device 102 can arrange the questions in an order based at least in part on occurrences of individual ones of the questions for the plurality of documents, or based at least in part on other ranking criteria described herein. This can be done, e.g., as described above with reference to the recommendation module 242.

Figure 15:
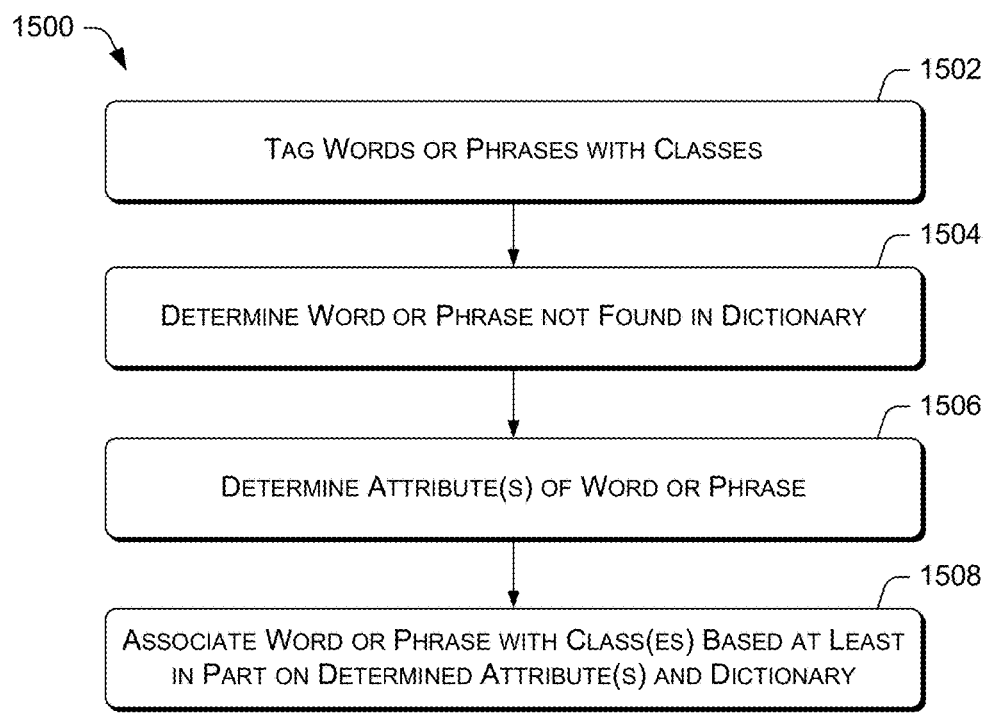
FIG. 15 is a flow diagram that illustrates example processes for automatically updating a dictionary.

FIG. 15 is a flow diagram that illustrates an example process 1500 for updating a dictionary using a computing device, e.g., computing device 102, FIG. 1, or computing device 200, FIG. 2. Process 1500 can be used, e.g., with blocks of FIG. 14 including block 1404 tagging text segment(s) 608 based at least in part on a stored dictionary (e.g., dictionary 506) mapping text segment(s) 608 to one(s) of the set of classes. Block 1502 can represent block 1404.

At block 1504, the computing device 102 can determine a particular text segment 608 in at least one of the plurality of documents that is not associated with the dictionary, e.g., dictionary 506. This can be done, e.g., as discussed above with reference to the classification module 246. The dictionary includes respective attribute(s) for individual one(s) of the text segment(s) 608 in the dictionary. In some examples, at block 1504, the particular text segment 608 can be determined based at least in part on candidates determined based at least in part on the input free-form text. Candidates can be determined, e.g., using filtering as described above with reference to the phrase extraction module 234 and the phrase filtering module 528, FIG. 5.

At block 1506, the computing device 102 can determine one or more respective attribute(s) of the particular text segment 608. The computing device 102 can determine, e.g., a feature vector. This can be done, e.g., as discussed above with reference to the classification module 246.

At block 1508, the computing device 102 can update the dictionary to include an association between the particular text segment 608 and particular one(s) of the set of classes based at least in part on the one or more attribute(s) of the particular text segment 608 and one or more of the attribute(s) of individual one(s) of the text segment(s) 608 in the dictionary. This can be done, e.g., as discussed above with reference to the classification module 246. For example, the feature vector can be provided to a classifier and the resulting class stored in the dictionary.

Example Clauses

A: A system comprising: at least one processor; memory communicatively coupled to the at least one processor; an interface communicatively coupled to the at least one processor and configured to receive at least one document including text segment(s); a phrase-filtering module stored in the memory and executable by the at least one processor to determine a characteristic pattern associated with a first text segment of the text segment(s); a classification module stored in the memory and executable by the at least one processor to determine an association between the first text segment and a first individual class of a model based at least in part on the characteristic pattern; a mapping module stored in the memory and executable by the at least one processor to determine a collection of class(es) of the model associated with the at least one document based at least in part on the association; an analysis module stored in the memory and executable by the at least one processor to determine an actionable item associated with the at least one document based at least in part on the collection and at least one grammar pattern; and a reporting module configured to present or transmit an indication of the actionable item.

B: A system as paragraph A recites, wherein the characteristic pattern comprises a part-of-speech (PoS) pattern and the classification module is further configured to determine the association based at least in part on a reference PoS pattern.

C: A system as paragraph B recites, wherein the classification module is further configured to determine the association by retrieving the first individual class of the model from a stored mapping indexed by at least one of the characteristic pattern or the reference PoS pattern.

D: A system as any of paragraphs A-C recites, wherein the classification module is further configured to: operate a classifier to provide a classification value based at least in part on at least one of the first text segment, a portion of the text segment(s) within a selected distance of the first text segment, the characteristic pattern, a stemmed version of the first text segment, or a degree of correspondence between the characteristic pattern and at least one reference pattern; and determine the first individual class of the model based at least in part on the classification value.

E: A system as paragraph D recites, wherein: the characteristic pattern comprises a part-of-speech (PoS) pattern; and the classification module is further configured to determine the first individual class of the model based at least in part on at least one reference PoS pattern.

F: A system as paragraph E recites, wherein the classification module is configured to: determine the association based at least in part on a reference PoS pattern by retrieving a candidate class of the model from a stored mapping indexed by at least one of the characteristic pattern or the reference PoS pattern.

G: A system as paragraph F recites, wherein the classification module is configured to: (a) determine, in response to a match between the classification value and the candidate class, that the first individual class is the candidate class; (b) determine, in response to a mismatch between the classification value and the candidate class and a classifier confidence value exceeding a selected threshold, the first individual class based on the classification value; or (c) determine, in response to a mismatch between the classification value and the candidate class and a classifier confidence value not exceeding a selected threshold, that the first individual class is the candidate class.

H: A system as any of paragraphs A-G recites, wherein the analysis module is further executable by the at least one processor to determine that the collection corresponds to the selected grammar pattern, the selected grammar pattern defining a pushdown grammar over a plurality of classes of the model.

I: A system as paragraph H recites, wherein the pushdown grammar comprises at least one negation relationship between at least two classes of the plurality of classes of the model.

J: A system as any of paragraphs A-I recites, wherein the class(es) of the model comprise at least one of a suggestion-indicator class or a modal-indicator class for text segment(s) that represent the presence of a suggestion, an entity class for text segment(s) that represent an entity, an action class for text segment(s) that represent a behavior that is taken on an entity, a certainty class for text segment(s) that represent the confidence of the user regarding an entity or condition represented in the text segment(s), an emotion class for text segment(s) that represent feelings or beliefs of the user writing the text segment(s), or a negation class for text segment(s) that change the meaning of one or more other text segment(s) to a substantially opposite meaning.

K: A system as any of paragraphs A-J recites, wherein: the at least one document comprises a plurality of documents; the mapping module is executable by the at least one processor to determine respective collections associated with individual documents of the plurality of documents; the analysis module is further executable by the at least one processor to determine respective actionable items associated with individual documents of the plurality of documents based at least in part on the respective collections; the system further comprises a recommendation module stored in the memory and executable by the at least one processor to analyze individual one(s) of the actionable items to generate a recommendation; and the reporting module is further executable by the at least one processor to present or transmit an indication of the recommendation.

L: A system as paragraph K recites, wherein the recommendation module is further executable by the at least one processor to determine the recommendation comprising a ranking of at least a first actionable item and a second actionable item of the actionable items, the first actionable item occurring more frequently in the plurality of documents than the second actionable item and being ranked higher than the second actionable item.

M: A system as paragraph K or L recites, wherein the reporting module is configured to transmit the indication of the recommendation to a computing device of a user that is associated with management of an entity, e.g., a software or hardware entity, associated with the recommendation.

N: A system as any of paragraphs A-M recites, further comprising a modification module stored in the memory and executable by the at least one processor to: determine a first text segment of the text segment(s); determine that the first text segment has a threshold level of similarity to a second, different text segment represented in a dictionary; and replace the second text segment in the dictionary with the first text segment.

O: A system as any of paragraphs A-N recites, further comprising a modification module stored in the memory and executable by the at least one processor to add, for individual words mapped to at least one class of the model, at least one of one or more synonyms of the respective word or one or more lexical or morphological forms of the respective word to a dictionary.

P: A method comprising: receiving, by a computing device, a plurality of documents, at least two of the plurality of documents including respective text segments; associating, by the computing device, a first text segment of a first document of the plurality of documents with a first class of a set of classes based at least in part on a characteristic pattern associated with the first text segment to provide a classification; determining, by the computing device, based at least in part on the classification, and for the first document and a second document of the plurality of documents, a respective tag sentence associated with a respective text segment of the respective document and with a respective collection of class(es) of a set of classes; determining, by the computing device and for the first document and the second document of the plurality of documents, a respective actionable item based at least in part on the tag sentence associated with the respective document; and arranging, by the computing device, the respective actionable items for the first document and the second document of the plurality of documents in an order based at least in part on occurrences of the actionable items from the plurality of documents.

Q: A method as paragraph P recites, further comprising: determining, by the computing device, respective scoring values associated with the respective actionable items of the first document and the second document of the plurality of documents; and determining, by the computing device, an association between the first document and the second document based at least in part on the respective scoring values.

R: A method as paragraph P or Q recites, further comprising determining that the respective tag sentence of at least the first document matches a stored grammar pattern comprising a first class of the set of classes associated with a second class of the set of classes, the first class comprising a negation class and the second class comprising a condition class.

S: A method as any of paragraphs P-R recites, further comprising determining that at least the first document of the plurality of documents corresponds to a selected topic prior to at least one of the associating or the determining the tag sentences.

T: A method as any of paragraphs P-S recites, wherein the respective tag sentences are determined based at least in part on a stored dictionary mapping text segment(s) to one(s) of the set of classes, and the method further comprises: determining a particular text segment in at least the first document that is not associated with the dictionary, wherein the dictionary includes respective attribute(s) for individual one(s) of the text segments in the dictionary; determining at least one attribute of the particular text segment; and updating the dictionary to include an association between the particular text segment and particular class(es) of the set of classes based at least in part on the at least one attribute of the particular text segment and one or more of the attribute(s) of the individual one(s) of the text segments in the dictionary.

U: A method as any of paragraphs P-T recites, wherein at least one of the respective text segments comprises feedback from a user in a natural language.

V: A method as any of paragraphs P-U recites, further comprising determining the respective actionable item for at least one of the first document or the second document including a suggested action to be taken to improve an entity, the entity being associated with the actionable item.

W: A method as any of paragraphs P-V recites, further comprising: determining, by the computing device, respective scoring values associated with the first document and the second document of the plurality of documents based at least in part on the respective actionable items; and determining, by the computing device, an association between the first document and the second document based at least in part on the respective scoring values.

X: One or more computer-readable media storing computer-executable instructions that, when executed by the at least one processor, cause the at least one processor to perform acts comprising: associating, for a first document of a plurality of documents including text segment(s), a first text segment of the first document with a first class of an ontology based at least in part on a characteristic pattern associated with the first text segment to provide a classification; determining a class collection for a second document of the plurality of documents based at least in part on the classification, wherein the class collection maps individual text segment(s) of the second documents to individual classes of the ontology; and determining actionable item(s) associated with the second document based at least in part on the class collection and a selected grammar pattern.

Y: One or more computer-readable media as paragraph X recites, wherein the acts further comprise: locating a selected keyword in a text segment of the second document to provide a keyword location; determining a match between a selected extraction pattern and a portion of the text segment(s) of the second document anchored at the keyword location to provide match information corresponding to at least one text segment associated with the selected keyword; and determining the class collection for the second document based at least in part on the match information.

Z: One or more computer-readable media as paragraph X or Y recites, wherein the acts further comprise: locating a second text segment in the text segment(s) of the second document; determining a corrected text segment based at least in part on the second text segment; and determining the class collection for the second document based at least in part on the corrected text segment instead of on the second text segment.

AA: One or more computer-readable media as paragraph Z recites, wherein the acts further comprise: determining representations of the second text segment and respective text segments of a plurality of stored candidate text segments; and selecting the corrected text segment from among the plurality of stored candidate text segments based at least in part on the representations.

AB: One or more computer-readable media as paragraph Z or AA recites, wherein the first text segment comprises a domain-specific phrase.

AC: One or more computer-readable media as any of paragraphs Z-AB recites, wherein the acts further comprise selecting the corrected text segment in response to at least one of the respective distances being less than a selected threshold.

AD: One or more computer-readable media as any of paragraphs Z-AC recites, wherein the acts further comprise: determining distances in a selected metric between the second text segment and respective text segments of a plurality of stored candidate text segments; and selecting the corrected text segment from among the plurality of stored candidate text segments based at least in part on the respective distances.

AE: One or more computer-readable media as any of paragraphs Z-AD recites, wherein the acts further comprise: determining at least a first representation of the representations as a locality-sensitive hash value of the second text segment; and determining at least a second representation of the representations as a locality-sensitive hash value of a first candidate text segment of the plurality of stored candidate text segments.

AF: One or more computer-readable media as any of paragraphs X-AE recites, wherein the selected grammar pattern comprises a pushdown grammar.

AG: One or more computer-readable media as any of paragraphs X-AF recites, the acts further comprising determining a ranking of individual ones of the actionable item(s); and outputting the ranking.

AH: One or more computer-readable media as any of paragraphs X-AG recites, the acts further comprising determining, for the first document of the plurality of documents, a suggested action to be taken to improve an entity.

AI: One or more computer-readable media as any of paragraphs X-AH recites, the acts further comprising: determining that the first text segment has a threshold level of similarity to a second text segment represented in a dictionary of a knowledge base; and replacing the second text segment in the dictionary of the knowledge base with the first text segment.

AJ: One or more computer-readable media as any of paragraphs X-AI recites, the acts further comprising: determining a particular text segment in at least one of the plurality of documents that is not associated with a stored dictionary, wherein the dictionary includes respective attribute(s) for individual one(s) of the text segment(s) in the dictionary; determining one or more respective attribute(s) of the particular text segment; and updating the dictionary to include an association between the particular text segment and particular one(s) of the set of classes based at least in part on the one or more attribute(s) of the particular text segment and one or more of the attribute(s) of individual one(s) of the text segment(s) in the dictionary.

AK: One or more computer-readable media as any of paragraphs X-AJ recites, the acts further comprising adding, for individual words associated with at least one class of the ontology, at least one of one or more synonyms of the respective word or one or more lexical or morphological forms of the respective word to a knowledge base dictionary associated with the ontology.

AL: One or more computer-readable media as any of paragraphs X-AK recites, wherein the one or more computer-readable media are one or more computer storage media.

AM: A device comprising: a processor; and a computer-readable medium as any of paragraphs X-AK recites.

AN: The device as paragraph AM recites, wherein the computer-readable medium is a computer storage medium.

AO: A computer-readable medium, e.g., a computer storage medium, having thereon computer-executable instructions, the computer-executable instructions upon execution configuring a computer to perform operations as any of paragraphs P-W recites.

AP: A device comprising: a processor; and a computer-readable medium, e.g., a computer storage medium, having thereon computer-executable instructions, the computer-executable instructions upon execution by the processor configuring the device to perform operations as any of paragraphs P-W recites.

AQ: A system comprising: means for processing; and means for storing having thereon computer-executable instructions, the computer-executable instructions including means to configure the system to carry out a method as any of paragraphs P-W recites.

AR: A system comprising: means for receiving, by a computing device, a plurality of documents, at least two of the plurality of documents including respective text segments; means for associating, by the computing device, a first text segment of a first document of the plurality of documents with a first class of a set of classes based at least in part on a characteristic pattern associated with the first text segment to provide a classification; means for determining, by the computing device, based at least in part on the classification, and for the first document and a second document of the plurality of documents, a respective tag sentence associated with a respective text segment of the respective document and with a respective collection of class(es) of a set of classes; means for determining, by the computing device and for the first document and the second document of the plurality of documents, a respective actionable item based at least in part on the tag sentence associated with the respective document; and means for arranging, by the computing device, the respective actionable items for the first document and the second document of the plurality of documents in an order based at least in part on occurrences of the actionable items from the plurality of documents.

AS: A system as paragraph AR recites, further comprising: means for determining, by the computing device, respective scoring values associated with the respective actionable items of the first document and the second document of the plurality of documents; and means for determining, by the computing device, an association between the first document and the second document based at least in part on the respective scoring values.

AT: A system as paragraph AR or AS recites, further comprising means for determining that the respective tag sentence of at least the first document matches a stored grammar pattern comprising a first class of the set of classes associated with a second class of the set of classes, the first class comprising a negation class and the second class comprising a condition class.

AU: A system as any of paragraphs AR-AT recites, further comprising means for determining that at least the first document of the plurality of documents corresponds to a selected topic prior to at least one of the associating or the determining the tag sentences.

AV: A system as any of paragraphs AR-AU recites, wherein the respective tag sentences are determined based at least in part on a stored dictionary mapping text segment(s) to one(s) of the set of classes, and the system further comprises: means for determining a particular text segment in at least the first document that is not associated with the dictionary, wherein the dictionary includes respective attribute(s) for individual one(s) of the text segments in the dictionary; means for determining at least one attribute of the particular text segment; and means for updating the dictionary to include an association between the particular text segment and particular class(es) of the set of classes based at least in part on the at least one attribute of the particular text segment and one or more of the attribute(s) of the individual one(s) of the text segments in the dictionary.

AW: A system as any of paragraphs AR-AV recites, wherein at least one of the respective text segments comprises feedback from a user in a natural language.

AX: A system as any of paragraphs AR-AW recites, further comprising determining the respective actionable item for at least one of the first document or the second document including a suggested action to be taken to improve an entity, the entity being associated with the actionable item.

AY: A system as any of paragraphs AR-AX recites, further comprising: means for determining, by the computing device, respective scoring values associated with the first document and the second document of the plurality of documents based at least in part on the respective actionable items; and means for determining, by the computing device, an association between the first document and the second document based at least in part on the respective scoring values.

AZ: A system comprising: at least one processor; memory communicatively coupled to the at least one processor; a phrase-filtering module stored in the memory and executable by the at least one processor to determine a characteristic pattern associated with a first text segment of at least one received document comprising at least one text segment; a classification module stored in the memory and executable by the at least one processor to determine an association between the first text segment and a first individual class of a model based at least in part on the characteristic pattern; a mapping module stored in the memory and executable by the at least one processor to determine a collection of one or more classes of the model based at least in part on the association, the collection including the first individual class; and an analysis module stored in the memory and executable by the at least one processor to determine an actionable item based at least in part on the collection and at least one grammar pattern.

BA: A system as paragraph AZ recites, wherein the characteristic pattern comprises a part-of-speech (PoS) pattern and the classification module is further configured to determine the association based at least in part on a reference PoS pattern.

BB: A system as paragraph BA recites, wherein the classification module is further configured to determine the association by retrieving the first individual class of the model from a stored mapping indexed by at least one of the characteristic pattern or the reference PoS pattern.

BC: A system as any of paragraphs AZ-BB recites, wherein the classification module is further configured to: operate a classifier to provide a classification value based at least in part on at least one of the first text segment, a portion of the at least one text segment within a selected distance of the first text segment, the characteristic pattern, a stemmed version of the first text segment, or a degree of correspondence between the characteristic pattern and at least one reference pattern; and determine the first individual class of the model based at least in part on the classification value.

BD: A system as paragraph BC recites, wherein: the characteristic pattern comprises a part-of-speech (PoS) pattern; and the classification module is further configured to determine the first individual class of the model based at least in part on at least one reference PoS pattern.

BE: A system as any of paragraphs AZ-BD recites, wherein the analysis module is further executable by the at least one processor to determine that the collection corresponds to the selected grammar pattern, the selected grammar pattern defining a pushdown grammar over a plurality of classes of the model.

BF: A system as paragraph BE recites, the pushdown grammar comprises at least one negation relationship between at least two classes of the plurality of classes of the model.

BG: A system as any of paragraphs AZ-BF recites, wherein the characteristic pattern comprises at least one of a dependency tree, a co-occurrence relationship, a residual inverse document frequency (RIDF) value, a term-frequency (TF) value, an inverse document frequency (IDF) value, or a mutual information (MI) value.

BH: A system as any of paragraphs AZ-BG recites, wherein the one or more classes of the model comprise at least one of a suggestion-indicator class or a modal-indicator class for text segment(s) that represent the presence of a suggestion, an entity class for text segment(s) that represent an entity, an action class for text segment(s) that represent a behavior that is taken on an entity, a certainty class for text segment(s) that represent the confidence of the user regarding an entity or condition represented in the text segment(s), an emotion class for text segment(s) that represent feelings or beliefs of the user writing the text segment(s), or a negation class for text segment(s) that change the meaning of one or more other text segment(s) to a substantially opposite meaning.

BI: A system as any of paragraphs AZ-BH recites, wherein: the analysis module is further executable by the at least one processor to determine, through an iterative process, respective actionable items associated with individual documents of the at least one received document; and the system further comprises a recommendation module stored in the memory and executable by the at least one processor to analyze the respective actionable items to generate a recommendation comprising priority values of the respective actionable items.

BJ: A system as paragraph BI recites, wherein the recommendation module is further executable by the at least one processor to determine the recommendation comprising a ranking of at least a first actionable item and a second actionable item of the actionable items, the first actionable item occurring more frequently in the individual documents than the second actionable item and being ranked higher than the second actionable item.

BK: A system as paragraph BI or BJ recites, further comprising a reporting module executable by the at least one processor to present or transmit an indication of at least one of the respective priority values.

BL: A system as any of paragraphs AZ-BK recites, further comprising an interface communicatively coupled to the at least one processor and configured to receive the at least one received document.

BM: A system as any of paragraphs AZ-BL recites, further comprising a reporting module configured to present or transmit an indication of the actionable item.

BN: A method comprising: receiving, by a computing device, a plurality of documents, at least two of the plurality of documents including respective text segments; associating, by the computing device, a first text segment of a first document of the plurality of documents with a first class of a set of classes based at least in part on a characteristic pattern associated with the first text segment to provide a classification; determining, by the computing device, based at least in part on the classification, and for the first document and a second document of the plurality of documents, a respective tag sentence associated with a respective text segment of the respective document and with a respective collection of one or more classes of a set of classes; determining, by the computing device and for the first document and the second document of the plurality of documents, a respective actionable item based at least in part on the tag sentence associated with the respective document; and arranging, by the computing device, the respective actionable items for the first document and the second document of the plurality of documents in an order based at least in part on occurrences of the actionable items from the plurality of documents.

BO: A method as paragraph BN recites, further comprising: determining, by the computing device, respective scoring values associated with the respective actionable items of the first document and the second document of the plurality of documents; and determining, by the computing device, an association between the first document and the second document based at least in part on the respective scoring values.

BP: A method as paragraph BN or BO recites, wherein the characteristic pattern comprises at least one of a dependency tree, a co-occurrence relationship, a residual inverse document frequency (RIDF) value, a term-frequency (TF) value, an inverse document frequency (IDF) value, or a mutual information (MI) value.

BQ: A method as any of paragraphs BN-BP recites, further comprising determining that the respective tag sentence of at least the first document matches a stored grammar pattern comprising a first class of the set of classes associated with a second class of the set of classes, the first class comprising a negation class and the second class comprising a condition class.

BR: A method as paragraph BQ recites, wherein the stored grammar pattern defines a pushdown grammar over a plurality of classes of the set of classes, the plurality of classes including the first class and the second class.

BS: A method as any of paragraphs BN-BR recites, further comprising determining that at least the first document of the plurality of documents corresponds to a selected topic prior to at least one of the associating or the determining the tag sentences.

BT: A method as any of paragraphs BN-BS recites, wherein the respective tag sentences are determined based at least in part on a stored dictionary mapping one or more text segments to one or more classes of the set of classes, and the method further comprises: determining a particular text segment in at least the first document that is not associated with the dictionary, wherein the dictionary includes respective attribute(s) for individual one(s) of the text segments in the dictionary; determining at least one attribute of the particular text segment; and updating the dictionary to include an association between the particular text segment and one or more particular classes of the set of classes based at least in part on the at least one attribute of the particular text segment and one or more of the attribute(s) of the individual one(s) of the text segments in the dictionary.

BU: A computer-readable medium, e.g., a computer storage medium, having thereon computer-executable instructions, the computer-executable instructions upon execution configuring a computer to perform operations as any of paragraphs BN-BT recites.

BV: A device comprising: a processor; and a computer-readable medium, e.g., a computer storage medium, having thereon computer-executable instructions, the computer-executable instructions upon execution by the processor configuring the device to perform operations as any of paragraphs BN-BT recites.

BW: A system comprising: means for processing; and means for storing having thereon computer-executable instructions, the computer-executable instructions including means to configure the system to carry out a method as any of paragraphs BN-BT recites.

BX: One or more computer-readable media storing computer-executable instructions that, when executed by the at least one processor, cause the at least one processor to perform acts comprising: associating, for a first document of a plurality of documents including one or more text segments, a first text segment of the first document with a first class of an ontology based at least in part on a characteristic pattern associated with the first text segment to provide a classification; determining a class collection for a second document of the plurality of documents based at least in part on the classification, wherein the class collection maps one or more text segments of the second documents to individual classes of the ontology; and determining at least one actionable items associated with the second document based at least in part on the class collection and a selected grammar pattern.

BY: One or more computer-readable media as paragraph BX recites, wherein the acts further comprise: locating a selected keyword in a text segment of the second document to provide a keyword location; determining a match between a selected extraction pattern and a portion of the one or more text segments of the second document anchored at the keyword location to provide match information corresponding to at least one text segment associated with the selected keyword; and determining the class collection for the second document based at least in part on the match information.

BZ: One or more computer-readable media as paragraph BX or BY recites, wherein the acts further comprise: locating a second text segment in the one or more text segments of the second document; determining a corrected text segment based at least in part on the second text segment; and determining the class collection for the second document based at least in part on the corrected text segment instead of on the second text segment.

CA: One or more computer-readable media as paragraph BZ recites, wherein the acts further comprise: determining representations of the second text segment and respective text segments of a plurality of stored candidate text segments; and selecting the corrected text segment from among the plurality of stored candidate text segments based at least in part on the representations.

CB: One or more computer-readable media as any of paragraphs BX-CA recites, wherein the selected grammar pattern comprises a pushdown grammar.

CC: A device comprising: a processor; and a computer-readable medium as any of paragraphs BX-CB recites, e.g., a computer storage medium, having thereon computer-executable instructions, the computer-executable instructions upon execution by the processor configuring the device to perform operations as any of paragraphs BX-CB recites.

CD: A system comprising: means for processing; and means for storing having thereon computer-executable instructions as any of paragraphs BX-CB recites, the computer-executable instructions including means to configure the system to carry out acts as described in any of paragraphs BX-CB.

CONCLUSION

Motif-inference techniques described herein can reduce the amount of time required to filter documents for user suggestions and can permit users to provide feedback in natural language, which is faster and easier for the users than completing structured feedback forms. Various examples permit inferring trends across multiple documents. The motifs and trends can be output via various interfaces, e.g., visualizations, programming interfaces, etc. The outputs can be used to enhance the ability of engineers or managers to readily solve user problems. Newly-identified phrases in new or incoming documents can automatically be added to a dictionary over time to iteratively learn the new phrases for use as future documents arrive for processing. This automated updating of the dictionary can permit inferring suggestions, e.g., regarding newly-released or beta products, without requiring a domain expert to manually classify words.

Although the techniques have been described in language particular to structural features or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing devices 102, 104, or 200 such as one or more internal or external CPUs or GPUs, and/or one or more pieces of hardware logic such as FPGAs, DSPs, or other types described above.

All of the methods and processes described above can be embodied in, and fully automated via, software code modules executed by one or more general purpose computers or processors. The code modules can be stored in any type of computer-readable storage medium or other computer storage device. Some or all of the methods can be embodied in specialized computer hardware.

Conditional language such as, among others, "can," "could," "might" and/or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples and/or that one or more examples necessarily include logic for deciding, with and/or without user input and/or prompting, whether certain features, elements and/or steps are included and/or are to be performed in any particular example. The word "or" and the phrase "and/or" are used herein in an inclusive sense unless specifically stated otherwise. Accordingly, conjunctive language such as the phrases "X, Y, or Z," "X, Y, and/or Z," "at least X, Y, or Z," or "at least one of X, Y or Z," unless specifically stated otherwise, is to be understood as signifying that an item, term, etc., can be either X, Y, or Z, or a combination thereof.

The disclosure includes combinations of the examples described herein. References to a particular "example" and the like refer to features that are present in at least one example or configuration of what is within the scope of the disclosed subject matter. Separate references to "an example" or "particular examples" or the like do not necessarily refer to the same example or examples; however, such examples are not mutually exclusive, unless specifically indicated. The use of singular or plural in referring to "example," "examples," "method," "methods" and the like is not limiting.

Any routine descriptions, elements or blocks in the flow diagrams described herein and/or depicted in the attached figures should be understood as potentially representing modules, segments, or portions of code that include one or more executable instructions for implementing particular logical functions or elements in the routine. Alternative implementations are included within the scope of the examples described herein in which elements or functions can be deleted, or executed out of order from that shown or discussed, including substantially synchronously or in reverse order, depending on the functionality involved as would be understood by those skilled in the art. It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise.

What is claimed is:

1. A system comprising:
   at least one processor;
   memory communicatively coupled to the at least one processor;
   a phrase-filtering module stored in the memory and executable by the at least one processor to determine characteristic patterns associated with text segments of a document that includes feedback from a user of a product or service;
   a classification module stored in the memory and executable by the at least one processor to determine associations between the text segments and individual classes of an ontology based at least in part on the characteristic patterns, using a machine-learned classifier model that takes the characteristic patterns as classifier inputs;
   a mapping module stored in the memory and executable by the at least one processor to create, from at least a subset of the document, a tag sentence comprising a sequence of pairs of a text segment and an associated class as determined by the classification model;
   an analysis module stored in the memory and executable by the at least one processor to identify an actionable item and determine an associated category among a plurality of categories of actionable items based at least in part on a comparison of the tag sentence to a predetermined grammar pattern for the category, the grammar pattern expressing a relationship between the classes in the tag sentence; and
   a report module stored in the memory and executable by the at least one processor to present or transmit an indication of the actionable item to a device of a user associated with management of the product or service.

2. A system as claim 1 recites, wherein the characteristic patterns comprise part-of-speech (PoS) patterns and the classification module is further configured to determine the associations based at least in part on a reference PoS pattern.

3. A system as claim 2 recites, wherein the classification module is further configured to determine the association by retrieving the individual classes from stored mappings indexed by at least one of the characteristic pattern or the reference PoS pattern.

4. A system as claim 1 recites, wherein the classification module is further configured to:
   operate the classifier model to provide classification values for the text segments, the classification for each of the text segments being based at least in part on at least one of the respective text segments, a portion of at least one text segment within a selected distance of the respective text segment, the characteristic pattern associated with the respective text segment, a stemmed version of the respective text segment, or a degree of correspondence between the characteristic pattern associated with the respective text segment and at least one reference pattern; and
   determine the individual classes based at least in part on the classification values.

5. A system as claim 4 recites, wherein:
   the characteristic patterns comprise a part-of-speech (PoS) pattern; and the classification module is further configured to determine the individual classes based at least in part on at least one reference PoS pattern.

6. A system as claim 1 recites, wherein the predetermined grammar pattern defines a pushdown grammar over a plurality of classes of the ontology.

7. A system as claim 1 recites, wherein the characteristic patterns comprise at least one of a dependency tree, a co-occurrence relationship, a residual inverse document frequency (RIDF) value, a term-frequency (TF) value, an inverse document frequency (IDF) value, or a mutual information (MI) value.

8. A system as claim 1 recites, wherein the classes of the ontology comprise at least one of a suggestion-indicator class or a modal-indicator class for text segment(s) that represent the presence of a suggestion, an entity class for text segment(s) that represent an entity, an action class for text segment(s) that represent a behavior that is taken on an entity, a certainty class for text segment(s) that represent the confidence of the user regarding an entity or condition represented in the text segment(s), an emotion class for text segment(s) that represent feelings or beliefs of the user writing the text segment(s), or a negation class for text segment(s) that change the meaning of one or more other text segment(s) to a substantially opposite meaning.

9. A system as claim 1 recites, wherein:
the analysis module is further executable by the at least one processor to determine, through an iterative process, respective actionable items associated with individual documents of a plurality of documents, and
the system further comprises a recommendation module stored in the memory and executable by the at least one processor to analyze the respective actionable items to generate a recommendation comprising priority values of the respective actionable items.

10. A system as claim 9 recites, wherein the recommendation module is further executable by the at least one processor to determine the recommendation comprising a ranking of at least a first actionable item and a second actionable item of the actionable items, the first actionable item occurring more frequently in the individual documents than the second actionable item and being ranked higher than the second actionable item.

11. A method comprising:
associating, by a computing device, text segments of a document with classes of an ontology based at least in part on characteristic patterns associated with the text segments to provide a classification using a machine-learned classifier model that takes the characteristic patterns as input, the document including feedback from a user of a product or service;
determining, by the computing device, a tag sentence for at least a subset document, the tag sentence comprising a sequence of pairs of a text segment and an associated class of the ontology;
identifying, by the computing device, an actionable item and determining an associated category among a plurality of categories of actionable items based at least in part on a comparison of the tag sentence to a predetermined grammar pattern for the category, the grammar pattern expressing a relationship between the classes in the tag sentence; and
presenting or transmitting an indication of the actionable item to a device of a user associated with management of the product or service.

12. A method as claim 11 recites, wherein the document is a first document of a plurality of documents, the method further comprising:
repeating the associating, determining, and identifying acts for a second document of the plurality of documents to identify an actionable item associated with the second document;
determining, by the computing device, respective scoring values associated with the respective actionable items of the first document and the second document of the plurality of documents; and
determining, by the computing device, an association between the first document and the second document based at least in part on the respective scoring values.

13. A method as claim 11 recites, wherein the characteristic patterns comprise at least one of a dependency tree, a co-occurrence relationship, a residual inverse document frequency (RIDF) value, a term-frequency (TF) value, an inverse document frequency (IDF) value, or a mutual information (MI) value.

14. A method as claim 11 recites, further comprising determining that the document corresponds to a selected topic prior to at least one of the associating or the determining the tag sentence.

15. A method as claim 11 recites, wherein the tag sentence is determined based at least in part on a stored dictionary mapping one or more text segments to one or more classes of the ontology, and the method further comprises:
determining a particular text segment that is not associated with the dictionary, wherein the dictionary includes respective attribute(s) for individual one(s) of the text segments in the dictionary;
determining at least one attribute of the particular text segment; and
updating the dictionary to include an association between the particular text segment and one or more particular classes of the ontology based at least in part on the at least one attribute of the particular text segment and one or more of the attribute(s) of the individual one(s) of the text segments in the dictionary.

16. One or more non-transitory computer-readable media storing computer-executable instructions that, when executed by the at least one processor, cause the at least one processor to perform acts comprising:
associating text segments of a document with classes of an ontology based at least in part on characteristic patterns associated with the text segments, using a machine-learned classifier model that takes the characteristic patterns as classifier inputs, the document including feedback from a user of a product or service;
creating, from at least a subset of the document, a tag sentence comprising a sequence of pairs of a text segment and an associated class of the ontology;
identifying an actionable item and determining an associated category among a plurality of categories of actionable items based at least in part on a comparison of the tag sentence to a predetermined grammar pattern for the category, the grammar pattern expressing a relationship between the classes in the tag sentence; and
presenting or transmitting an indication of the actionable item to a device of a user associated with management of the product or service.

17. One or more non-transitory computer-readable media as claim 16 recites, wherein the predetermined grammar pattern comprises a pushdown grammar.

* * * * *